United States Patent [19]

Fujumura et al.

[11] Patent Number: 4,946,260
[45] Date of Patent: * Aug. 7, 1990

[54] DUAL-FREQUENCY, DIELECTRIC ANISOTROPY LIQUID CRYSTAL OPTICAL DEVICE

[75] Inventors: Koh Fujumura, Hino; Maskatsu Higa, Fussa; Hisashi Aoki, Tokyo, all of Japan

[73] Assignee: Casio Computer Co., Ltd., Tokyo, Japan

[*] Notice: The portion of the term of this patent subsequent to Jun. 6, 2006 has been disclaimed.

[21] Appl. No.: 316,221

[22] Filed: Feb. 24, 1989

Related U.S. Application Data

[62] Division of Ser. No. 66,720, Jun. 24, 1987, Pat. No. 4,836,654.

[30] Foreign Application Priority Data

Jun. 30, 1986 [JP] Japan ............... 61-153539
Nov. 27, 1986 [JP] Japan ............... 61-282471
Dec. 26, 1986 [JP] Japan ............... 61-308645

[51] Int. Cl.$^5$ .............. G02F 1/133; G09G 3/36
[52] U.S. Cl. ............... 350/346; 350/332; 350/337; 350/341; 340/784
[58] Field of Search ........... 350/346, 347 E, 337, 350/340, 341, 331 T, 332, 333; 340/784, 805, 811, 765; 346/107 R, 160

[56] References Cited

U.S. PATENT DOCUMENTS

| | | | |
|---|---|---|---|
| 3,824,604 | 7/1974 | Stein | 350/331 R |
| 4,297,022 | 10/1981 | Lester | 350/334 |
| 4,386,836 | 6/1983 | Aoki et al. | 350/346 |
| 4,569,574 | 2/1986 | Masaki et al. | 350/334 |
| 4,595,259 | 6/1986 | Perregaux | 350/331 R |
| 4,609,256 | 9/1986 | Nakamura | 350/346 |
| 4,614,954 | 9/1986 | Ohta et al. | 350/337 |
| 4,641,156 | 2/1987 | Ohta et al. | 350/346 |
| 4,671,616 | 6/1987 | Aoki et al. | 350/346 |
| 4,688,899 | 8/1987 | Fujimura et al. | 350/346 |
| 4,745,433 | 5/1988 | Fujimura et al. | 350/331 R |
| 4,755,812 | 7/1988 | Ohta et al. | 340/784 |
| 4,832,460 | 5/1989 | Fujimura et al. | 350/346 |

FOREIGN PATENT DOCUMENTS

| | | |
|---|---|---|
| 0083253 | 7/1983 | European Pat. Off. |
| 2711194 | 9/1978 | Fed. Rep. of Germany |
| 3213872 | 11/1982 | Fed. Rep. of Germany |
| 50-1152779 | 9/1981 | Japan |
| 0176620 | 10/1983 | Japan |
| 58-176620 | 10/1983 | Japan |
| 0091421 | 5/1984 | Japan |
| 59-119330 | 7/1984 | Japan |
| 60-182421 | 9/1985 | Japan |
| 61-87136 | 5/1986 | Japan |

*Primary Examiner*—Stanley D. Miller
*Assistant Examiner*—Tai V. Duong
*Attorney, Agent, or Firm*—Frishauf, Holtz, Goodman & Woodward

[57] ABSTRACT

An ON electric field for turning on (allowing light transmission) a liquid crystal optical device and an OFF electric field for turning off (shielding light) the liquid crystal optical device are selectively applied to a liquid crystal material of the liquid crystal optical device. The ON electric field is applied so as to obliquely align liquid crystal molecules with respect to substrates constituting the liquid crystal optical device, thereby obtaining an ON state. The ON electric field has an electric field for driving the liquid crystal molecules and a non-electric field for generating a state wherein no electric field is applied to the liquid crystal molecules. The OFF electric field has an electric field for homeotropically aligning the liquid crystal molecules with respect to the substrates.

21 Claims, 55 Drawing Sheets

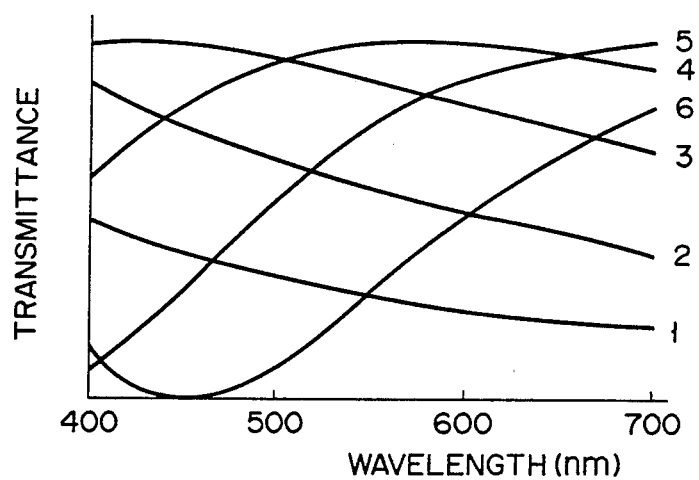
F I G. 6
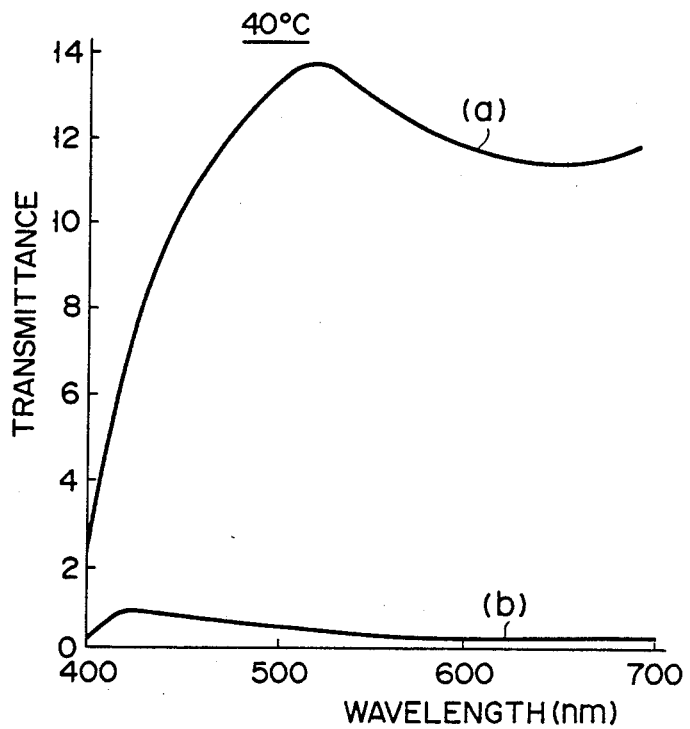
F I G. 7

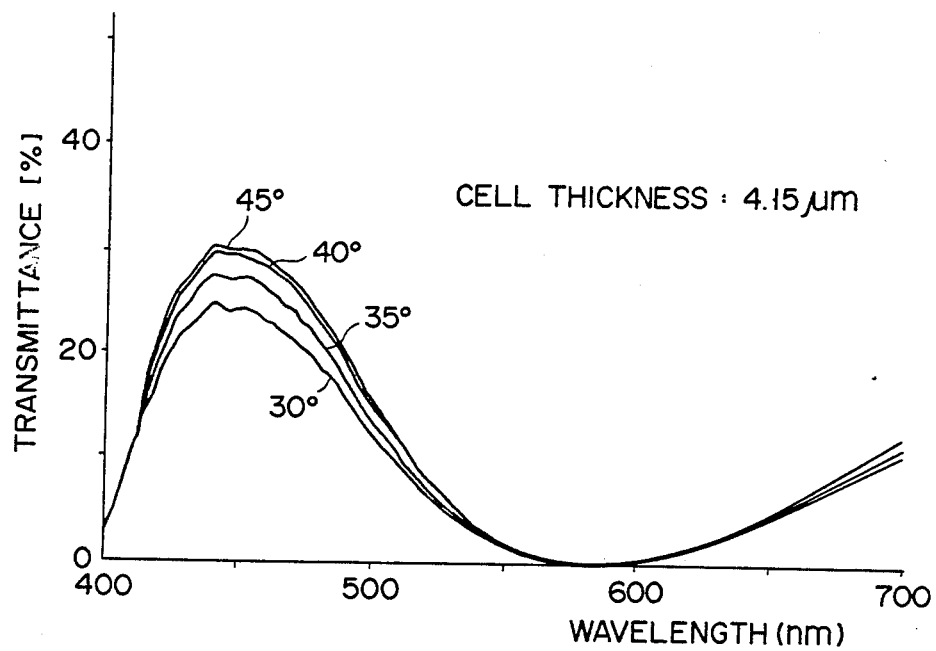
F I G. 11
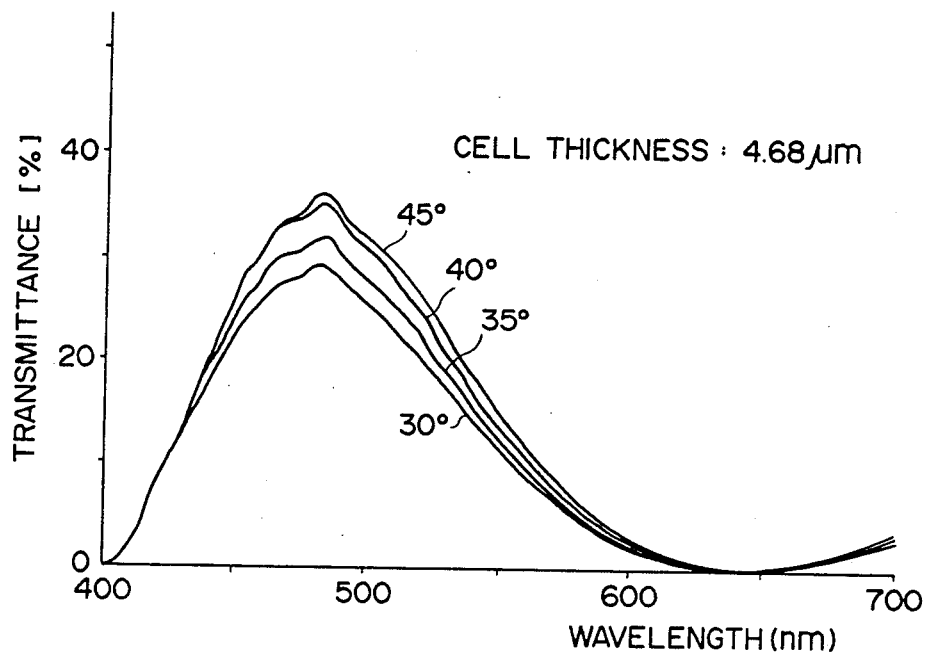
F I G. 12

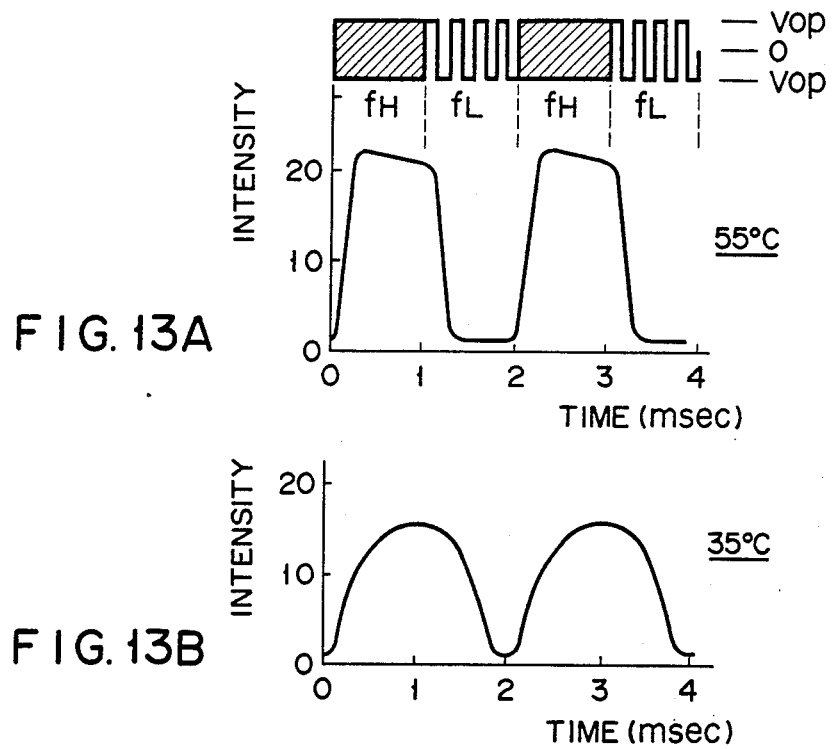
F I G. 13A
F I G. 13B
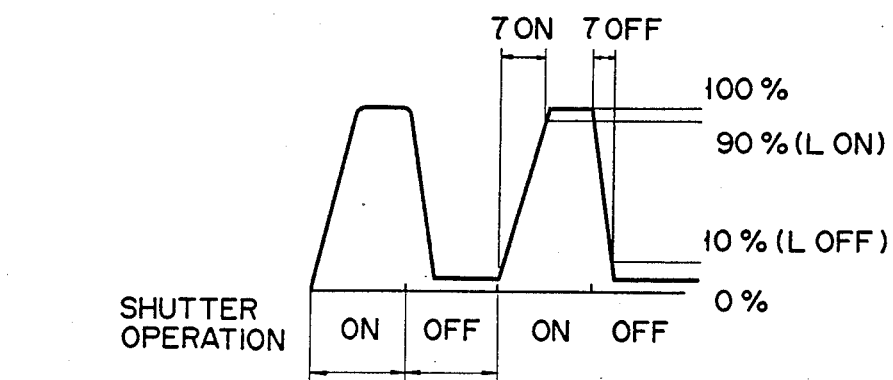
F I G. 14

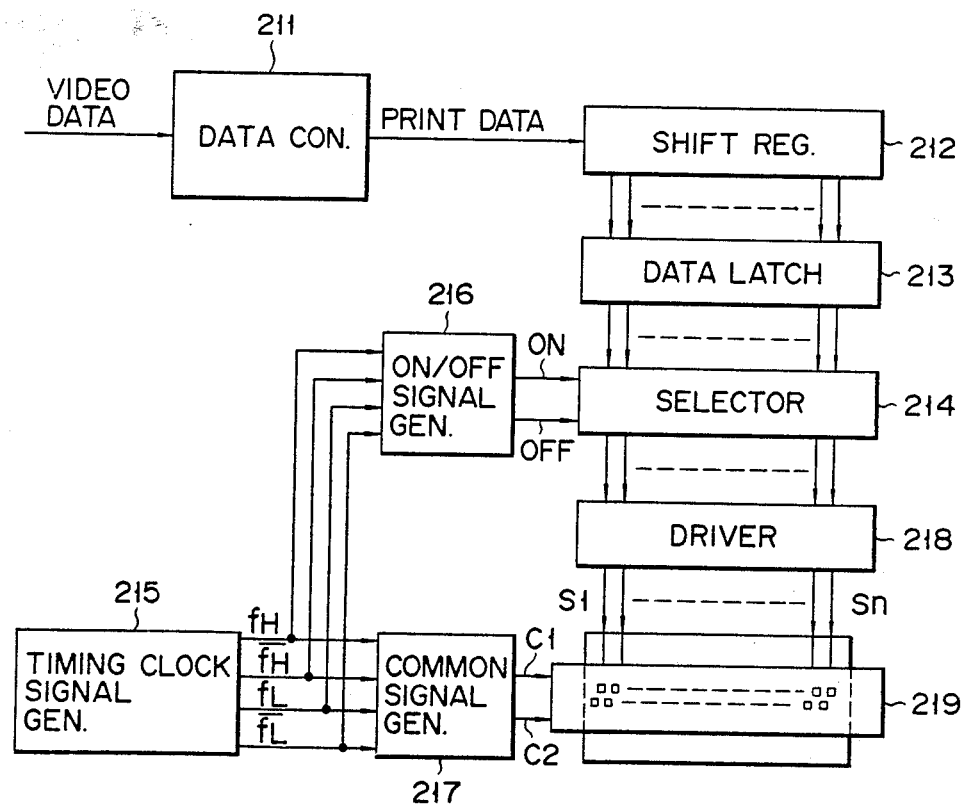
F I G. 29

FIG. 30A com 1
FIG. 30B com 2
FIG. 30C seg 1 (ON, ON)
FIG. 30D seg 2 (OFF, OFF)
FIG. 30E seg 1 - com 1
FIG. 30F seg 2 - com 2
FIG. 30G seg 1 - com 2
FIG. 30H seg 2 - com 1

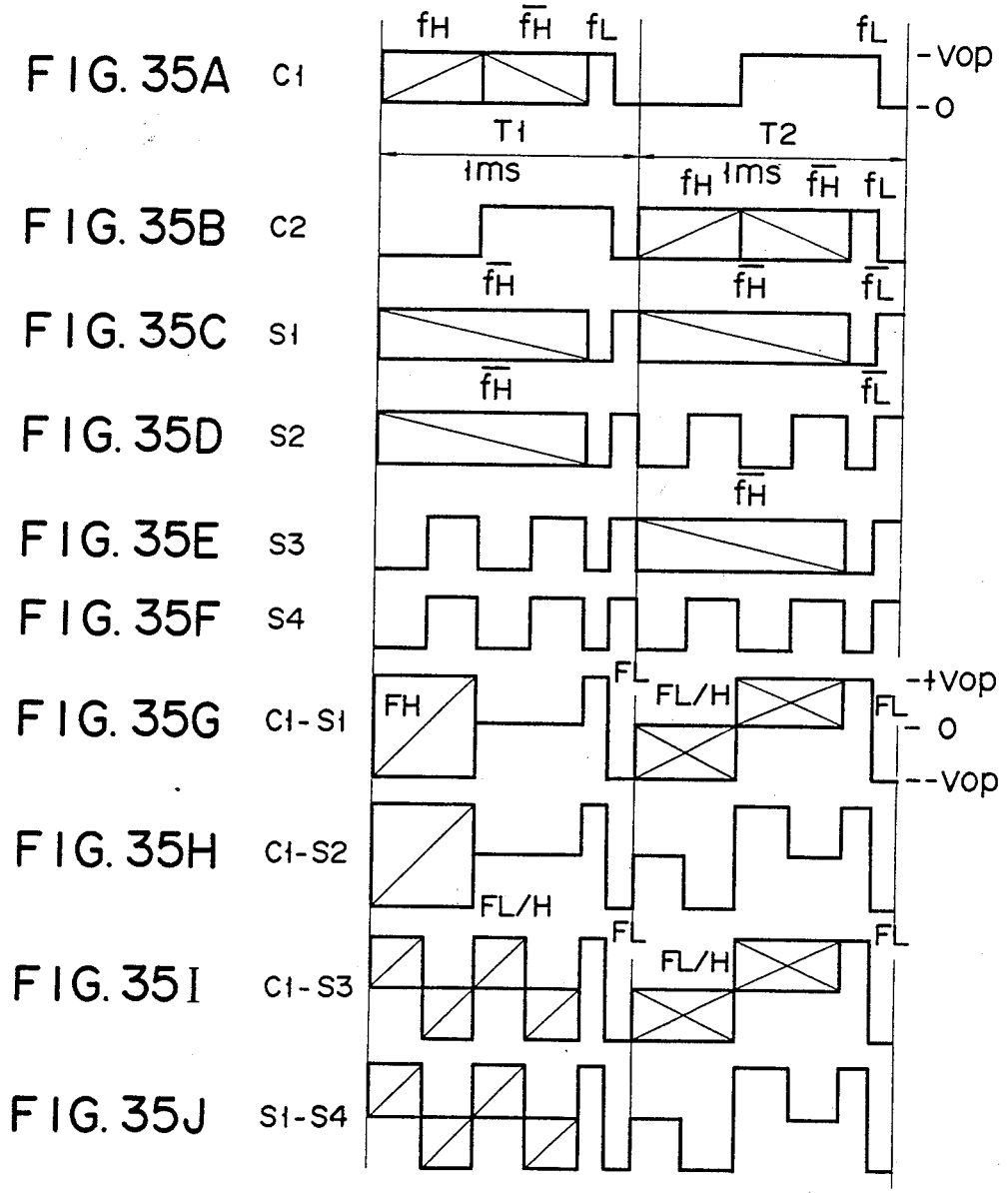

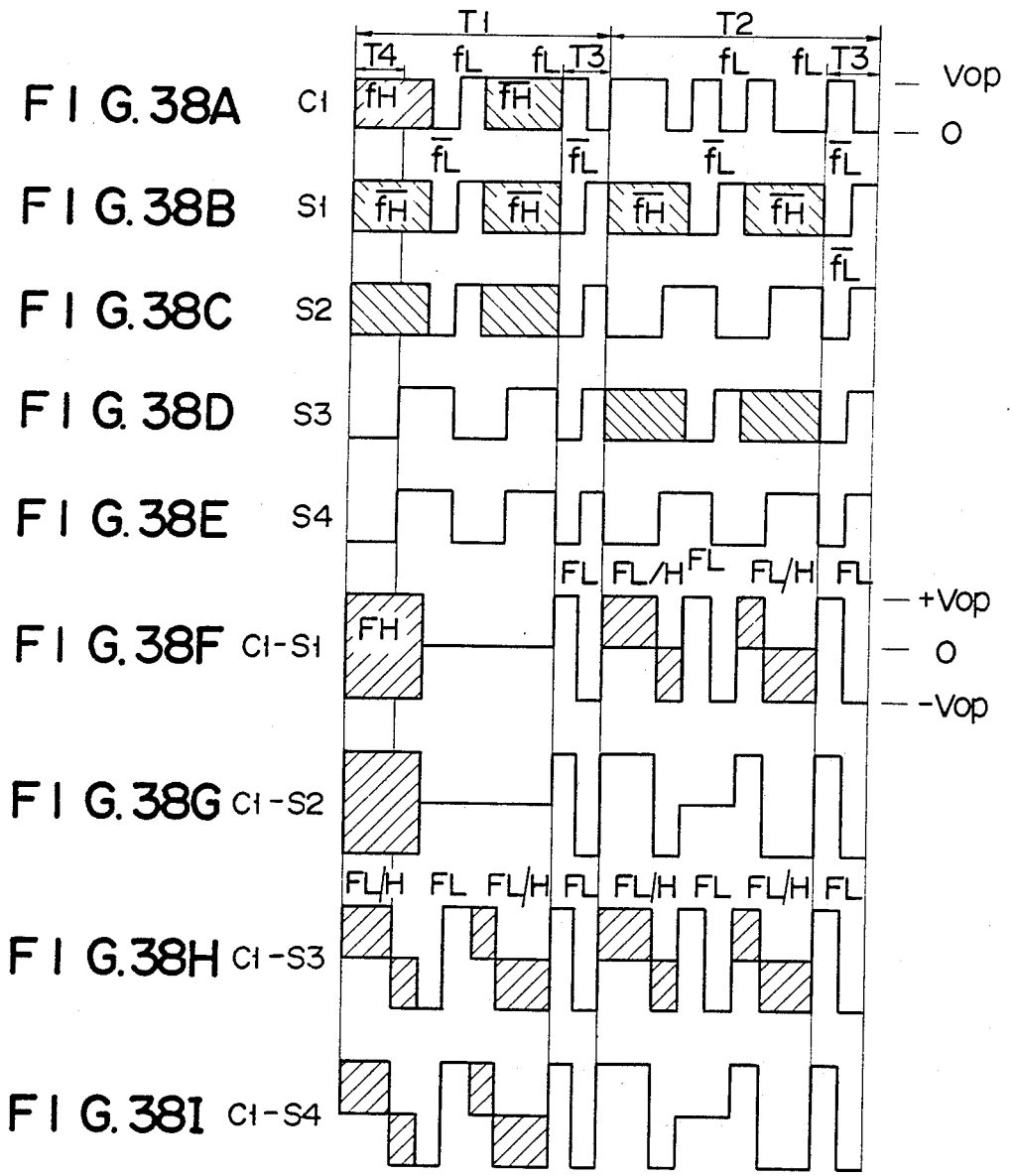

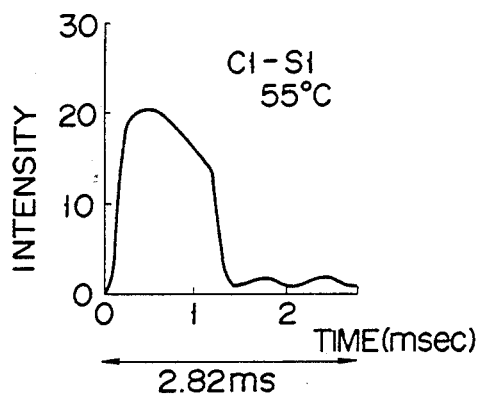
F I G. 39A
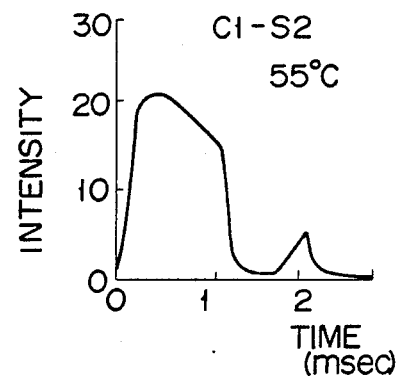
F I G. 39B
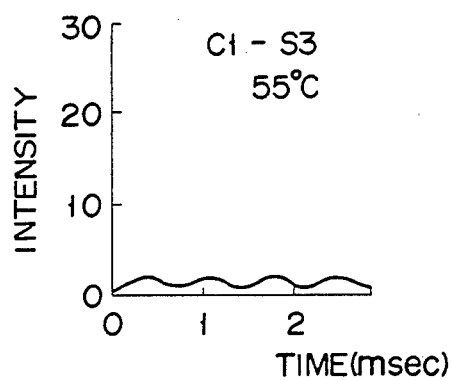
F I G. 39C
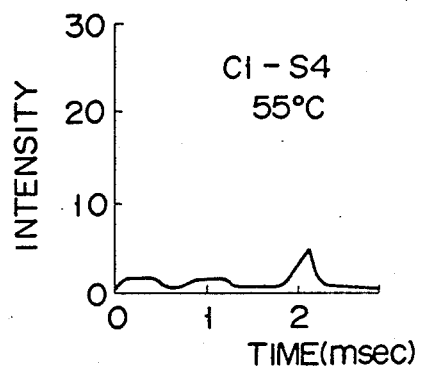
F I G. 39D

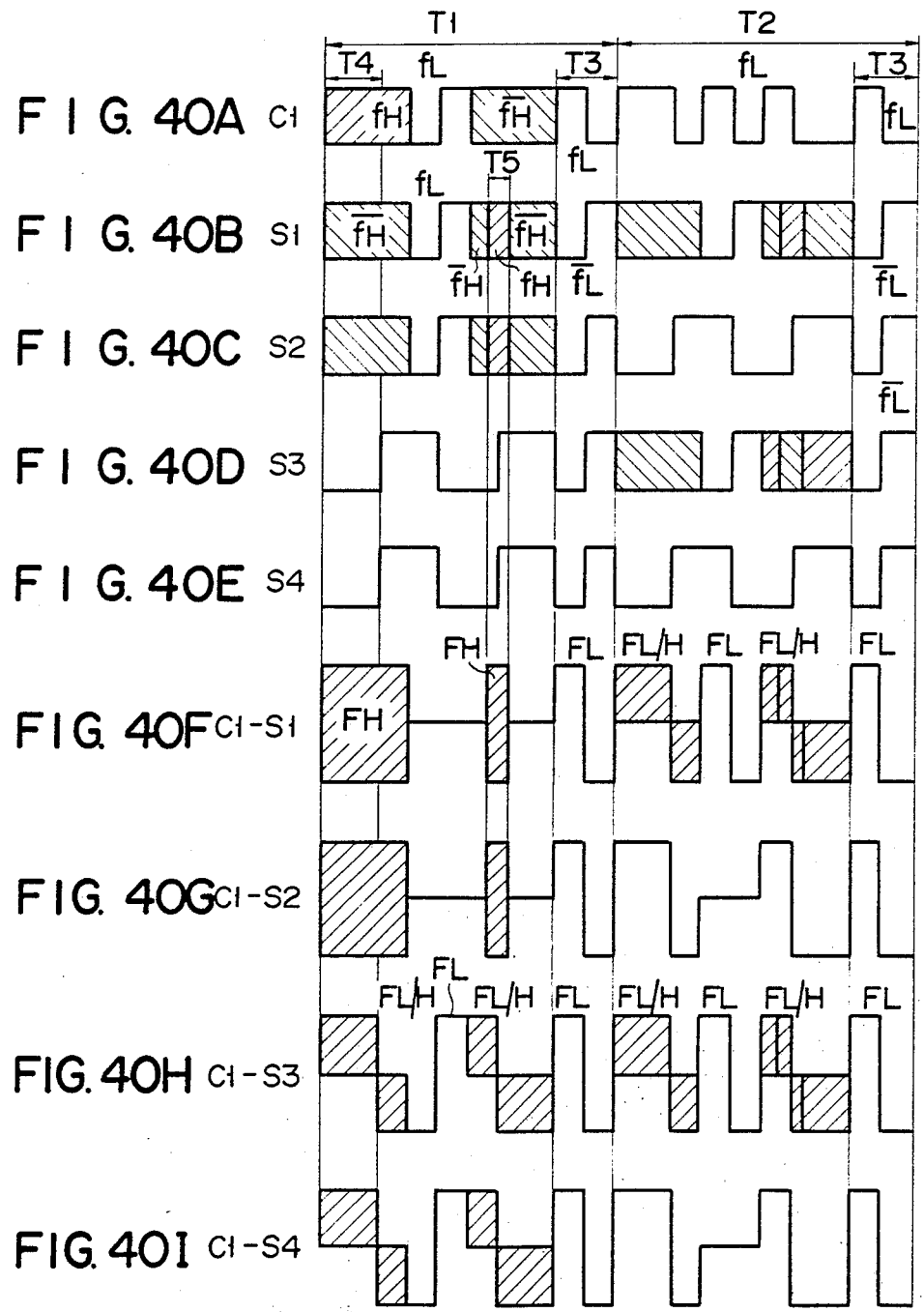

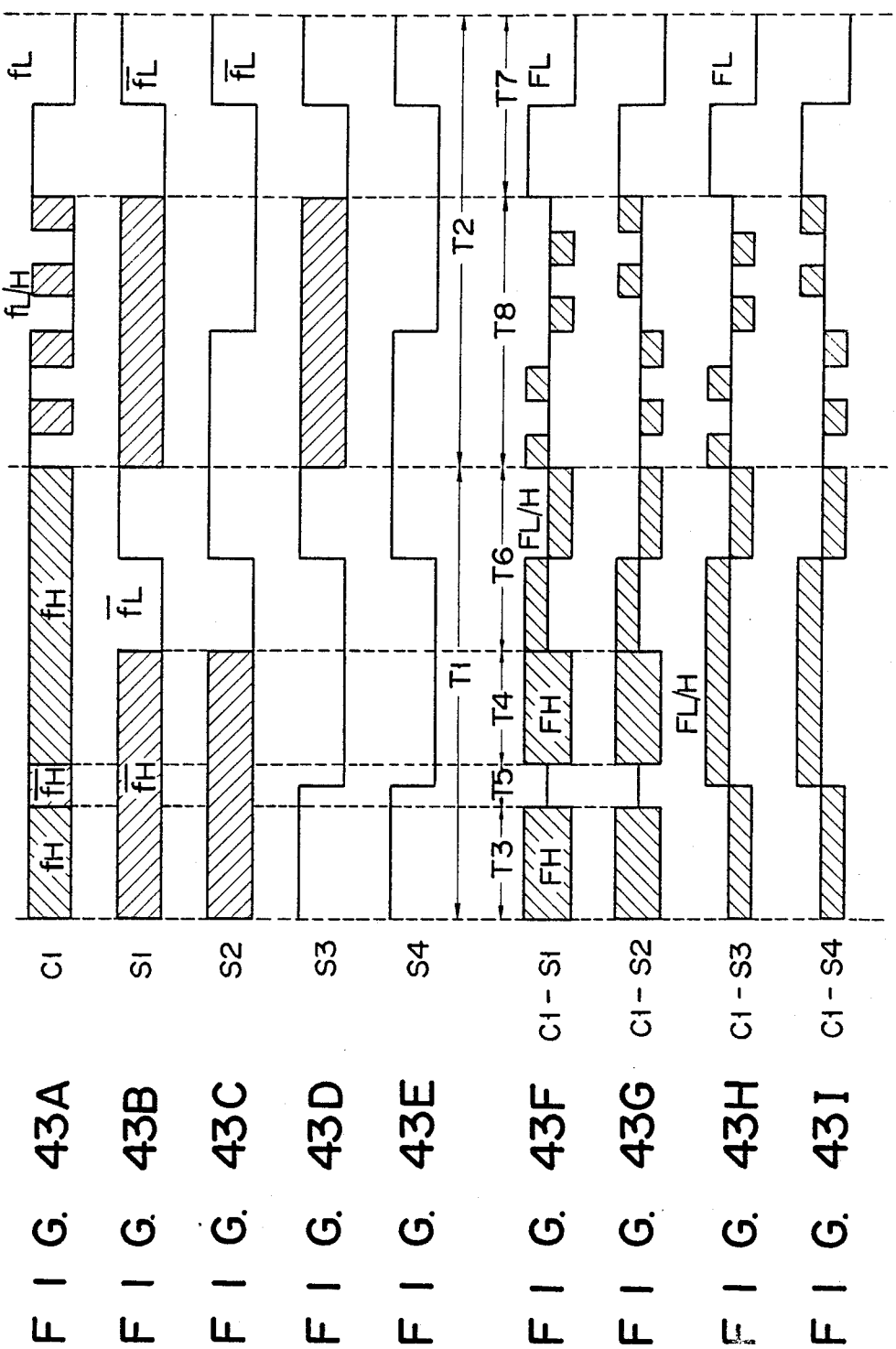

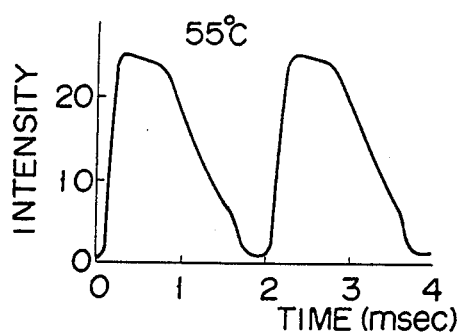
F I G. 45A
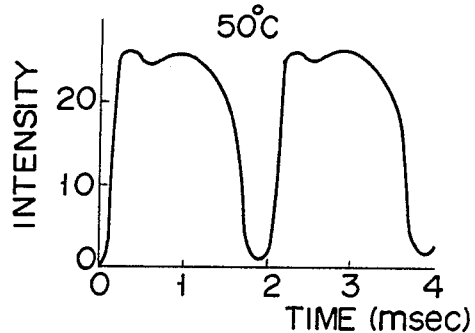
F I G. 45B
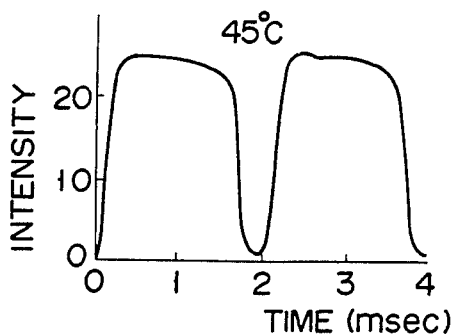
F I G. 45C
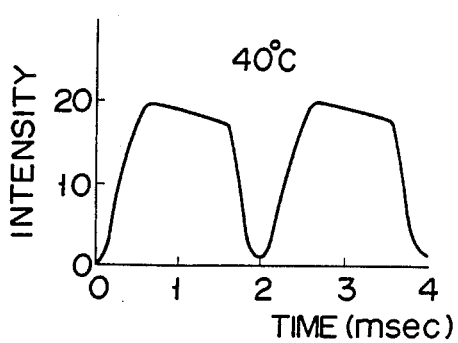
F I G. 45D

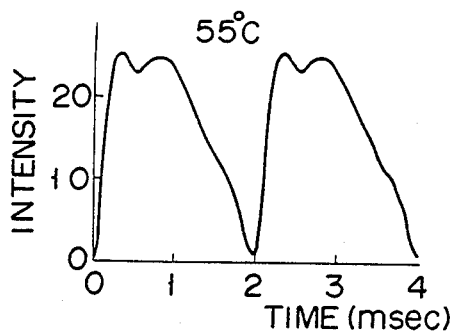
F I G. 46A
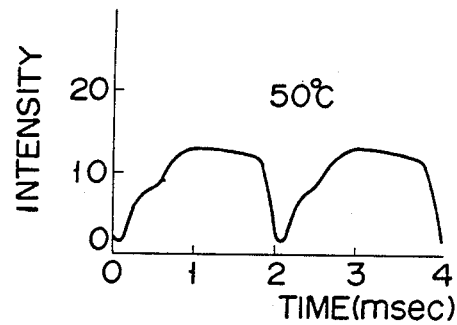
F I G. 46B
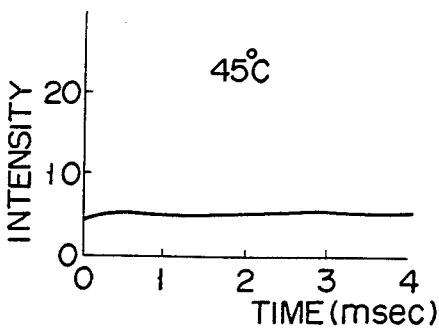
F I G. 46C
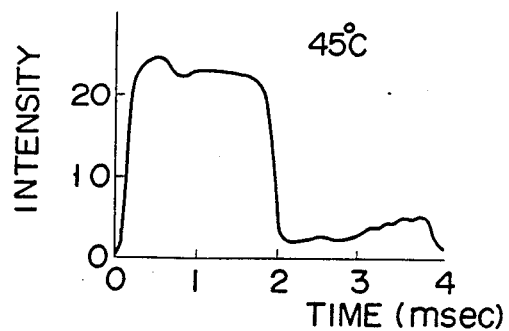
F I G. 47

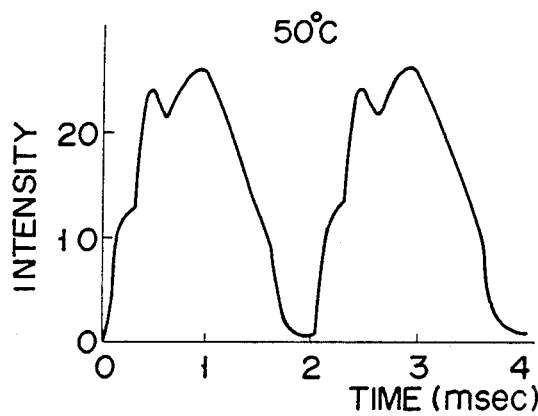
F I G. 49
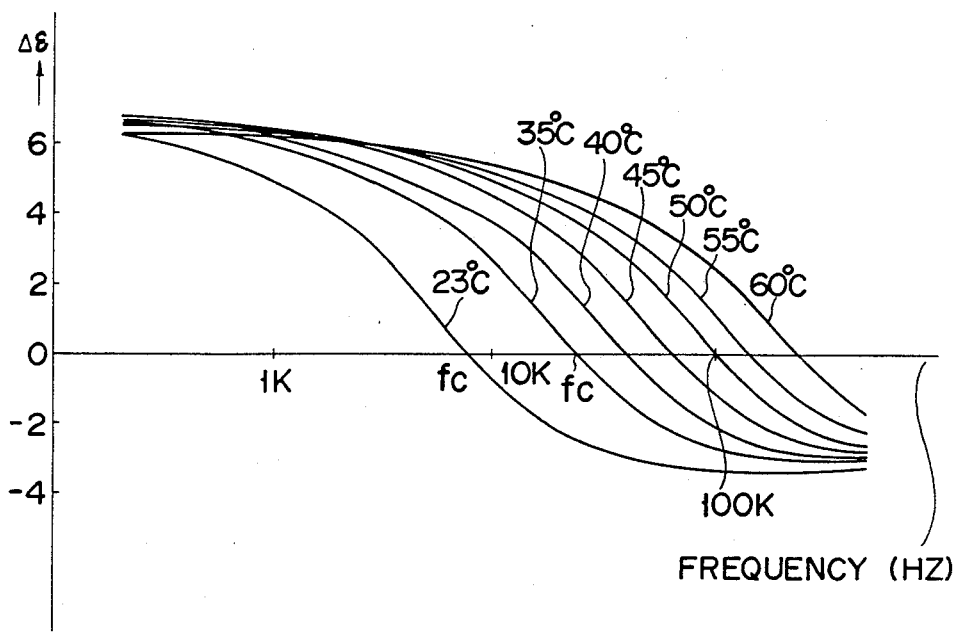
F I G. 53

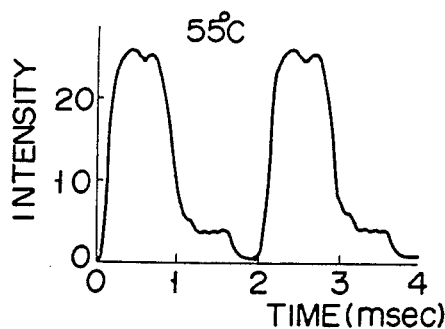
F I G. 50A
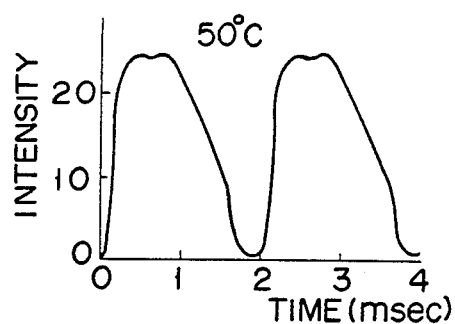
F I G. 50B
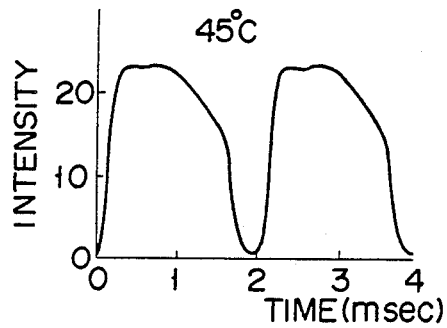
F I G. 50C
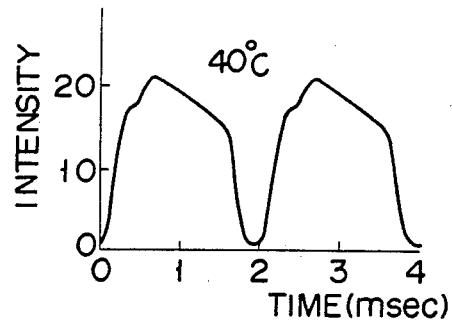
F I G. 50D

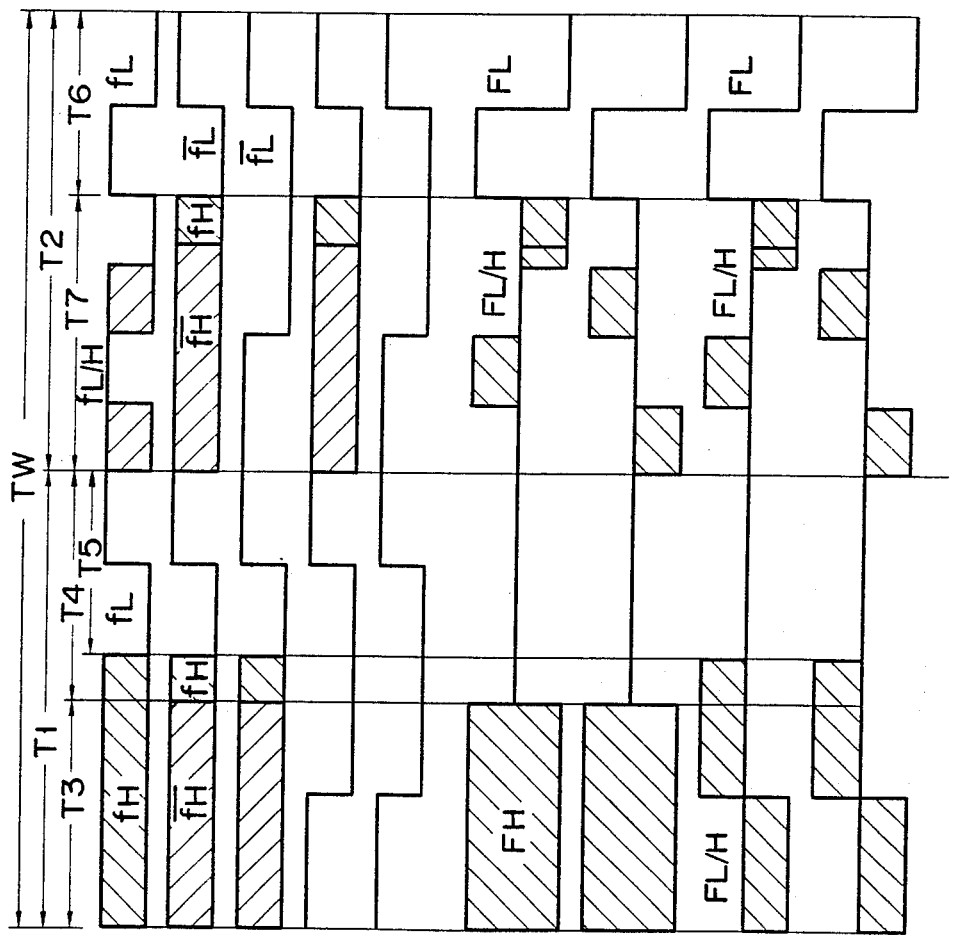

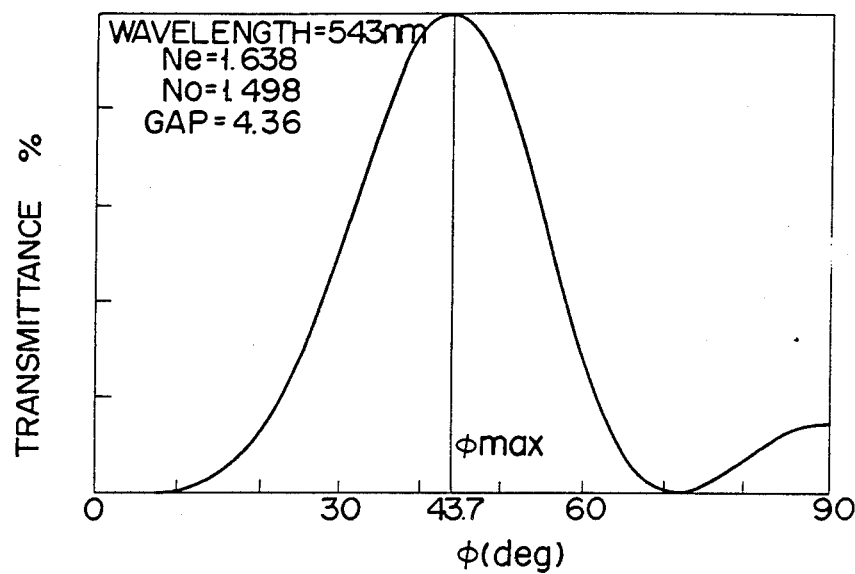
F I G. 54
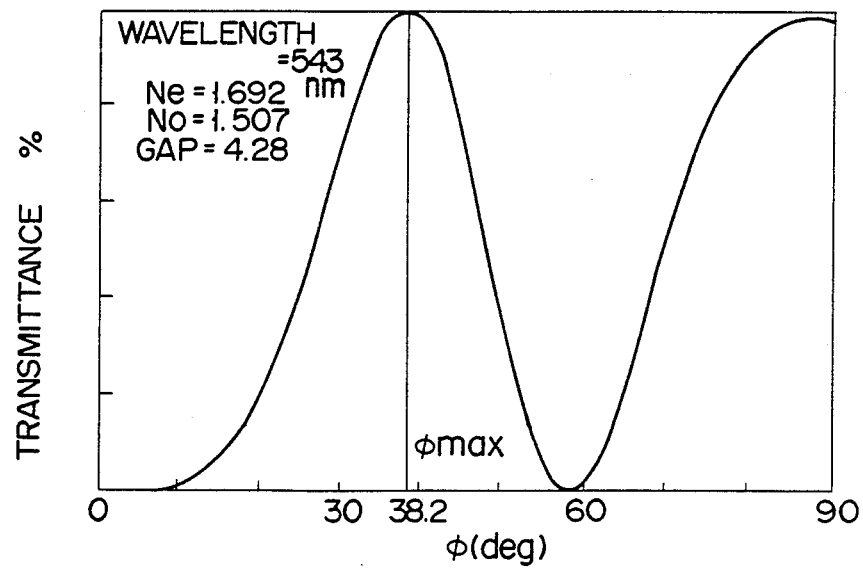
F I G. 55

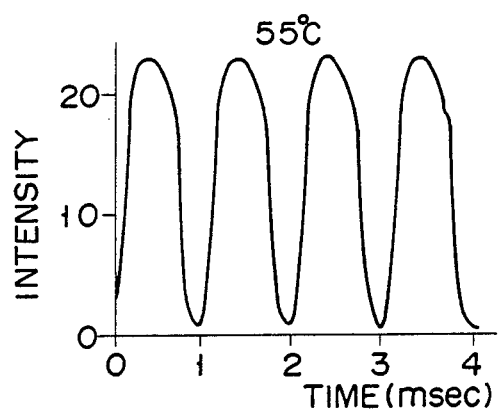
F I G. 56A
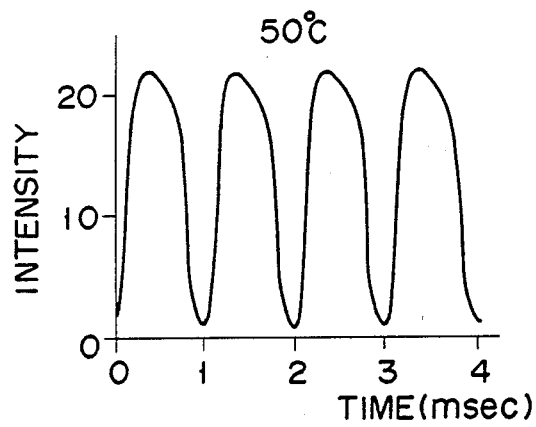
F I G. 56B
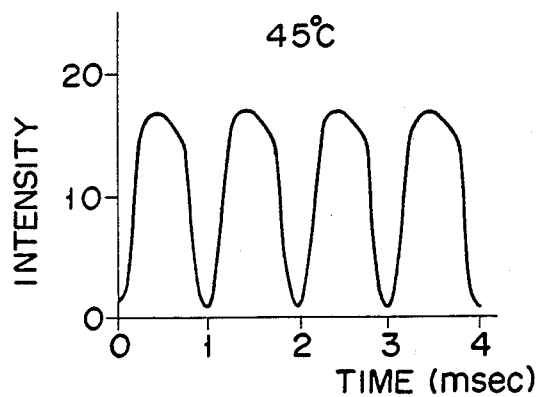
F I G. 56C

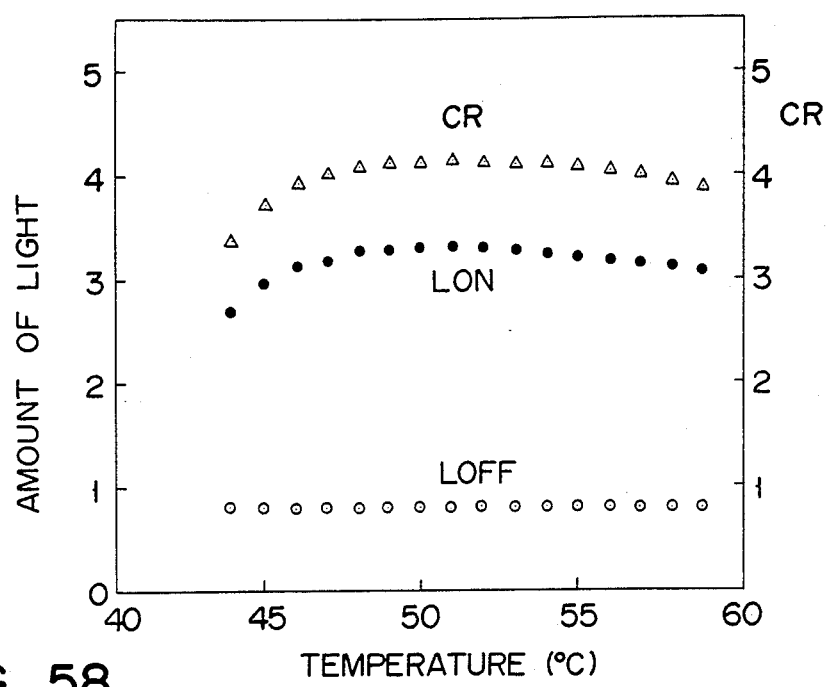
F I G. 58
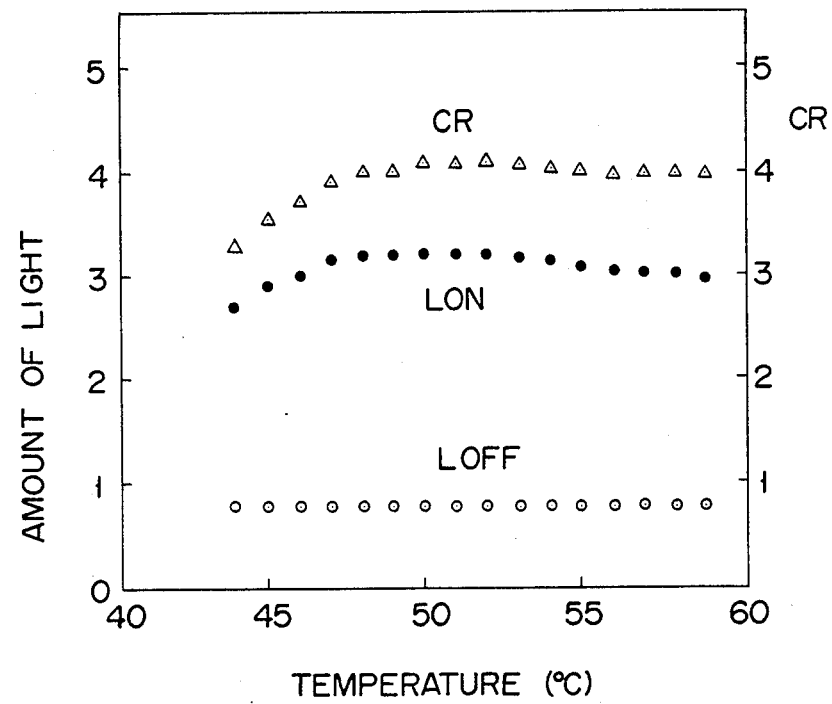
F I G. 59

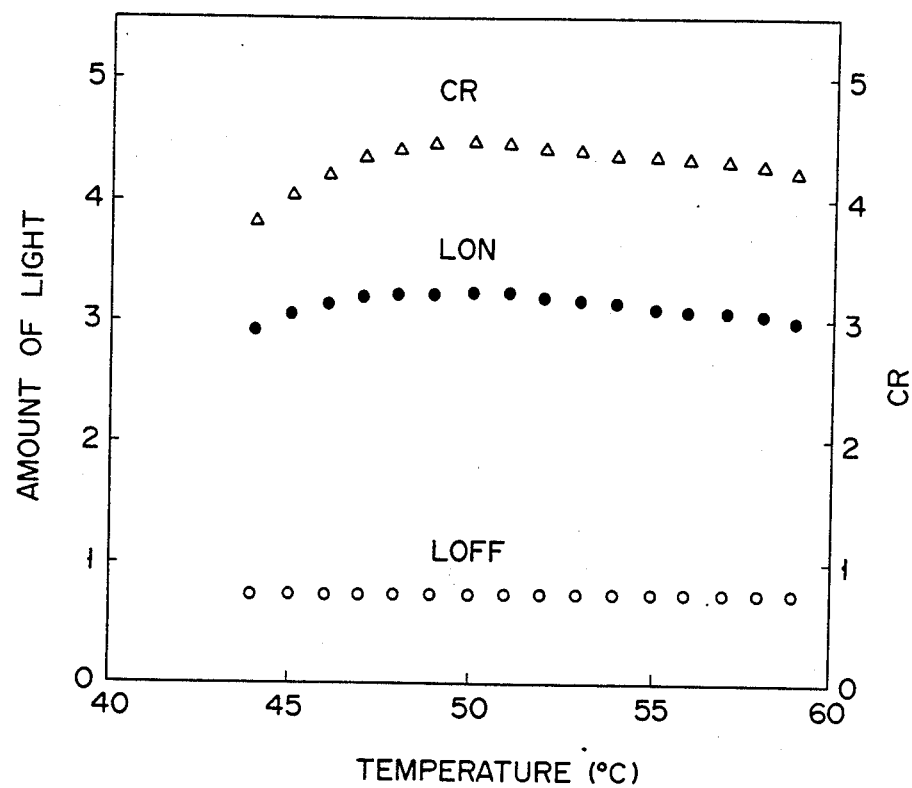
F I G. 66

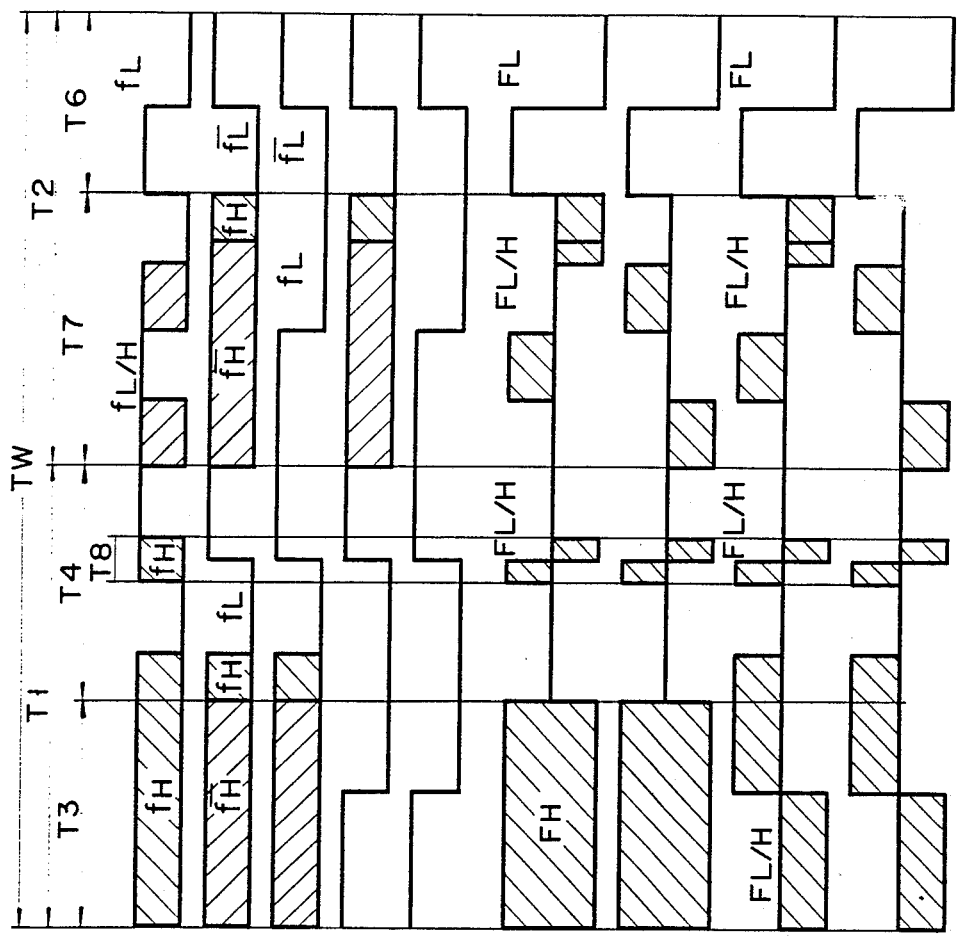

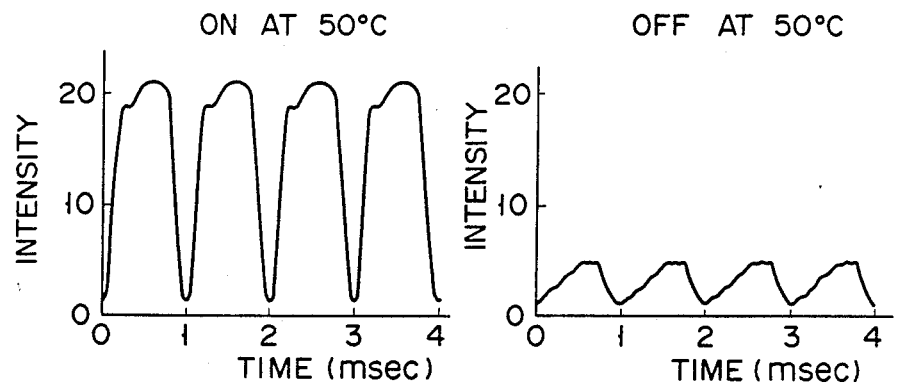
F I G. 68A    F I G. 68B
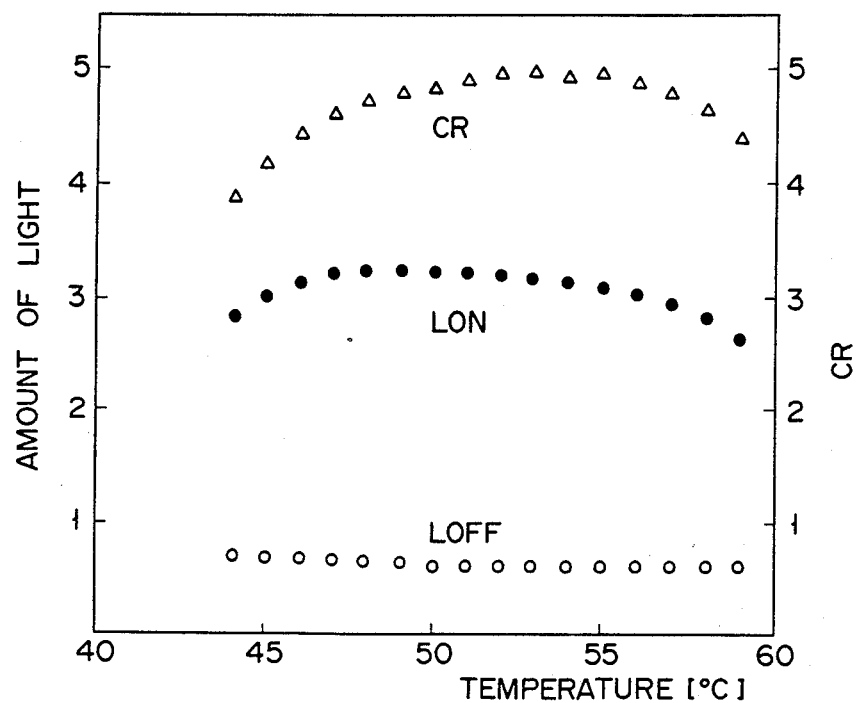
F I G. 69

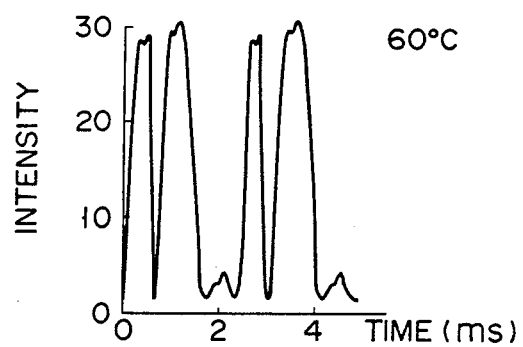
F I G. 74A
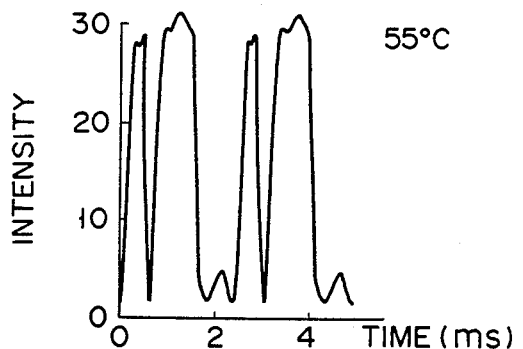
F I G. 74B
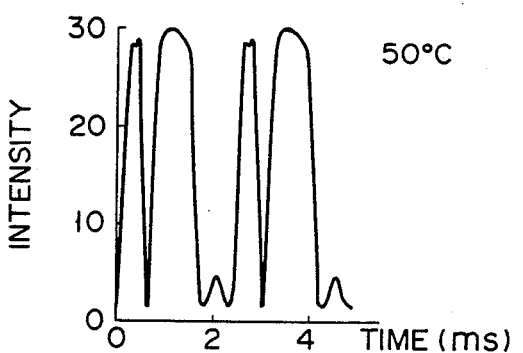
F I G. 74C
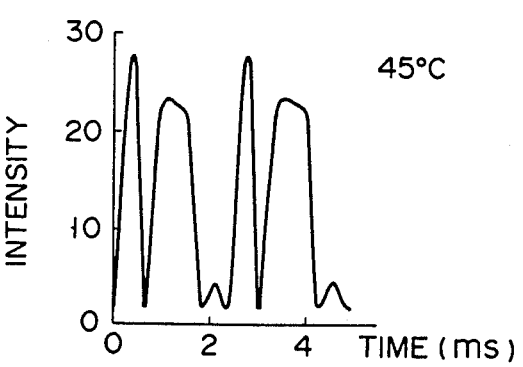
F I G. 74D F I G. 75A
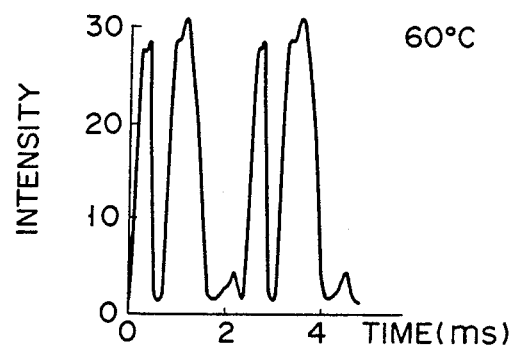
F I G. 75B
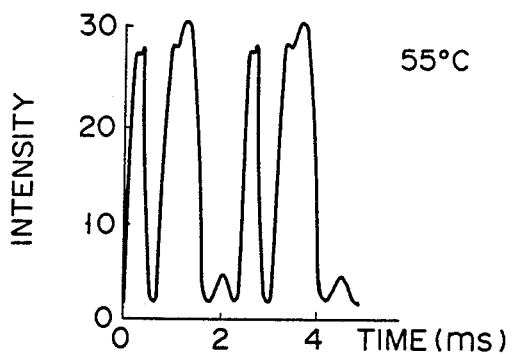
F I G. 75C
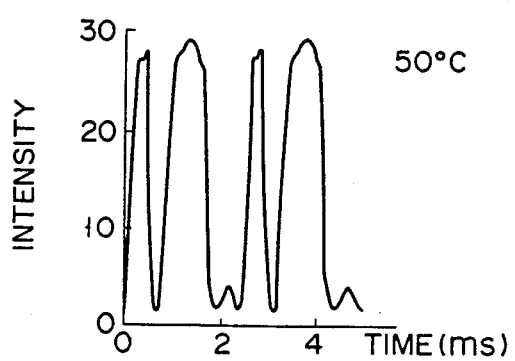
F I G. 75D
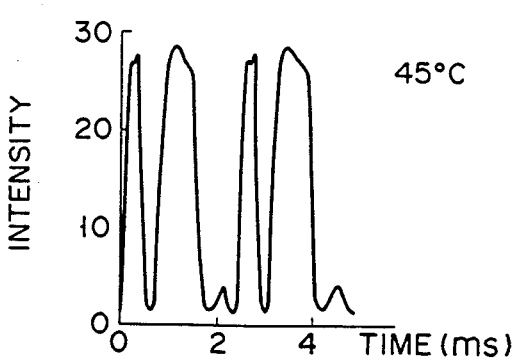

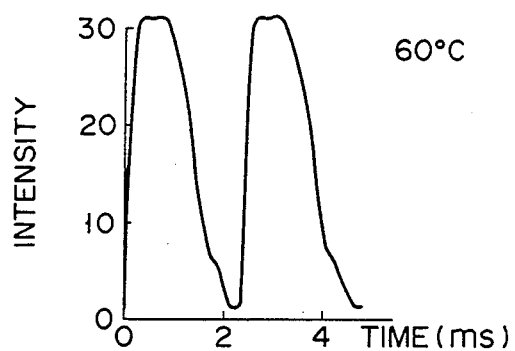
F I G. 79A
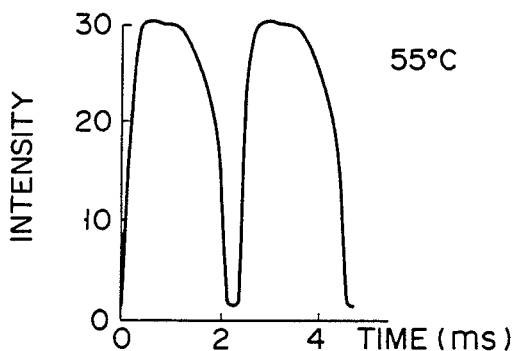
F I G. 79B
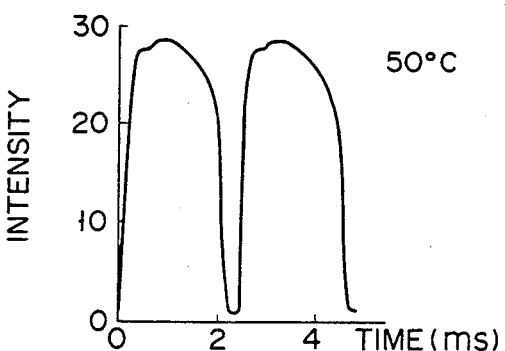
F I G. 79C
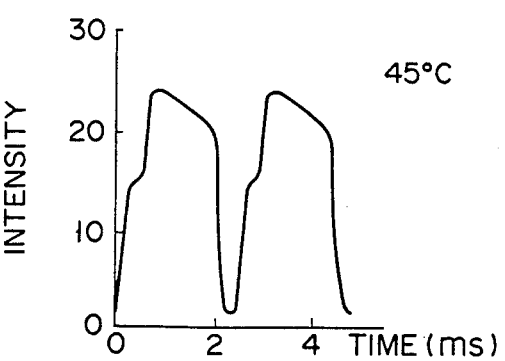
F I G. 79D

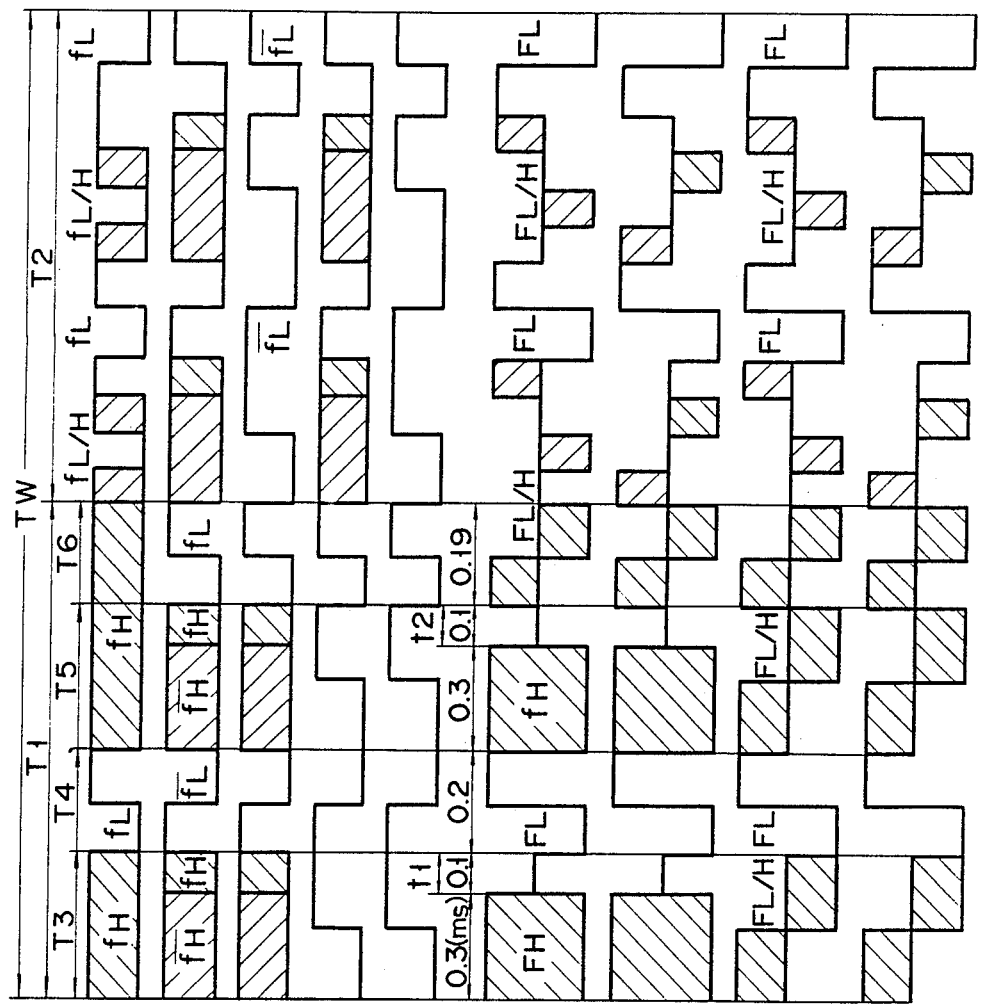

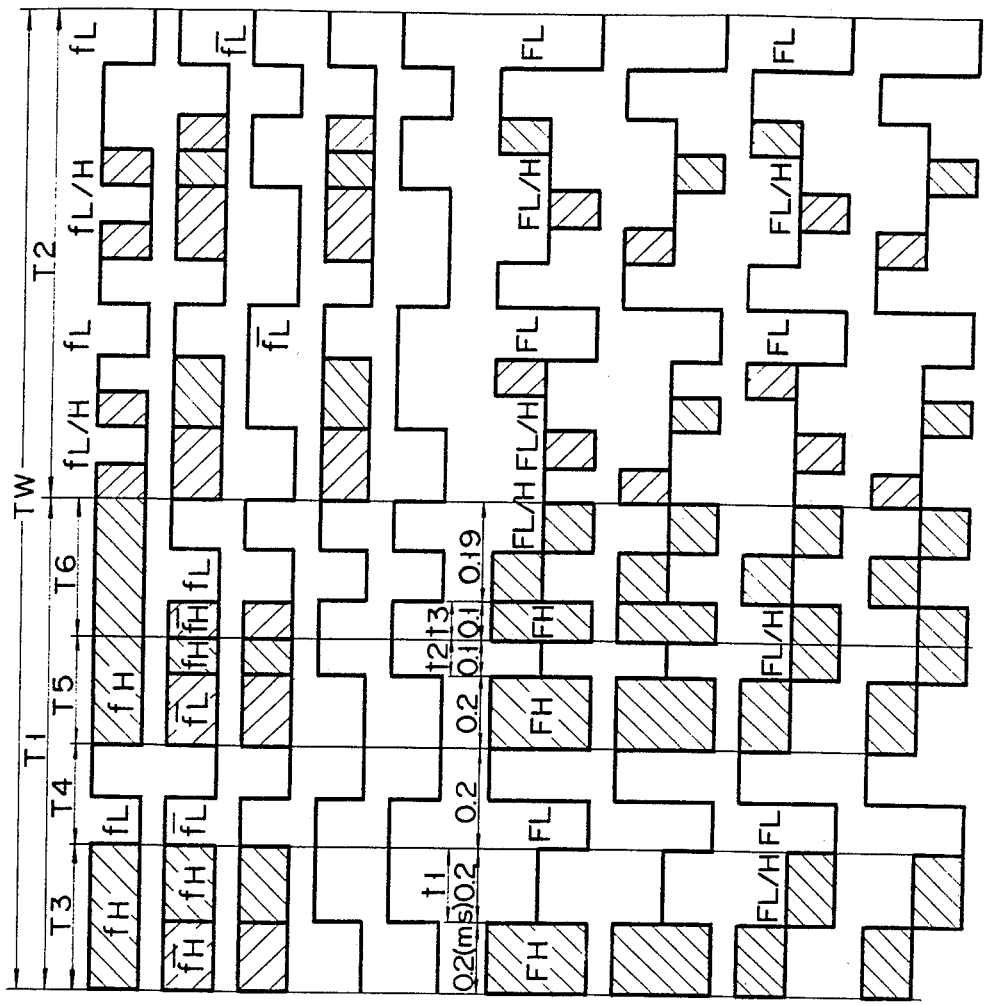

DUAL-FREQUENCY, DIELECTRIC ANISOTROPY LIQUID CRYSTAL OPTICAL DEVICE

This is a division of application Ser. No. 066,720 filed June 24, 1987, now U.S. Pat. No. 4,836,654.

BACKGROUND OF THE INVENTION

The present invention relates to a method of driving a liquid crystal optical device, in order to obtain a light-transmission state or a light-shielding state by use of an electro-photo effect of liquid crystal.

In recent times, increasing use has been made of liquid crystal optical devices for obtaining a light-transmission state or a light-shielding state by incorporating them in television sets, computer terminals, office equipment, and the like. A liquid crystal optical device is used in optical printing head of a matrix display device or in an electro-photographic printer incorporated in the above-mentioned devices. The liquid crystal optical device controls the light-transmission (ON) states and the light-shielding (OFF) states of microshutters, so that an image and characters are displayed in the display device, or a pattern such as an image and characters are exposed onto a photosensitive body in the optical printing head. The microshutters are independently ON/OFF controlled, and must be as small a size as possible, so that a large number of them can be arranged on a large screen, in order to improve the reproducibility of an image, when they are used in a display device, or so that an image with high resolution can be obtained when they are used in an the optical printing head of electro-photographic printer. Since a large number of microshutters are driven in order that a picture or an image can be produced with high reproducibility, the liquid crystal optical device must satisfy the following requirements:

(1) a high ratio of intensities of transmitted light and a high ratio of amounts of transmitted light between the ON and OFF states of the microshutter, i.e., high contrast, (2) a high intensity of transmitted light in the ON state of the microshutter, and (3) high-speed response.

Several electro-photographic printers have been proposed which may be used as the computer terminals or office equipment described above.

For example, an alphanumeric printer system is disclosed in U.S. Pat. No. 3,824,604, which uses a matrix type liquid crystal device in which a nematic cholesteric compound is sealed between a pair of substrates on which electrode matrices are formed. This printer system incorporates a liquid crystal matrix in which each alphanumeric character is constituted by a 7 (lines)×5 (rows) block. Fiber optic lines are provided for each block. When the liquid crystal matrix is ON, light is guided through the fiber optic lines, onto a photosensitive drum (selenium drum), whereby alphanumeric characters using the 7×5 blocks are printed on the drum. However, in this printer system, since the liquid crystal matrix uses a nematic cholesteric compound and each character has a 7 (lines)×5 (rows) pixel arrangement, an alphanumeric character and/or image cannot always be accurately reproduced in a desired format The printer system has a rise time of 10 msec and a decay time of 350 msec, i.e., a low operating speed.

An electro-photographic printer which uses a twisted nematic type (to be referred to as a TN type hereinafter) liquid crystal device is disclosed in DE. 2711194-A1 and U.S. Pat. No. 4,297,022. The liquid crystal device of the printer uses a microshutter array in which microshutters corresponding to pixels are aligned in one or two lines. The liquid crystal device uses a TN type liquid crystal material. Therefore, even if the driving voltage, the thickness of the liquid crystal layer, and the like are set to optimal values, the rise time and the decay time of the liquid crystal device can, at most, only be improved to around 2 msec and 20 msec, respectively.

When an electro-photographic printer utilizing the liquid crystal device described above is put into practical use, each microshutter must be of very small size, e.g., 0.1 mm×0.1 mm square or smaller, in order for a high-resolution printed image to be obtained. An image printed on one page of a paper sheet is formed of a large number of dots which correspond to light spots controlled by the micro shutters. For this reason, in order that a practical printing speed can be attained, at which about ten A4-size paper sheets can be printed per minute, the microshutters must therefore be driven at very high speed. Therefore, the above-mentioned known electro-photographic printer cannot attain the required, i.e. high, printing speed.

As a first method for solving the above problem, a TN type liquid crystal device having liquid crystal molecules of increased twist angle is driven by a two-frequency addressing scheme, so that a high-speed response can be obtained In this TN type liquid crystal device, a relatively large amount of chiral liquid crystal, for increasing twist power, is added to a liquid crystal compound exhibiting a dielectric dispersion phenomenon. A high-frequency electric field, higher than a crossover frequency of the liquid crystal material, and a low-frequency electric field, lower than the crossover frequency, are selectively applied to the liquid crystal material of the liquid crystal device. The liquid crystal molecule alignment is controlled by the two-frequency addressing scheme, as follows:

An electric field of a high frequency (e.g., 100 kHz) is applied to a liquid crystal, to align the molecular axes of liquid crystal molecules so that they are perpendicular to the applied electric field, and an electric field of a low frequency (e.g., 200 Hz) is applied thereto, to align the liquid crystal molecular axis so that it is parallel to the applied electric field. Since, by using this addressing scheme, the liquid crystal molecules are aligned perpendicular to and parallel to the substrate upon application of the electric fields, the liquid crystal device is capable of high-speed response.

Printers using the above-mentioned TN type liquid crystal device are disclosed in U.S. Pat. No. 4,386,836, DE. No. 3213872-A1, U.S. Pat. No. 4,609,256, and EP No. 0083253.

The liquid crystal device used in these printers can ON/OFF-control the microshutters such that electric fields of high and low frequencies are alternately and repetitively applied every 1 msec.

However, in the TN type liquid crystal device, the liquid crystal molecules must be twist-aligned by the self twist power of liquid crystal molecules. Since the twist alignment causes a delay between each operation of the device the device, therefore, has a limited maximum response speed. More specifically, when, in a positive display (a normally-ON display in which a pair of polarizing plates are arranged so that their polarizing axes are perpendicular to each other), a high-frequency electric field is applied to the liquid crystal material so as to change an OFF state to an ON state, the response speed is delayed by the time required for the twist alignment of the molecules, and thus, a short rise time is difficult to obtain. Since the twist pitch of the liquid crystal molecules is changed, according to the temperature and thickness of the liquid crystal layer, the TN type liquid crystal device possesses poor temperature stability, and thus the thickness of the liquid crystal layer must be precisely controlled. In addition, since the molecules of the TN type liquid crystal material have a large twist angle, light leakage arising from optical rotary dispersion is considerable, and contrast is low.

As a second method for solving the above problem, a number liquid crystal devices utilizes a Guest-Host effect type liquid crystal. In the GH type liquid crystal device, a liquid crystal material driven by a two-frequency addressing scheme, to which a dichroic dye is added, is sealed between substrates. The substrates are subjected to homogeneous aligning treatments in directions parallel to each other. In this method, a liquid crystal composition exhibiting a dielectric dispersion phenomenon is used as the liquid crystal material.

An apparatus for forming an image by use of the above GH type liquid crystal device has already been filed as U.S. Ser. No. 630,957 by several of the present inventors. This apparatus is also filed in the U.K. as GB No. 2144869B.

In the GH type liquid crystal device, dye molecules are aligned so as to be parallel to the substrate, together with liquid crystal molecules, upon application of the high-frequency electric field, and an OFF state is established, since light of a specific wavelength range is absorbed by the dye. When the dye molecules are aligned to be perpendicular to the substrate together with the liquid crystal molecules, they cannot absorb light, thereby establishing an ON state.

In the GH type liquid crystal device, a transition between the ON and OFF states can be realized by homogeneous and homeotropic alignments of the liquid crystal molecules without twist alignment. Therefore, this device can provide a higher response speed than that of the TN type liquid crystal device because of absence of a delay time corresponding to twist alignment, and temperature stability is also improved. The effective amount of transmitted light during the ON operation can be increased, and a high contrast can be obtained during practical operation due to high response speed. As a result, when the GH type liquid crystal device is applied to an optical printing head, liquid crystal optical printers reach a technical level which allows actual mass production.

However, in the liquid crystal optical printer using the GH type liquid crystal device, some problems still remain unsolved. These problems are requirements for a still higher contrast and stabler temperature characteristics. More specifically, the contrast of the GH type liquid crystal device mainly depends on a dichroic ratio of the dye added, a dye concentration, a cell thickness, and the like. For this reason, the dye added to the liquid crystal must satisfy the following requirements:

(1) it must have a high dichroic ratio;
(2) it must have a maximum absorption wavelength range which coincides with a maximum emission wavelength range of emission spectral characteristics of a light source;
(3) it must have a high solubility with respect to a liquid crystal as a "host"; and
(4) it must have a high absorbency.

Since it is difficult to find a dye which can satisfy all the above requirements, an improvement in contrast of the liquid crystal device is limited. Since fluctuation of the dye molecules changes depending on temperature, a transmittance in the OFF state is unstable, and hence, the temperature stability of contrast cannot be improved, resulting in a very narrow operation temperature range.

As a third method for solving the above problem, some devices for controlling ON/OFF state adopt an electrically controlled birefringence type liquid crystal device. In this liquid crystal device, a nematic liquid crystal (Np liquid crystal) having positive dielectric anisotropy $\Delta\epsilon$ is sealed between a pair of substrates which are respectively subjected to a homogeneous aligning treatment in directions parallel to each other, and polarizing plates are respectively arranged on the outer surfaces of the pair of substrates. The polarizing axes of these polarizing plates are perpendicular to each other, and intersect the direction of the homogeneous aligning treatment of the substrates at 45°.

When an electric field is applied to the liquid crystal device, liquid crystal molecules are homeotropically aligned with respect to the substrates and the polarizing axes of the pair of polarizing plates are perpendicular to each other. Therefore, no light is transmitted therethrough, and an OFF state is established. When the electric field is turned off, the liquid crystal molecules tend to return to a homogeneous alignment state due to their alignment power, and the liquid crystal device transmits light in a tilt alignment state during a transition from the homeotropic alignment state to the homogeneous alignment state, thereby establishing the ON state.

Liquid crystal optical printers using the liquid crystal device are disclosed in U.S. Pat. Nos. 4,569,574, 4,595,259, and Japanese Patent Disclosure (Kokai) Nos. 56-115277, 59-119330, and 60-182421. In the liquid crystal device, since the liquid crystal molecules need only behave between the tilt alignment state and the homeotropic alignment state with respect to the substrates during the ON and OFF operations, their operation angle can be small. In addition, since the liquid crystal molecules need not be twist-aligned, the device can have a considerably higher response speed than the TN type liquid crystal device using an Np liquid crystal. However, in the liquid crystal device, a power for obliquely aligning the liquid crystal molecules is defined only by the alignment power acting between the substrates and the liquid crystal molecules. For this reason, a response speed during the transition from the OFF state to the ON state is still low. The operating speed of the liquid crystal molecules depends on the viscosity of the liquid crystal, and the viscosity depends on a temperature. Therefore, the liquid crystal device has poor temperature stability.

In order to solve the above problem, another technique has been proposed. In this technique, a liquid crystal composition exhibiting a dielectric dispersion phenomenon is used for the above-mentioned electrically controlled birefringence type liquid crystal device, and is turned on/off upon selective application of electric fields of two frequencies, i.e., high and low frequencies.

Liquid crystal optical printers using the liquid crystal device are disclosed in Japanese Patent Disclosure (Kokai) Nos. 58-176620 and 61-87136. In the liquid crystal device used in these printers, the liquid crystal molecules behave upon application of the electric field when the liquid crystal molecules are homeotropically aligned and when they are obliquely aligned Therefore, the device can have a considerably high response speed. In addition, the liquid crystal optical printer using the liquid crystal device has a possibility of high-speed printing.

The printing speed of the liquid crystal optical printer depends on a time during which a charge for one point on a uniformly charged photosensitive drum is discharged by light transmitted through micro shutters provided to the liquid crystal device. When an image for one page of a paper sheet is formed, a large number of dot lines must be written. Therefore, if a time required for writing one dot line is long, it requires a very long time to write an image for one page, and high-speed printing cannot be performed. On a portion corresponding to one dot line on the photosensitive drum, a surface charge is discharged when a product of a radiation time and the intensity of light transmitted through the micro shutter array of the liquid crystal device and radiated on the photosensitive drum reaches a predetermined value. The photosensitive drum senses light depending on the amount of light transmitted through the individual micro shutters For this reason, if the intensity of light transmitted through each microshutter is low, light radiation for a long time per dot line is necessary. The amount of light depends on the response speed of the micro shutters More specifically, if a response speed is low when the micro shutters are switched from the OFF state to the ON state and/or are switched from the ON state to the OFF state, a sufficiently opened ON state or OFF state cannot be established within a predetermined period of time for turning on/off the micro shutter once, and a transmitted light intensity is low. Even though the sufficiently opened ON state or OFF state is established, a duration during which the established state is maintained is short, resulting in a small amount of light.

The response speed changes in accordance with the viscosity of the liquid crystal material and dielectric anisotropy $\Delta\epsilon$, and the like. The viscosity and the value of dielectric anisotropy $\Delta\epsilon$ have temperature dependency. For this reason, since the response speed changes in accordance with a change in temperature, it has poor temperature stability. More specifically, the viscosity of the liquid crystal material is decreased as the temperature is increased. As a result, the response speed is increased. Crossover frequency fc at which dielectric anisotropy $\Delta\epsilon$ in a dielectric dispersion phenomenon of the liquid crystal material becomes zero is increased upon an increase in temperature, and absolute values of dielectric anisotropy $\Delta\epsilon L$ in the low-frequency electric field and dielectric anisotropy $\Delta\epsilon H$ in the high-frequency electric field are noticeably changed. Upon an increase in temperature, when crossover frequency fc comes closer to predetermined high frequency fH, the absolute value of $\Delta\epsilon H$ approximates "0", and a response property with respect to the high-frequency electric field is considerably degraded. When fc exceeds fH, it is impossible to drive the liquid crystal by the two-frequency addressing scheme. When the temperature is decreased and crossover frequency fc is decreased, the absolute value of dielectric anisotropy $\Delta\epsilon L$ in the low-frequency electric field is decreased, and the absolute value of dielectric anisotropy $\Delta\epsilon H$ in the high-frequency electric field is increased. For this reason, response characteristics upon application of fL or fH are changed. In particular, if $|\Delta\epsilon H|$ is large and/or if, $|\Delta\epsilon L|/|\Delta\epsilon H|$ is small, the hysteresis effect caused by high-frequency electric field FH causes a large influence and considerably degrades response characteristics. If the influence of the high-frequency hysteresis effect noticeably appears, since a large force to align the liquid crystal molecules to be parallel to the substrates acts on the liquid crystal molecules, the liquid crystal molecules cannot be homeotropically aligned with respect to the substrates upon application of the low-frequency electric field within a short period of time. Therefore, light is incompletely shielded in the OFF state. If the ON state is to be obtained upon application of the high-frequency electric field, tilt alignment in the normal ON state cannot be obtained. The liquid crystal molecules are to be aligned in the homogeneous direction with respect to the substrates, so that the transmittance in the ON state is decreased. If this state continues, the liquid crystal molecules can no longer respond to the electric field at last.

As described above, the response characteristics of the conventional liquid crystal optical device considerably change upon changes in temperature, and an amount of light also a changes. Therefore, the conventional device has poor temperature stability, and has an insufficient amount of light.

SUMMARY OF THE INVENTION

The present invention has been made in consideration of the above situation, and has as its object to provide a drive method of a liquid crystal optical device in which a change in response characteristics upon change in temperature is suppressed to increase an amount of transmitted light in the ON state and contrast is improved.

In order to achieve the above object of the present invention, there is provided a drive method of a liquid crystal optical device comprising:

providing a pair of substrates having electrodes which at least partially face each other and are formed on opposing inner surfaces;

providing a liquid crystal material which is sealed between the pair of substrates, whose molecules are initially aligned in directions parallel to each other in accordance with an aligning treatment subjected to the inner surfaces of the substrates, and an alignment state of the molecules being controlled by an electric field applied across the electrodes, the liquid crystal material having a crossover frequency at which its dielectric anisotropy becomes "0", and exhibiting a dielectric dispersion phenomenon wherein the polarity of the dielectric anisotropy is inverted in an electric field of a frequency lower than the crossover frequency and in an electric field of a frequency higher than the crossover frequency;

providing a pair of polarizing means arranged outside the liquid crystal material, polarizing axes of the polarizing means being substantially perpendicular to each other, and at least one polarizing axis intersecting the direction of the aligning treatment of the inner surfaces of the pair of substrates at an angle falling within the range of 35° to 45°; and selectively applying ON and OFF electric fields to the liquid crystal material thereby controlling the liquid crystal device in the ON state and OFF state, the ON electric field having at least an electric field for driving the liquid crystal molecules and a non-electric field, for obliquely aligning the liquid crystal molecules to obtain an ON state of the device, the OFF electric field aligning the liquid crystal molecules homeotropically with respect to the substrates to obtain an OFF state of the device.

In this manner, the liquid crystal optical device driven by the drive method of the present invention has a non-electric field state in the ON electric field for obliquely aligning the liquid crystal molecules to obtain the ON state. Therefore, a ratio of the electric field application time for driving the liquid crystal to a unit operation time for driving the liquid crystal optical device in the ON and OFF states can be reduced, and the influence of the hysteresis effect due to the electric field can be greatly reduced. As a result, a change in response characteristics with respect to a change in temperature can be suppressed, and the temperature stability of the operation of the liquid crystal optical device can be improved. In a procedure wherein the liquid crystal molecules which have been homeotropically aligned upon application of the ON electric field are obliquely aligned, a free state wherein no abrupt force due to the non-electric field acts on the liquid crystal molecule is provided after a state wherein the abrupt force for obliquely aligning the liquid crystal molecules due to the ON electric field acts on the liquid crystal molecules. Therefore, the liquid crystal molecules can be uniformly, obliquely aligned. For this reason, when the liquid crystal molecules are obliquely aligned to obtain an ON state, the transmitted light intensity is increased, the amount of transmitted light is increased, and the contrast can be improved. As a result, according to the drive method of the present invention, the temperature stability of the operation of the liquid crystal optical device can be improved, the amount of transmitted light can be increased, and the contrast can be improved.

The above-mentioned hysteresis effect of the ON electric field causes a large influence as the frequency of the ON electric field is higher. Therefore, the drive method of the present invention is particularly effective when the ON electric field has a frequency higher than the crossover frequency.

The drive method of the present invention positively utilizes the hysteresis effect of the OFF or ON electric field wherein the effect of the electric field applied to the liquid crystal material still remains after the electric field is turned off. More specifically, after the liquid crystal molecules are substantially obliquely aligned upon application of the ON electric field, a holding electric field for holding the state is applied to the liquid crystal material. As the holding electric field, an electric field consisting of repetitions of a non-electric field, or the non-electric field and a low- or high-frequency electric field in a short period of time, or the non-electric field and a superimposed electric field of the low- and high-frequency electric fields, is used. When the holding electric field is applied to the liquid crystal material, the liquid crystal molecules maintain the obliquely aligned state due to the above-mentioned hysteresis effect. In this case, the ON electric field is applied to the liquid crystal material within a period for obtaining a maximum transmittance of the liquid crystal optical device and/or a period of time longer than $\frac{1}{2}$ a time for obtaining the ON state. When a period in which no electric field is applied to the liquid crystal material is provided, the ratio of the ON electric field application time can be reduced. Therefore, the influence of the above hysteresis effect cannot noticeably appear as required, and the temperature stability of the response characteristics can be improved. Since the electric field application time can be shortened, power consumption can be reduced.

In the drive method of the present invention, a plurality of microshutters arranged in a matrix are time-divisionally driven. In this case, the non-electric field state can be obtained by applying voltages having an identical frequency and an identical phase across the opposing electrodes. According to the drive method of the present invention, when the microshutters are time-divisionally driven, the liquid crystal optical device has excellent temperature stability of the response characteristics, a large amount of transmitted light, and high contrast.

In the drive method of the present invention, in order to increase the amount of transmitted light of the liquid crystal optical device, a holding electric field for maintaining the shutter ON state even in a part of a non-selection period in the time-divisional drive method is applied to the liquid crystal material. As the holding electric field, an electric field as an arbitrary combination of a non-electric field, the non-electric field and a superimposed electric field of high- and low-electric fields, or the non-electric field and the low-frequency electric field is used. In this case, since a time for maintaining the shutter ON state is longer than a selection period, the amount of light is increased. In the drive method of the present invention, the ON electric field is applied several times, and the OFF electric field for completely homeotropically aligning the liquid crystal molecules with respect to the substrates is applied between adjacent ON electric fields, so that the liquid crystal optical device is set in the ON and OFF states several times during one write period. In this case, since the OFF electric field is repetitively applied to the liquid crystal material at short time intervals, the influence of the hysteresis effect due to the ON electric field can be further suppressed, and the temperature stability can be enhanced. In this case, if a non-electric field period is provided, in which no electric field is applied to the liquid crystal, the temperature stability can be further enhanced. Since a total time of the ON state can be prolonged, the amount of light can thus be increased.

BRIEF DESCRIPTION OF THE DRAWINGS

FIGS. 5A and 5B are graphs of operation characteristics when an electric field application state is switched to a non-electric field application state in the liquid crystal optical device shown in FIG. 1, in which FIG. 5B is a partially enlarged view of FIG. 5A;

FIG. 6 is a graph showing spectral characteristics which are changed in accordance with a tilt angle of liquid crystal molecules in the liquid crystal optical device shown in FIG. 1;

FIG. 7 is a graph showing the spectral characteristics in the ON and OFF states when the liquid crystal optical device shown in FIG. 1 is driven upon repetitive application of an electric field and a non-electric field;

FIG. 11 is a graph showing the spectral characteristics when the angle defined by the aligning treatment direction and the polarizing axis of the polarizing plate is varied in the liquid crystal optical device shown in FIG. 1 in which a cell thickness is set to be 4.15 $\mu$m;

FIG. 12 is a graph showing the spectral characteristics when the angle defined by the aligning treatment direction and the polarizing axis of the polarizing plate is varied in the liquid crystal optical device shown in FIG. 1 in which a cell thickness is set to be 4.68 $\mu$m;

FIGS. 13A and 13B are graphs showing response characteristics at respective temperatures when the liquid crystal optical device shown in FIG. 1 is driven by the basic two-frequency addressing scheme;

FIG. 14 is an explanatory view for defining the response characteristics of the liquid crystal optical device;

FIG. 29 is a block diagram showing a drive circuit of the liquid crystal shutter shown in FIG. 25;

FIGS. 35A to 35J are waveform charts showing a second time-divisional drive method according to the second embodiment of the present invention;

FIGS. 38A to 38I are waveform charts showing a drive method as a first modification of the second time-divisional drive method shown in FIGS. 35A to 35J;

FIGS. 39A, 39B, 39C, and 39D are graphs showing the response characteristics corresponding to respective electric fields applied to the liquid crystal material when the liquid crystal shutter is driven by the drive method shown in FIGS. 38A to 38I;

FIGS. 40A to 40I are waveform charts showing a drive method as a second modification of the second time-divisional drive method shown in FIGS. 35A to 35J;

FIGS. 43A to 43I are waveform charts showing a time-divisional drive method according to a third embodiment of the present invention;

FIGS. 45A, 45B, 45C, and 45D are graphs showing the response characteristics at respective temperatures when the liquid crystal shutter is driven by the drive method shown in FIGS. 43A to 43I wherein non-electric field period T5 is set to be 0.1 msec;

FIGS. 46A, 46B, and 46C are graphs showing the response characteristics at respective temperatures when the liquid crystal shutter is driven by the drive method shown in FIGS. 43A to 43I wherein periods T6 and T7 in which a superimposed electric field or a low-frequency electric field is applied are respectively set to be 0.2 msec;

FIG. 47 is a graph showing the response characteristics when the liquid crystal shutter is driven by the drive method shown in FIGS. 43A to 43I wherein after the OFF electric field is continuously applied, one ON electric field is applied;

FIG. 49 is a graph showing the response characteristics when first period T3 in the period in which the high-frequency electric field is applied is set to be 0.1 msec, next period T4 is set to be 0.4 msec, and period T5 of the non-electric field is set to be 0.2 msec in the drive method shown in FIGS. 43A to 43I;

FIGS. 50A, 50B, 50C, and 50D are graphs showing the response characteristics at respective temperatures when the liquid crystal shutter is driven by the drive method shown in FIGS. 43A to 43I, wherein a total application period of the high-frequency electric field is set to be 0.4 msec;

FIGS. 52A to 52I are waveform charts showing a time-divisional drive method according to a fourth embodiment of the present invention;

FIG. 53 is a graph showing frequency dependency of a dielectric anisotropy of liquid crystal material (2);

FIG. 54 is a graph showing a transmitted light intensity with respect to the tilt angle of the liquid crystal molecules when liquid crystal material (1) is used;

FIG. 55 is a graph showing a transmitted light intensity with respect to the tilt angle of the liquid crystal molecules when liquid crystal material (2) is used;

FIGS. 56A, 56B, and 56C are graphs showing the response characteristics at respective temperatures when liquid crystal shutter 1 using liquid crystal material (1) is driven by the drive method shown in FIGS. 52A to 52I;

FIG. 58 is a graph showing the temperature characteristics when liquid crystal shutter 2 using liquid crystal material (2) is driven by the driven method shown in FIGS. 52A to 52I, wherein high-frequency electric field application period T3 is set to be 0.25 msec;

FIG. 59 is a graph showing the temperature characteristics when liquid crystal shutter 2 using liquid crystal material (2) is driven by the driven method shown in FIGS. 52A to 52I, wherein high-frequency electric field application period T3 is set to be 0.2 msec;

FIG. 66 is a graph showing the temperature characteristics when the liquid crystal shutter is driven by the drive method shown in FIGS. 65A to 65I;

FIGS. 67A to 67I are waveform charts showing a time-divisional drive method as a second modification of the fourth embodiment of the present invention;

FIGS. 68A and 68B are graphs showing the response characteristics in the ON and OFF states when the liquid crystal shutter is driven by the drive method shown in FIGS. 67A to 67I;

FIG. 69 is a graph showing the temperature characteristics when the liquid crystal shutter is driven by the drive method shown in FIGS. 67A to 67I;

FIGS. 74A, 74B, 74C, and 74D are graphs showing the response characteristics at respective temperatures when the liquid crystal shutter is driven by the drive method shown in FIGS. 70A to 70J, wherein high-frequency application period T3 is set to be 0.35 msec and low-frequency application period T4 is set to be 0.3 msec;

FIGS. 75A, 75B, 75C, and 75D are graphs showing the response characteristics at respective temperatures when the liquid crystal shutter is driven by the drive method shown in FIGS. 70A to 70J, wherein high-frequency application period T3 is set to be 0.3 msec and low-frequency application period T4 is set to be 0.4 msec;

FIGS. 79A, 79B, 79C, and 79D are graphs showing the response characteristics when the liquid crystal shutter is driven by the drive method shown in FIGS. 43A to 43I;

FIGS. 80A to 80I are waveform charts showing a drive method as a first modification of the fifth embodiment of the present invention;

FIGS. 82A to 82I are waveform charts showing a drive method as a second modification of the fifth embodiment of the present invention.

DETAILED DESCRIPTION OF THE PREFERRED EMBODIMENTS

Embodiments of the present invention will be described hereinafter in the following order with reference to the accompanying drawings: (A) the basic structure and the operation principle of a liquid crystal optical device driven by a drive method according to the present invention; (B) a drive method of the liquid crystal optical device; (C) the basic structure of a shutter array for, e.g., a liquid crystal printer driven by the liquid crystal drive method according to the present invention; and (D) a method for driving the shutter array.

(A) A basic structure and an operation of a liquid crystal optical device of the present invention will now be described.

Figure 1:
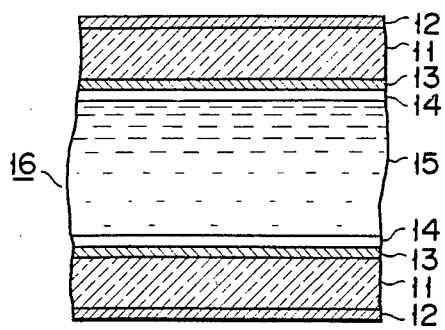
FIG. 1 is a schematic view showing a basic structure of a liquid crystal optical device used in a drive method of the present invention.

In FIG. 1, reference numeral 11 denotes substrates which are arranged to be separated at a predetermined distance. Polarizing plates 12 are stacked on the outer surfaces of substrates 11, and transparent electrodes 13 and alignment films 14 are stacked on the inner surfaces thereof. Liquid crystal material which is driven by the two-frequency addressing scheme (hereinafter, two-frequency addressing liquid crystal material) 15 forming an optical shutter together with electrodes 13 is sealed to be sandwiched between substrates 11.

Figure 2:
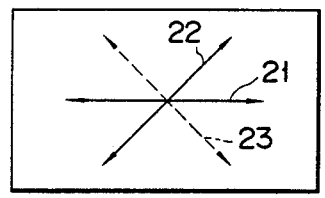
FIG. 2 is an explanatory view showing the relationship between an aligning treatment direction and polarizing axes of polarizing plates in the liquid crystal optical device shown in FIG. 1.

FIG. 2 shows the relationship between the alignment direction of liquid crystal molecules of liquid crystal optical device 16 having the above structure and the directions of polarizing axes of polarizing plates 12. In FIG. 2, reference numeral 21 denotes an alignment direction of liquid crystal molecules; 22, a direction of a transmission axis (or absorption axis) of upper polarizing plate 12; and 23, a direction of a transmission axis (or absorption axis) of lower polarizing plate 12. More specifically, two-frequency addressing liquid crystal material 15 is sealed in a liquid crystal cell subjected to a homogeneous aligning treatment, so that liquid crystal molecules align homogeneously. The polarizing axis (transmission axis or absorption axis) of at least one polarizing plate 12 is set to intersect the alignment direction of the liquid crystal molecules at 45°, and the polarizing axes of upper and lower polarizing plates 12 are set to be perpendicular to each other. With this arrangement, an electrically controlled birefringence type liquid crystal optical device can be obtained.

Figure 3:
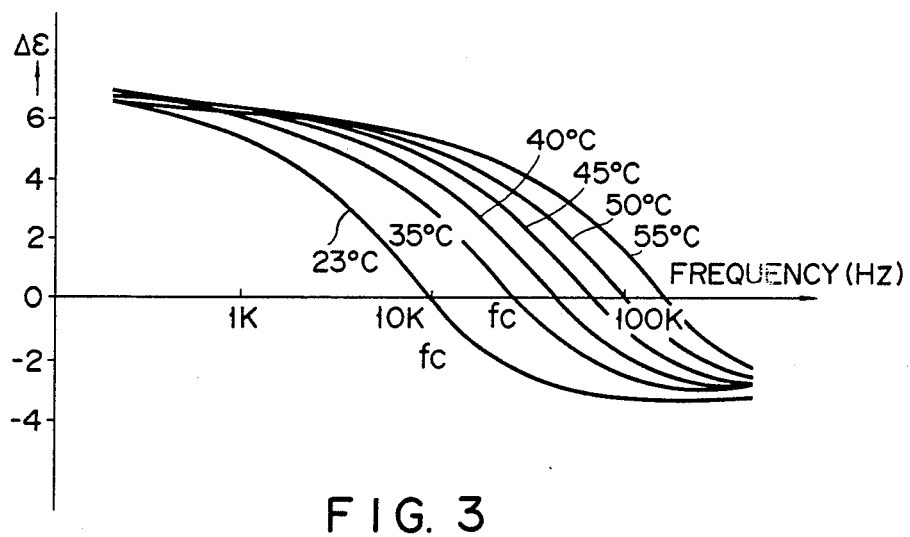
FIG. 3 is a graph showing frequency dependency of a dielectric anisotropy of a liquid crystal material (1) used in the liquid crystal optical device of the present invention.

Liquid crystal material 15 has crossover frequency fc at which dielectric anisotropy $\Delta\epsilon$ becomes "0", as shown in FIG. 3 representing a dielectric dispersion phenomenon of liquid crystal material (1) (to be described later), and exhibits a positive dielectric anisotropy with respect to low-frequency electric field FL having a frequency lower than frequency fc and exhibits a negative dielectric anisotropy with respect to high-frequency electric field FH having a frequency higher than frequency fc.

Transmitted light intensity I in liquid crystal optical device 16 can be obtained by the following equation (1):

$$I = I_0 \sin^2 2\theta \sin^2(\pi \cdot \Delta bd \cdot d/\lambda) \quad (1)$$

where $I_0$: intensity of light determined by transmittance of a pair of polarizing plates whose polarizing axes are arranged to be parallel to each other $\theta$: angle formed by optical axis of liquid crystal in an initial alignment state and polarizing axis of polarizing plate $\Delta nb$: birefringence depending on angle $\phi$ formed by normal to substrate surface and optical axis of liquid crystal $\lambda$: wavelength of incident light d: thickness of liquid crystal layer Birefringence $\Delta nb$ changes in accordance with tilt angle $\phi$ of liquid crystal molecules. However, this can be expressed by the following equations (2), (3), and (4) if refractive index $n//$ in a direction parallel to the optical axis of the liquid crystal and refractive index $n\perp$ in a direction perpendicular to the optical axis are known:

$$\Delta nb = ne - no \quad (2)$$

$$ne = (n\|\, n\perp)/\sqrt{n^2\| \cos^2\phi + n^2\perp \sin^2\phi} \quad (3)$$

$$no = n\perp \quad (4)$$

where
ne: refractive index of extraordinary light no: refractive index of ordinary light.

Therefore, the transmitted light intensity of the electrically controlled birefringence type liquid crystal optical device is changed in accordance with product $\Delta nb \cdot d$ of birefringence $\Delta nb$ and thickness d ($\mu m$) of the liquid crystal layer, and $\Delta nb$ is changed in accordance with tilt angle $\phi$ of liquid crystal molecules. Tilt angle $\phi$ can be given by the above equations (2), (3), and (4).

Spectral characteristics in an initial alignment state were calculated on the basis of equation (1) when a liquid crystal material having characteristics shown in Table 1 below was used in the liquid crystal optical device shown in FIG. 1 and thickness d of the liquid crystal layer was set to be 5.09 $\mu m$. In this case, optical anisotropy $\Delta na = n// - n\perp$, and the refractive index is a measurement value at a wavelength of 589 nm and is not changed upon a change in wavelengths

TABLE 1

| | (liquid crystal material (1)) | | |
|---|---|---|---|
| NI point | Viscosity | Refractive Index | |
| 144.1° C. | 96 cp at 25° C. | n‖ = 1.632 n⊥ = 1.496 | (589 nm at 23° C.) |

Figure 4A:
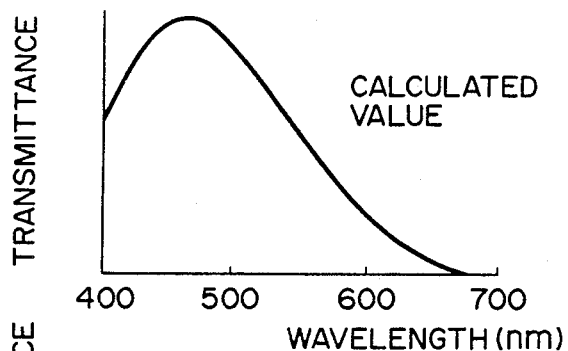
FIGS. 4A and 4B are graphs showing spectral characteristics in an initial alignment state of the liquid crystal optical device shown in FIG. 1, which are obtained by theoretical calculations and actual measurement.
Figure 4B:
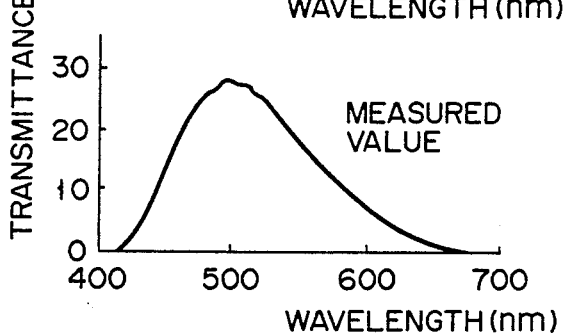

FIG. 4A shows the calculation result. FIG. 4B shows the result when the above-mentioned liquid crystal optical device was manufactured in practice and spectral characteristics in the initial alignment state were actually measured. In this case, a UV cut filter for shielding light having a wavelength of 375 nm or lower is provided to the polarizing plate. The calculation data and the measurement data shown in FIGS. 4A and 4B coincide well with each other in consideration of conditions upon calculation and measurement.

If this initial alignment state is defined as a shutter ON state, the spectral characteristics are considerably changed depending on "$\Delta na \cdot d$", and flat spectral characteristics cannot be provided. Therefore, it is not preferable for a shutter with respect to a white light source.

The operation characteristics of the above-mentioned electrically controlled birefringence type liquid crystal optical device were examined A nematic liquid crystal having characteristics shown in Table 2 below was sealed in a cell having a cell thickness of 5.10 $\mu m$, and its operation characteristics were measured.

TABLE 2

| NI point | Viscosity | Refractive Index | |
|---|---|---|---|
| 58.3° C. | 15.7 cp at 20° C. | n‖ = 1.706 n⊥ = 1.512 | (589 nm at 20° C.) |

Figure 5A:
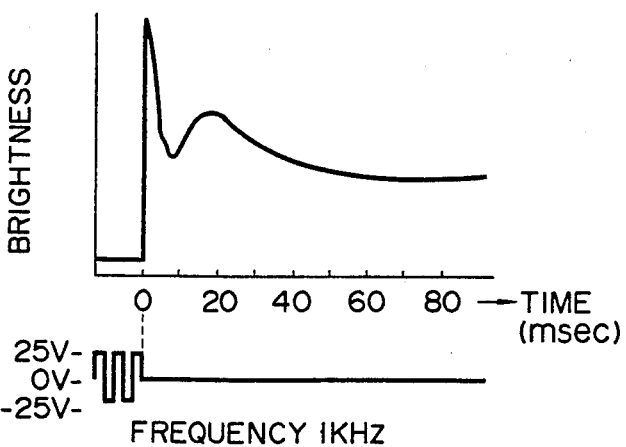

FIG. 5A shows a transmitted light intensity when a 1-kHz AC electric field is applied and then a non-electric field state wherein no electric field is applied is set. A fluorescent lamp having an emission peak wavelength of 543 nm and a half-width of about 20 nm was used as a light source for measurement. As shown in FIG. 5A, when an electric field is kept applied, liquid crystal molecules are homeotropically aligned with respect to glass substrates 11, and the transmitted light intensity is low. In the non-electric field state, the liquid crystal molecules are gradually tilted by an initial alignment power, and at last, are homogeneously aligned.

Figure 5B:
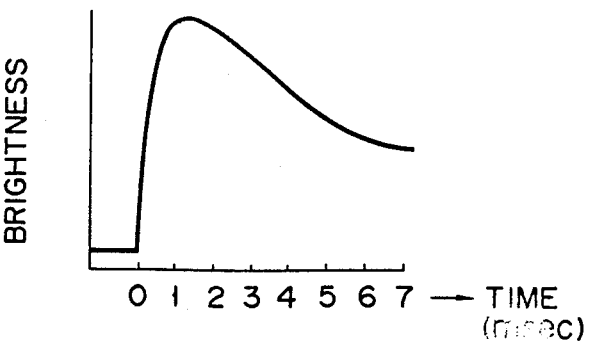

At this time, the transmitted light intensity is returned to a transmission intensity in the initial alignment state in about 60 msec while exhibiting two peaks along the time base. FIG. 5B shows the expanded time base near the first peak of FIG. 5A. As can be seen from FIG. 5B, about 1 msec is required to reach the first peak.

The spectral characteristics at respective times shown in FIGS. 5A and 5B can be calculated using above equations (1) to (4). The spectral characteristics depend on value $\Delta nb$ in accordance with tilt angle $\phi$ of liquid crystal molecules during a transition period from when homeotropic alignment is established upon application of an electric field until homogeneous alignment is established due to natural relaxation FIG. 6 shows the calculation result of the spectral characteristics. In FIG. 6, the spectral characteristics are calculated from "$\phi = 20°$" to "$\phi = 45°$" for every 5°. Curve (1) shows a case of "$\phi = 20°$ and $\Delta nb = 0.019$"; (2), a case of "$\phi = 25°$ and $\Delta nb = 0.030$"; (3), a case of "$\phi = 30°$ and $\Delta nb = 0.042$"; (4), a case of "$\phi = 35°$ and $\Delta nb = 0.056$"; (5), a case of "$\phi = 40°$ and $\Delta nb = 0.072$"; and (6), a case of "$\phi = 45°$ and $\Delta nb = 0.088$". Upon application of the electric field, liquid crystal molecules are homeotropically aligned, and "$\Delta nb = 0$". Therefore, the transmitted light intensity is "0", and display is perfectly black. From the spectral characteristics of FIG. 6, since curve (4) has the highest average transmittance, it can be understood that curve (4) corresponds to the above-mentioned first peak. The first peak is exhibited when the liquid crystal molecules are tilted at about 35° with respect to the normal to the substrate surface. In a state wherein the liquid crystal molecules are tilted so as to exhibit the first peak of the transmitted light intensity, relatively flat spectral characteristics can be obtained, and this state can be utilized for a shutter for controlling ON/OFF states of white light FIG. 7 shows measurement data of spectral characteristic curve (a) when the above-mentioned liquid crystal cell is alternately driven for every 4 msec in an electric field application state at a frequency of 1 kHz and a voltage of 25 V and in a non-electric field state, and of spectral characteristic curve (b) when an electric field is continuously applied. A transmittance when the electric field is continuously applied is 1% or less, and is 11 to 14% when the electric field application state and the non-electric field state are repeated. A change width in transmittance with respect to a change in wavelength is 3% or less. Therefore, the liquid crystal cell has substantially flat spectral characteristics, and can be used as a shutter.

However, in the liquid crystal shutter using natural relaxation, a time required until the light transmittance reaches a peak value, i.e., a response time is about 1 msec. This response time depends on the viscosity, the refractive index, and splay elastic modulus $K//$. These constants are not so different in various types of liquid crystal materials. Therefore, in practice, it is difficult to drive the shutter with a response time of 1 msec or less.

The above-mentioned liquid crystal cell is used as an optical control device for, e.g., an electrophotographic printer. Since the optical control device serves as an optical shutter corresponding to small dots (e.g., 0.1 mm × 0.1 mm square or less) for printing a character and the like, a shutter ON operation for allowing light to transmit therethrough and a shutter OFF operation for shielding light must be switched at very high speed. Therefore, such a requirement for the high-speed shutter is not yet satisfied, and the above cell cannot be used for the high-speed shutter which requires a response time of 1 msec or less.

When two-frequency addressing liquid crystal material 15 is sealed in liquid crystal cell 16 shown in FIG. 1, and an AC electric field having a frequency lower than crossover frequency fc, e.g., 1 kHz (higher than a threshold voltage, for example, a terminal voltage is ±25 V) is applied, liquid crystal molecules are homeotropically aligned with respect to the substrate surface, thus establishing a shutter OFF state. When an AC electric field of a frequency higher than crossover frequency fc is applied in this state, the liquid crystal molecules are to return to the initial alignment state at high speed due to the electric field. At this time, birefringence $\Delta nb$ is gradually changed in accordance with tilt angle $\phi$ of liquid crystal molecules, and reaches the above-mentioned first peak near predetermined "$\Delta nb.d$", and a bright state exhibiting relatively flat spectral characteristics is established. This state can be used as a shutter ON state, and response characteristics can be improved.

Figure 8:
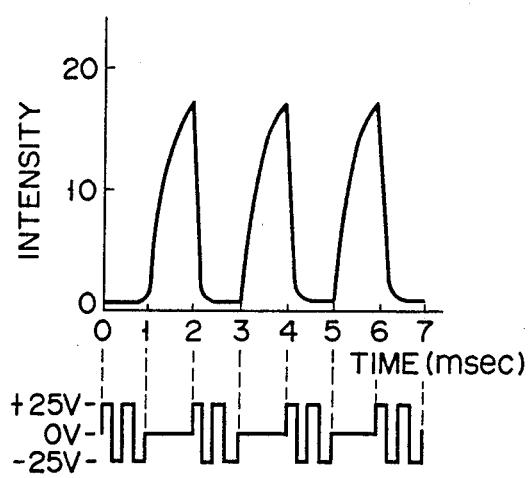
FIG. 8 is a graph showing response characteristics when a two-frequency addressing liquid crystal is used in the liquid crystal optical device shown in FIG. 1 and the optical device is driven upon repetitive application of an electric field and a non-electric field.
Figure 9:
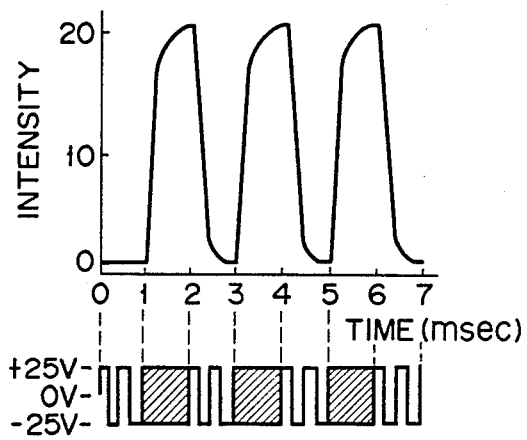
FIG. 9 is a graph showing the response characteristics when a two-frequency addressing liquid crystal is used in the liquid crystal optical device shown in FIG. 1 and the optical device is driven by a basic two-frequency addressing scheme.

The above liquid crystal optical device is driven by the two-frequency addressing scheme and is operated as follows. FIGS. 8 and 9 show an optical operation when two-frequency addressing liquid crystal material 1 shown in Table 1 is sealed in the liquid crystal cell having gap (liquid crystal layer thickness) d of 4.27 μm to prepare the liquid crystal shutter shown in FIG. 1. FIG. 8 is presented for the sake of comparison, and shows a case wherein a sawtooth wave in which 25 V AC electric field FL of a frequency of 5 kHz lower than crossover frequency fc and a non-electric field alternately appear is applied to the liquid crystal shutter. In the driving scheme shown in FIG. 8, the shutter OFF state is established when the electric field is applied, and the shutter is gradually opened in the non-electric field state. In this case, since natural relaxation of the homeotropic alignment power of the electric field of the liquid crystal molecules is utilized by setting the non-electric field state after application of the electric field, the response property of the shutter ON state is poor.

FIG. 9 shows the shutter operation when low-frequency AC electric field FL of a frequency of 5 kHz (25 V) and high-frequency AC electric field FL of a frequency of 200 kHz (25 V) are alternately applied to the liquid crystal shutter In this case, since a homogeneous alignment power is applied to the liquid crystal molecules due to the high-frequency AC electric field, a maximum brightness can be obtained within 1 msec. The spectral characteristics in the shutter ON state are substantially the same as those of the nematic liquid crystal shown in FIG. 7. The transmittance in the shutter OFF state is about 1%, and the transmittance in the shutter ON state is 20% or higher. Therefore, this liquid crystal shutter can be operated as a shutter having excellent contrast. In the liquid crystal optical device shown in FIG. 9, the liquid crystal molecules are homeotropically aligned upon application of an electric field having a frequency lower than crossover frequency fc to turn off the shutter. Then, the liquid crystal molecules are aligned upon application of the electric field having a frequency higher than crossover frequency fc to be inclined at a predetermined tilt angle allowing the maximum transmittance, thus turning on the shutter. With this driving scheme, when liquid crystal molecules are obliquely aligned, they are driven by the electric field, and the shutter ON operation can be performed at high speed. In FIG. 9, a case is exemplified wherein the shutter is driven at an effective voltage of 25 V. When a higher drive voltage is applied, the shutter operation can be performed at higher speed.

The basic structure of the liquid crystal optical device of the present invention described is not limited to that shown in FIGS. 1 and 2. For example, an aligning treatment direction of the aligning films formed on substrates 11 and/or an angle defined by the aligning treatment direction and the direction of the polarizing axis of the polarizing plate can be arbitrarily modified within the range of the following conditions.

Figure 10:
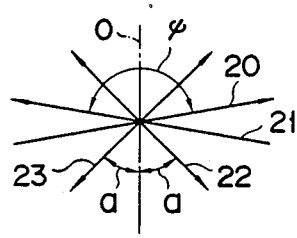
FIG. 10 is a view for explaining an allowance of an angle defined by the aligning treatment direction and the polarizing axis of the polarizing plate in the liquid crystal optical device shown in FIG. 1.

A case will be described with reference to FIGS. 1 and 10 wherein a direction of the aligning treatment is changed. One of aligning films 14 on a pair of opposing substrates is subjected to an aligning treatment in a direction indicated by arrow 20, and the other is subjected to an aligning treatment in a direction indicated by arrow 21. Aligning treatment directions 20 and 21 are determined to intersect at intersectional angle $\psi$ of 180° to 150°. Polarizing axis direction 22 of one of a pair of polarizing plates 12 and polarizing axis direction 23 of the other plate 12 are substantially perpendicular to each other, and at least polarizing axis 22 intersects bisector O of intersecting angle $\psi$ of directions 20 and 21 at angle a.

Two-frequency addressing nematic liquid crystal material 15 is filled between a pair of substrates 11, and liquid crystal molecules of this liquid crystal layer are aligned to be slightly twisted (twist angle is $180° - \psi$) in accordance with directions 20 and 21 of films 14.

When the liquid crystal optical device adopts liquid crystal material 1 described above, a rise time until the liquid crystal molecules are obliquely aligned to establish the shutter ON state and a decay time until the shutter OFF state is established are respectively about 0.2 msec, and thus a very good response property can be provided.

The transmitted light intensities in shutter ON and OFF states and the contrast (a ratio of transmitted light intensities of shutter ON and OFF states) of a liquid crystal optical device in which intersecting angle $\psi$ of directions 20 and 21 of films 14 of substrates 11 was set to be 180° (the aligning treatment directions of the aligning films are parallel to and opposite to each other) and liquid crystal optical devices in which intersecting angle $\psi$ of directions 20 and 21 was set to be 170° and 160° were measured at two atmospheric temperatures of 55° C. and 45° C. The measurement results are shown in Table 3 below. Angle $\psi$ was about 45° in this case, and a fluorescent lamp having an emission peak at a wavelength of 543 nm was used as a light source.

TABLE 3

| | | | 55° C. | | | 45° C. | | |
|---|---|---|---|---|---|---|---|---|
| | | Cell | Transmitted | | | Transmitted | | |
| | | Gap | Light Intensity | | Con- | Light Intensity | | Con- |
| No. | $\psi$ | (μm) | ON | OFF | trast | ON | OFF | trast |
| 1 | 180° | 4.68 | 42 | 0.9 | 46.7 | 37.5 | 0.9 | 41.7 |
| 2 | 170° | 4.48 | 43.5 | 0.825 | 52.7 | 38.5 | 0.875 | 44.0 |
| 3 | 160° | 4.50 | 43 | 0.7 | 61.4 | 37.5 | 0.7 | 53.6 |

$$\left(\text{Contrast} = \frac{\text{transmitted light intensity upon shutter ON}}{\text{transmitted light intensity upon shutter OFF}}\right)$$

As can be seen from Table 3, the liquid crystal molecules are aligned to be slightly twisted, so that the transmitted light intensity upon shutter ON can be increased, and the intensity of light leakage upon shutter OFF can be decreased, resulting in an improved light shielding property. Contrast between shutter ON and OFF states can also be increased. However, if becomes smaller than 150°, the twist angle of the liquid crystal molecules is increased, thus degrading the response property In addition, the contrast is also decreased. Therefore, angle ψ is preferably selected to fall within the range of 150° to 180°. In Table 3, cell gaps (a gap for filling a liquid crystal between substrates 11) of the respective liquid crystal optical devices are different from each other. The differences in cell gaps correspond to errors caused in the process of manufacture of the liquid crystal optical devices, and substantially do not influence the transmitted light intensity.

A case will be described with reference to FIGS. 10, 11, and 12 wherein angle a defined by the bisector of the intersecting angle of directions 20 and 21 of films 14 and polarizing axis 22 of one polarizing plate 12 is slightly shifted from 45°.

In this liquid crystal optical device, polarizing axes 22 and 23 of a pair of polarizing plates 12 are arranged to be perpendicular to each other. When angle ψ of aligning treatment directions of aligning-treated films 14 is determined to be 180° (parallel to and opposite to each other), polarizing axis 22 of one polarizing plate is arranged to intersect the direction at an angle falling within the range of 35° to 45°. Alternatively, when angle ψ formed by aligning treatment directions is not 180°, polarizing axis 23 is arranged to intersect bisector O of angle ψ at an angle falling in the above range.

In a case wherein liquid crystal material 1 was sealed in liquid crystal cells having the above structure and different cell thicknesses, and angle a was set at 40°, 35°, and 30°, transmittances in the initial alignment state and their response properties were as shown in Tables 4 and 5. In this case, the wavelength of light used in measurement was 543 nm and angle ψ defined by the aligning treatment directions was 180°.

TABLE 4

| No. | Cell Thickness (μm) | Angle a | Transmittance (%) |
|---|---|---|---|
| 1 | 4.15 | 45 | 3.21 |
| 2 | 4.15 | 40 | 3.14 |
| 3 | 4.15 | 35 | 2.76 |
| 4 | 4.15 | 30 | 2.50 |
| 5 | 4.68 | 45 | 16.70 |
| 6 | 4.68 | 40 | 15.55 |
| 7 | 4.68 | 35 | 14.14 |
| 8 | 4.68 | 30 | 12.89 |

TABLE 5

| No. | Angle a | Cell Thickness (μm) | 55° C. | | | 45° C. | | |
|---|---|---|---|---|---|---|---|---|
| | | | LON | LOFF | CR | LON | LOFF | CR |
| 1 | 45 | 4.15 | 44 | 0.55 | 80.0 | 38 | 0.575 | 66.1 |
| 2 | 40 | 4.15 | 44 | 0.6 | 73.3 | 38.5 | 0.6 | 64.2 |
| 3 | 35 | 4.15 | 44 | 0.575 | 76.5 | 36.0 | 0.55 | 65.5 |
| 4 | | | | | | | | |
| 5 | 45 | 4.68 | 42 | 0.9 | 46.7 | | | |
| 6 | 40 | 4.68 | 45.5 | 0.95 | 47.9 | | | |
| 7 | 35 | 4.68 | 39.5 | 0.875 | 45.1 | | | |
| 8 | 30 | 4.68 | 36.0 | 0.9 | 40.1 | | | |
| 9 | 45 | 5.19 | 43 | 0.9 | 47.8 | 37.5 | 0.9 | 41.7 |
| 10 | 40 | 5.19 | 43.5 | 0.95 | 45.8 | 38 | 0.95 | 40.0 |
| 11 | 35 | 5.19 | 42 | 0.95 | 44.2 | 35.5 | 0.9 | 39.4 |

Figure 15A:
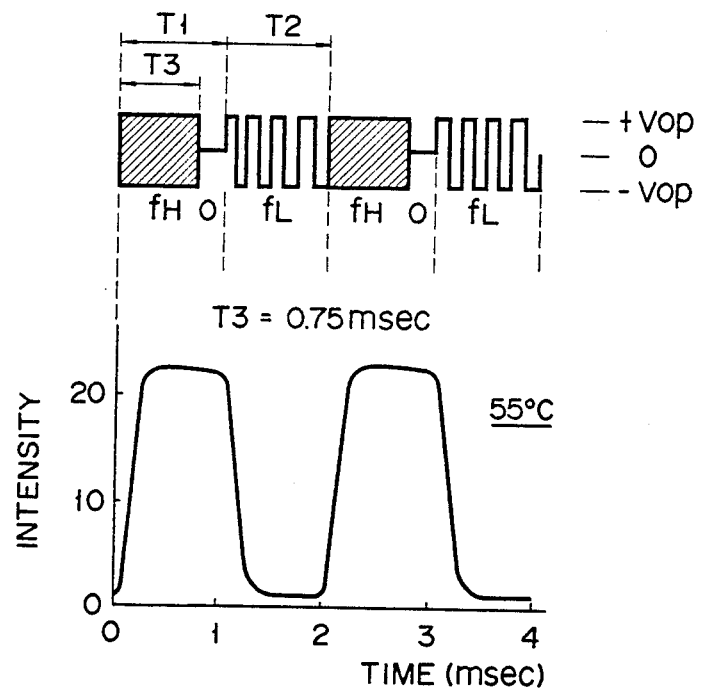
FIGS. 15A and 15B are graphs showing the response characteristics at respective temperatures when the liquid crystal optical device shown in FIG. 1 is driven by a first drive method according to a first embodiment of the present invention in which time T3 wherein a high-frequency electric field is applied is set to be 0.75 msec.

In this case, the electric field applied to the liquid crystal material has a waveform in which high-frequency electric field FH and low-frequency electric field FL alternately appear upon shutter ON/OFF operation. High-frequency electric field FH is 200 kHz, low-frequency electric field FL is 4 kHz, voltage VOP is 25 V, ON and OFF operation times T1 and T2 are respectively 1 msec, and application time T3 of electric field FH is 0.25 msec (see FIG. 15A). A time during which the transmitted light intensity reaches 0% to LON is given as rise time (ON response time) τON and a time during which the transmitted light intensity reaches 100% to LOFF is given as decay time (OFF response time) τOFF, and a ratio of transmitted light intensities LON and LOFF is given as contrast CR (see FIG. 14).

FIG. 11 shows the spectral characteristics of transmitted light in the liquid crystal optical device having a cell thickness of 4.15 μm shown in Table 4 and FIG. 12 shows the spectral characteristics of transmitted light in the liquid crystal optical device having a cell thickness of 4.68 μm.

As can be seen from Table 4 and FIGS. 11 and 12, as compared to a liquid crystal optical device in which angle a defined by polarizing axes 22 and 23 of polarizing plates 12 and aligning treatment directions 20 and 21 of the liquid crystal molecules is 45°, in the optical devices having angle a other than 45°, the spectral characteristic curve has the identical tendency. However, an device having smaller angle a has a smaller transmittance, and when angle a is 30°, the transmittance is further decreased.

However, taking the transmittance in the ON state shown in Table 5 into consideration, if angle a is 30°, brightness is decreased by 20% or more, and hence the contrast (CR=LON/LOFF) is decreased. For this reason, angle a preferably falls within the range of 35° to 45°. Within this range of angle a, if the angle defined by polarizing axes 22 and 23 of polarizing plates 12 and directions 20 and 21 is shifted from 45°, light leakage in the initial alignment state can be eliminated, and it is very advantageous for a shutter.

As is apparent from Table 5, a decrease in transmitted light intensity caused by difference in angle a in the shutter ON state is very small, and the transmitted light intensity in the shutter OFF state does not depend on angle a. The measurement values shown in these tables reveal that the temperature dependency of the characteristics in the shutter OFF state is small.

In this manner, with the liquid crystal optical device described above, if angle a defined by polarizing axes 22 and 23 of polarizing plates 12 and aligning directions 20 and 21 of the liquid crystal molecules is set to fall within the range of 45° to 35°, the contrast (CR=LON/LOFF) between the shutter ON and OFF states is high, and a transmittance of a portion to which no electric field is applied is low. Therefore, light leakage in a portion other than the shutter portion can be eliminated, and it is very advantageous for an optical shutter.

The temperature stability characteristics of the above-mentioned liquid crystal optical device was examined. For this purpose, optical response characteristics were measured when 200 kHz high-frequency AC electric field FH and 4 kHz low-frequency AC electric field FL were applied for every 1 msec to the liquid crystal shutter in the atmosphere at temperatures of 55° C. and 35° C. FIGS. 13A and 13B show the measurement results. For the response time of the shutter ON/OFF operation as shown in FIG. 14, shutter ON operation time is given as T1, a shutter OFF operation time is given as T2, a shutter ON response time is given as τON, a shutter OFF response time is given as τOFF, ON response time τON is defined between 0 and 90%, and OFF response time τOFF is defined between 100% and 10%.

As shown in FIG. 13A, in the optical response characteristics at a temperature of 55° C., ON response time τON is 0.25 msec, and OFF response time τOFF is 0.4 msec. As shown in FIG. 13B, in the optical response characteristics at a temperature of 35° C., ON response time τON is 0.6 msec and OFF response time τOFF is 0.8 msec. As can be seen from this result, when a temperature is decreased, the response characteristics of the liquid crystal optical device are considerably degraded, and a transmitted light intensity at that time is degraded.

This is because the frequency dependency of dielectric anisotropy Δε of the two-frequency addressing liquid crystal material (to be referred to as two-frequency characteristics hereinafter) is considerably changed upon changes in temperature. More specifically, in temperature dependency of the two-frequency characteristics of liquid crystal material (1) used in the liquid crystal optical device, as shown in FIG. 3, when a temperature is decreased, crossover frequency fc is decreased. Therefore, the absolute value of dielectric anisotropy ΔεH at a high frequency is increased. For this reason, a hysteresis effect due to the high-frequency electric field causes a considerable influence, and liquid crystal molecules are not responsive to application of the low-frequency electric field. As a result, upon a decrease in temperature, the response characteristics of the liquid crystal optical device are degraded. The influence of the hysteresis effect of the high-frequency electric field is also caused by the fact that the high-frequency AC electric field FH is applied longer than low-frequency AC electric field FL.

As described above, AC electric fields FH and FL are alternately applied, so that the response characteristics of the liquid crystal shutter can be greatly improved. When AC electric field FH is applied during the entire shutter ON operation time T1, a response time is prolonged at a low temperature, and the response characteristics are considerably degraded. Since the response property considerably varies upon changes in temperature, an operation temperature range is very narrow.

(B) An embodiment for improving the temperature characteristics will be explained below.

(FIRST EMBODIMENT)

Figure 15B:
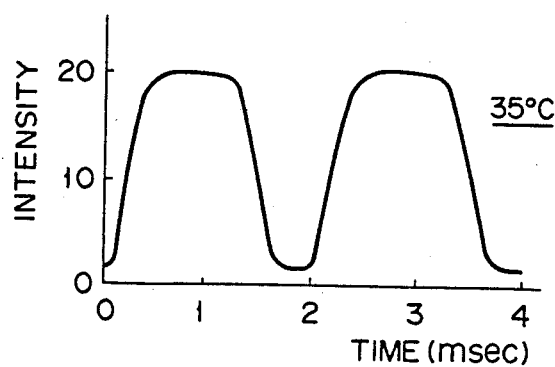

A first embodiment will now be described. In order to widen the operation temperature range of the liquid crystal optical device, high-frequency AC electric field FH is not applied during the entire shutter ON operation time but applied during a predetermined period of time within operation time T1, as shown in FIGS. 15 to 17, and no electric field is applied during the remaining time period. In this way, degradation in optical response characteristics at low temperatures can be prevented. More specifically, in order to eliminate the influence of a high-frequency hysteresis effect caused by a decrease in crossover frequency fc accompanying a decrease in temperature, a high-frequency electric field is applied during only a time period until the liquid crystal molecules are inclined at a predetermined angle at which the maximum transmittance upon shutter ON is exhibited, and an application time ratio of the high-frequency electric field is decreased, thereby realizing high-speed response.

FIGS. 15A to 17B show response characteristics at temperatures of 55° C. and 35° C. when FH application time T3 within shutter ON operation time T1 is respectively set to be 0.75 msec, 0.5 msec, and 0.25 msec if shutter ON operation time T1 and shutter OFF time T2 are respectively set to be 1 msec. In this case, no electric field is applied during the remaining time in time T1 after the lapse of FH application time T3.

Table 6 below shows response times in FIGS. 15A to 17B.

TABLE 6

| T3 | 55° C. (unit: msec) | | 35° C. | |
|---|---|---|---|---|
| | τON | τOFF | τON | τOFF |
| 0.75 | 0.25 | 0.3 | 0.45 | 0.65 |
| 0.5 | 0.25 | 0.2 | 0.35 | 0.45 |
| 0.25 | 0.25 | 0.15 | 0.25 | 0.25 |

When the above drive operation is performed, ON response time τON at a temperature of 55° C. does not largely depend on FH application time T3, and can be 0.2 to 0.25 msec, thus obtaining high-speed response property, as can be seen from Table 6. At a temperature of 35° C., the shorter fH application time T3 is, the shorter ON response time τON can become Time τON can be 0.25 to 0.45 msec. As for OFF response time τOFF, since electric field fL is applied after the non-electric field state, the influence of the hysteresis effect of fH which is applied during time T1 can be removed, and the shorter time T3 is, the better high-speed response property becomes at a temperature of either 35° C. or 55° C. As compared to a case wherein AC electric field fH is applied during the entire time T1, the response property can be improved at either temperature. Furthermore, the transmitted light intensity is not decreased at a low temperature, and good temperature characteristics can also be obtained. However, if fH application time T3 is too short, the transmitted light intensity at the high temperature has poor flatness within time T1. In practice, it is not preferred that time T3 is shorter than a time required until application of electric field fH induces the maximum transmitted light intensity. In terms of high-speed response, the application time of electric field fH is preferably half or less of time T1.

Therefore, when the drive voltage waveform of the liquid crystal shutter is selected under the above-mentioned conditions, a high-speed, high-contrast liquid crystal shutter, which is free from the influence of the high-frequency hysteresis effect, has a small temperature dependency, and can reduce power consumption since a high-frequency electric field application time is short, can be obtained.

Figure 16A:
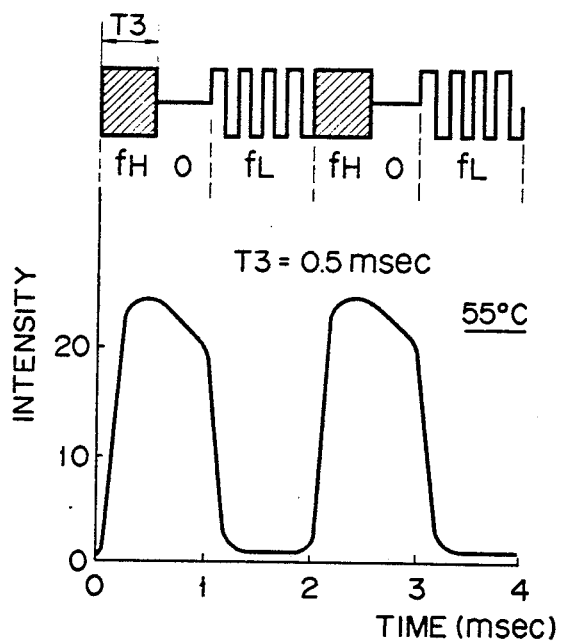
FIGS. 16A and 16B are graphs showing the response characteristics at respective temperatures when the liquid crystal optical device shown in FIG. 1 is driven by the first drive method according to the first embodiment of the present invention in which time T3 wherein a high-frequency electric field is applied is set to be 0.5 msec.
Figure 16B:
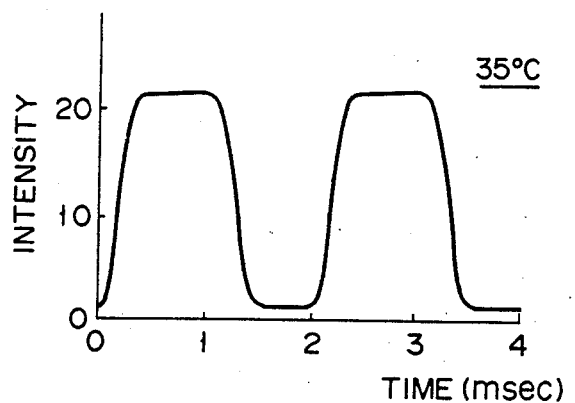
Figure 17A:
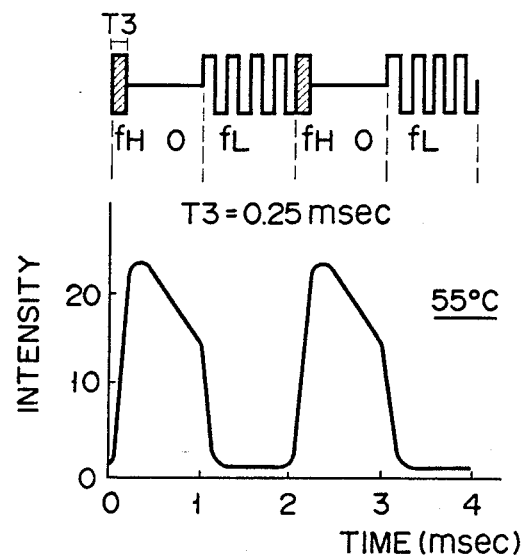
FIGS. 17A and 17B are graphs showing the response characteristics at respective temperatures when the liquid crystal optical device shown in FIG. 1 is driven by the first drive method according to the first embodiment of the present invention in which time T3 wherein a high-frequency electric field is applied is set to be 0.25 msec.
Figure 17B:
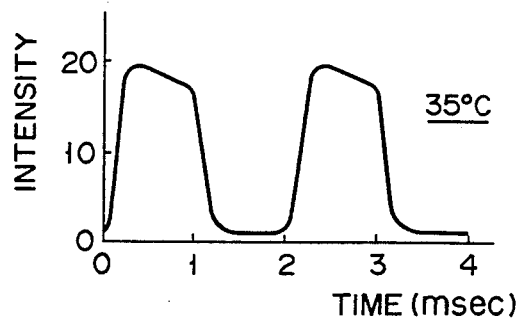
Figure 18:
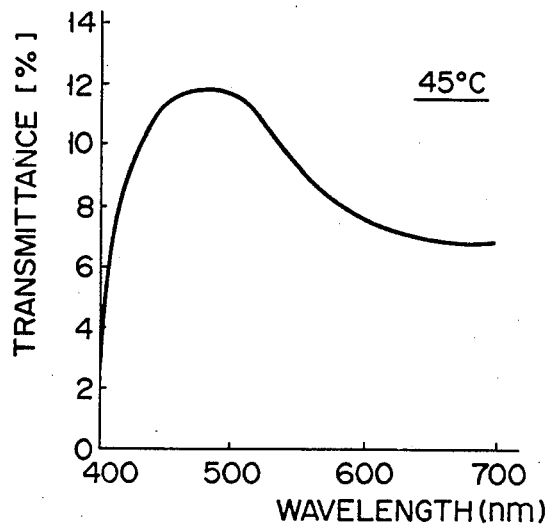
FIG. 18 is a graph of spectral characteristics at a temperature of 45° C. when the liquid crystal optical device shown in FIG. 1 is driven by the drive method shown in FIGS. 16A and 16B.

FIG. 18 shows the spectral characteristics at a temperature of 45° C. when 25 V, 200 kHz high frequency electric field FH, no electric field, and 25 V, 4 kHz low-frequency electric field FL are repeatedly applied in this order for 0.5 msec, 0.5 msec and 1 msec, respectively (see FIG. 16A). The transmittance shown in FIG. 18 is an average transmittance when the ON/OFF operation is repeated. The transmittance when the shutter is in the ON state is very high, i.e., about 20%.

Although a peak value is presented at the short wavelength side in a visible light range, as shown in FIG. 18, the spectral characteristic curve of transmitted light in the shutter ON state can be substantially flat in the remaining wavelength range. Even if any type of light source such as a fluorescent lamp, a white light source, and the like is used, the above-mentioned shutter can serve as an excellent shutter.

Modifications of the above-mentioned drive method will now be described with reference to FIGS. 20 and 21.

Figure 20:
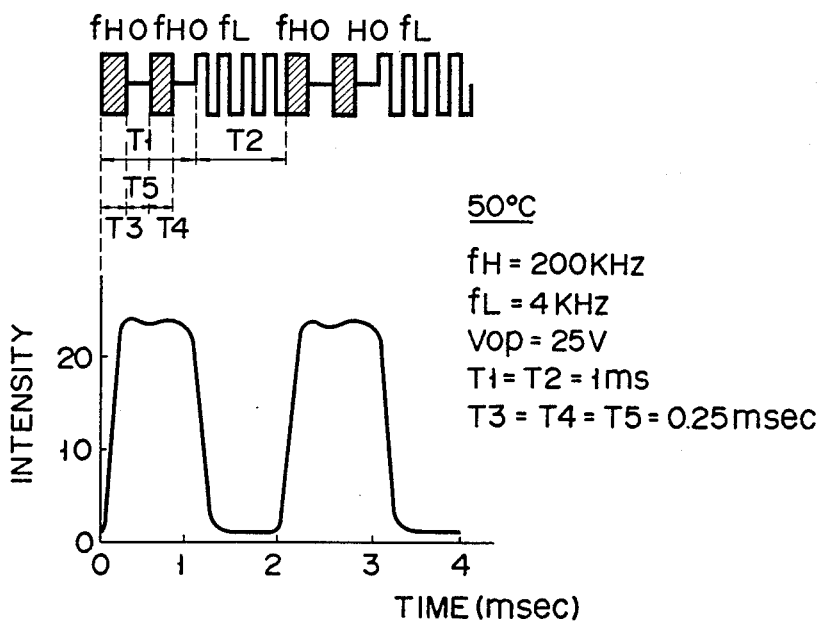
FIG. 20 is a graph showing the response characteristics when the liquid crystal optical device shown in FIG. 1 is driven by a second drive method according to the first embodiment of the present invention.

In a second drive method shown in FIG. 20, 1 msec shutter ON operation time T1 is divided into four 0.25 msec intervals. The first interval corresponds to first FH application time T3, second interval T5 corresponds to a non-electric field interval, the third interval corresponds to second FH application time T4, and the remaining fourth interval corresponds to a non-electric field interval. Other conditions are the same as those of the electric field waveform shown in FIG. 16A.

Figure 21:
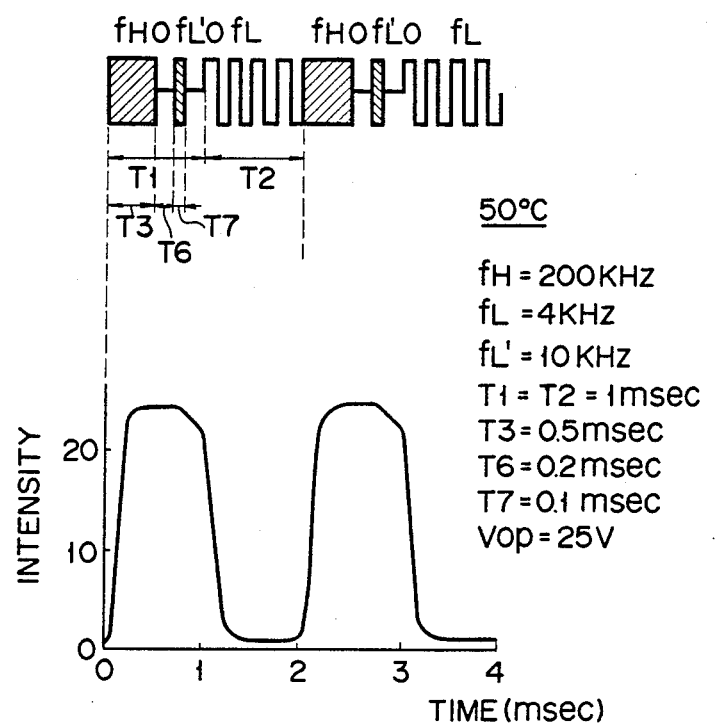
FIG. 21 is a graph showing the response characteristics when the liquid crystal optical device shown in FIG. 1 is driven by a third drive method according to the first embodiment of the present invention.

In a third drive method shown in FIG. 21, during shutter ON operation time T1, a first 0.5-msec interval corresponds to FH application time T3, subsequent 0.2 msec interval T6 corresponds to a non-electric field interval, and then 0.1 msec low-frequency electric field FL' application time T7 follows. Low-frequency electric field FL' is set at a frequency lower than crossover frequency fc, e.g., 10 kHz. Other conditions are the same as those in the drive method shown in FIG. 16A. In the liquid crystal shutter drive methods shown FIGS. 20 and 21, a sum of FH application times in each shutter ON operation time T1 is 0.5 msec.

Figure 19:
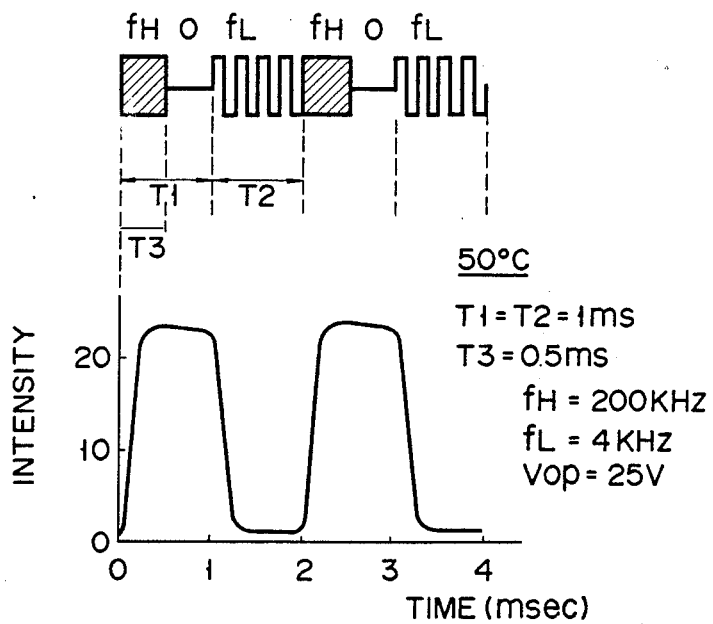
FIG. 19 is a graph showing the response characteristics at a temperature of 50° C. when the liquid crystal optical device shown in FIG. 1 is driven by the drive method shown in FIGS. 16A and 16B.

Table 7 below shows response times $\tau ON$ and $\tau OFF$ when high-frequency electric field FH was set to be 200 kHz, low-frequency electric field FL was set to be 4 kHz, and operation voltage Vop was set to be 25 V in the first to third drive methods shown in FIGS. 16A, 20, and 21. Note that in the first drive method, as shown in FIG. 16A, shutter ON operation time T1 and shutter OFF operation time T2 are respective set to be 1 msec, and an FH application time is set to be 0.5 msec, and FIG. 19 shows its response characteristics.

TABLE 7

| Drive Method | (unit: msec) | |
| --- | --- | --- |
| | $\tau ON$ | $\tau OFF$ |
| First | 0.25 | 0.3 |
| Second | 0.2 | 0.3 |
| Third | 0.2 | 0.25 |

In the first to third drive methods, the transmitted light intensity in the third drive method is higher than that in the other two methods. As for the response property, ON response times $\tau ON$ in the second and third methods are shorter than that in the first method, as can be seen from Table 7. In the third method, OFF response time $\tau OFF$ is 0.25 msec and is shorter than that in the other two methods.

In the second drive method, high-frequency electric field FH is applied to the liquid crystal material in a time divisional manner. Since the high-frequency electric field is not continuously applied, the influence of the hysteresis effect due to electric field FH is hard to appear. Therefore, the liquid crystal optical device driven by the second drive method exhibits very good temperature stability.

As shown in the first to third drive methods, the liquid crystal optical device of the present invention obtains the ON state such that after a high-frequency electric field is applied to the liquid crystal material to immediately incline the liquid crystal molecules, and that a non-electric field state is provided. In this case, in a process for obliquely aligning the liquid crystal molecules upon application of high-frequency electric field FH, after an abrupt force for inclining the liquid crystal molecules due to the effect of the high-frequency electric field acts, a free state due to the non-electric field state is set. Therefore, in this non-electric field state, the liquid crystal molecules can be uniformly, obliquely aligned. Since the oblique alignment directions of the liquid crystal molecules can be made uniform, a transmitted light intensity in the ON state can be increased. When the liquid crystal molecules are obliquely aligned upon application of only high-frequency electric field FH as in the conventional device, since the oblique alignment directions of the liquid crystal molecules are not uniform, a transmitted light intensity at that time is low.

As described above, in the first to third drive methods using the present invention, during ON operation time T1 of the liquid crystal optical device, high-frequency electric field FH is applied to the liquid crystal material as the ON operation electric field for obliquely aligning the liquid crystal molecules. Thereafter, an ON electric field for setting a non-electric field state for a predetermined period of time, a non-electric field or a holding electric field which substantially holds the obliquely aligned state of the liquid crystal molecules and consists of a non-electric field and a high- or low-frequency electric field for a short period of time are applied. Therefore, since the non-electric field state is provided after the high-frequency electric field, the transmitted light intensity in the ON state of the liquid crystal optical device can be increased, and the temperature stability of the operation thereof can be improved.

(C) The above-mentioned liquid crystal optical device is used for a micro shutter array in which a large number of micro shutters are arranged in a matrix. The micro shutter array is suitable for an optical write head of an electro-photographic printer. The optical write head radiates light emitted from its light source onto a photosensitive body to form small light spots thereon, and an electrostatic latent image corresponding to a desired image is formed by a large number of dots by radiation of the small light spots.

A liquid crystal optical printer to which the liquid crystal optical device driven by the drive method of the present invention can be applied, will be described with reference to FIGS. 22 to 29.

Figure 22:
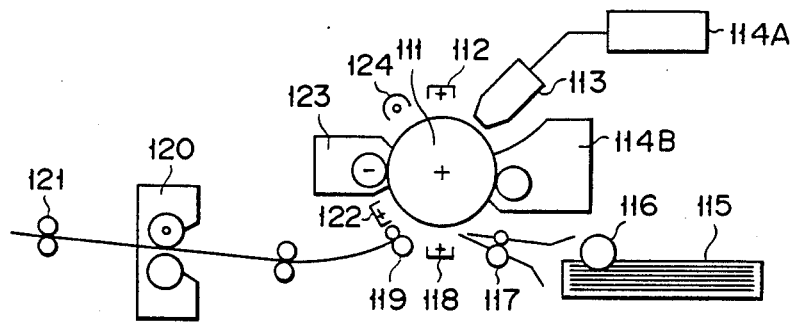
FIG. 22 is a schematic view of a liquid crystal optical printer using the liquid crystal optical device.

Referring to FIG. 22, the liquid crystal optical printer has photoconductive photosensitive drum 111, charger 112 for uniformly charging the surface of drum 111, and optical recording unit 113 for performing optical recording on the surface of drum 111. Unit 113 is constituted by a light source, a liquid crystal shutter, and a focusing lens, and is driven by recording controller 114 for controlling timings based on recording information such as an image. Unit 113 radiates light onto the surface of drum 111 to erase the charges on the irradiated portion on the surface of drum 111, thereby recording information. An electrostatic latent image is formed on the surface of drum 111 by an information recording operation of unit 113, and is developed by developer 114 to obtain a toner image.

Recording paper sheet 115 is fed by paper feed roll 116, and is temporarily stopped by standby rolls 117. Thereafter, paper sheet 115 is fed to transcriber unit 118 in synchronism with the toner image on the surface of drum 111. The toner image on the surface of drum 111 is transferred to paper sheet 115 by transcriber unit 118. Paper sheet 115 is separated from drum 111 by separating unit 119, the toner image thereon is fixed by fixer 120, and then sheet 115 is delivered by delivery rollers 121. After the toner image is transferred to sheet 115, toner charges on drum 111 are neutralized by charger 115. Thereafter, residual toner thereon is cleaned by cleaner 123 and the surface charge is neutralized by eraser 124.

Figure 23:
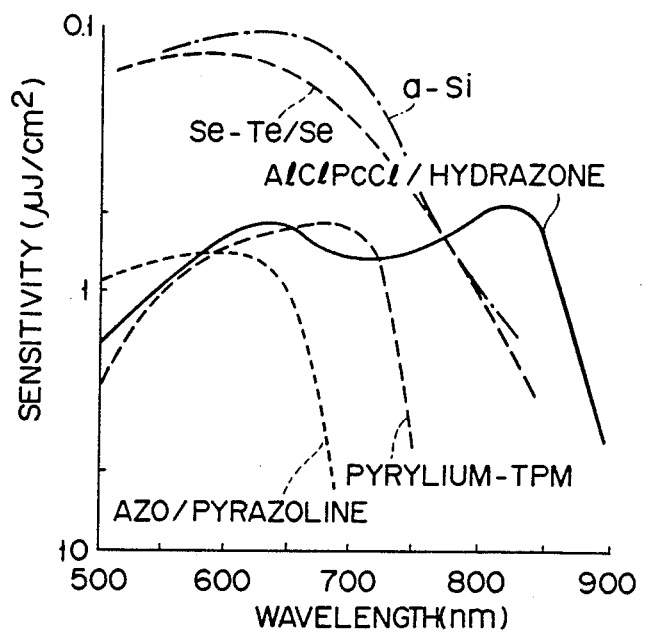
FIG. 23 is a graph showing spectral sensitivity of a photosensitive drum used in the liquid crystal optical printer shown in FIG. 22.
Figure 24:
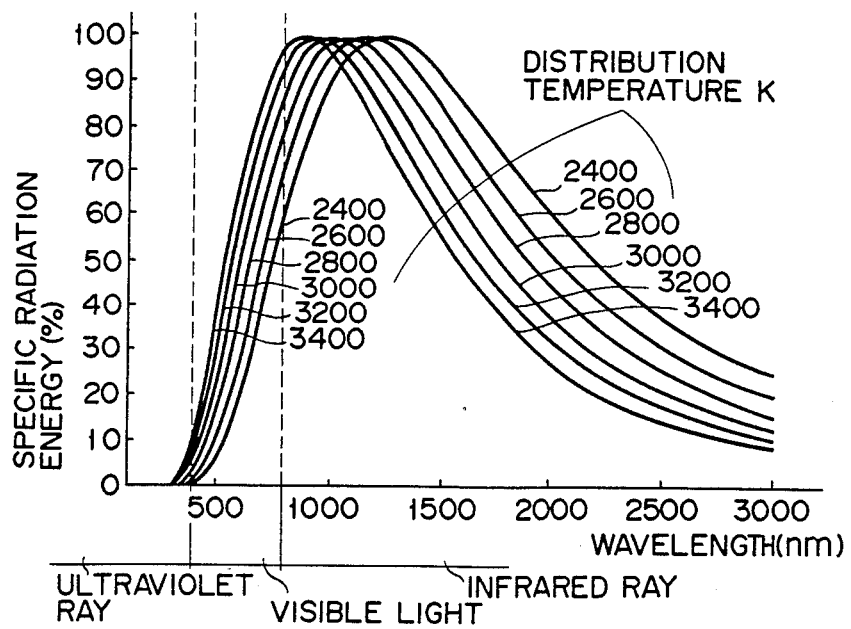
FIG. 24 is a graph showing a spectral energy distribution of a light source used in the liquid crystal optical printer shown in FIG. 22.

Drum 111 is formed of an inorganic photosensitive material such as amorphous Si (a-Si), Se-Te/Se, or the like, or an organic photosensitive material, and the spectral sensitivities of these photosensitive materials are shown in FIG. 23. The light source of optical recording unit 113 comprises a fluorescent lamp which has a peak value of a light emission intensity at a wavelength of 543 nm or it comprises a halogen lamp. The halogen lamp has a peak value of the light emission intensity at the long wavelength side, and its typical energy distribution is shown in FIG. 24.

The liquid crystal shutter provided to optical recording unit 113 will now be described in detail with reference to FIGS. 25 to 29. Referring to FIGS. 25 to 29, substrates 125 and 126 comprise glass plates each having a thickness of 0.7 mm. A pair of substrates 125 and 126 are adhered to each other to have a predetermined gap therebetween by seal member 127, and two-frequency addressing liquid crystal material 128 is sealed therebetween. A large number of signal electrodes 129a, ... and 129b, ... are aligned in two arrays on the entire inner surface of one lower substrate 125 (segment substrate) of substrates 125 and 126. Two elongated common electrodes 130a and 130b corresponding to the opposing signal electrode arrays 129a and 129b of lower substrate 125 are formed on the inner surface (opposite to lower substrate 125) of upper substrate 126. Signal electrodes 129a and 129b and common electrodes 130a and 130b are transparent electrodes formed of a transparent conductive material such as indium-tin oxide. Portions at which signal electrodes 129a and 129b and common electrodes 130a and 130b face each other constitute shutter portions Sa, ... and Sb, ... for transmitting light therethrough. One signal electrode array 129a is arranged to be shifted from the other signal electrode array 129b by a ½ pitch. Therefore, shutter portions Sa and Sb are arranged in two arrays to be shifted by ½ pitch from each other. Adjacent signal electrodes 129a and 129b are commonly connected to be shifted by ½ pitch from each other. Signal electrodes 129a and 129b are alternately connected to driver connecting terminals 131, ... aligned on the two side edge portions of lower substrate 125 through lead wire portions 131a and 131b. Nontransparent metal films 132 and 133 (FIG. 28) are deposited on the surfaces of common connecting portions of signal electrodes 129a and 129b, lead wire portions 131a and 131b, driver connecting terminals 131, and common electrodes 130a and 130b, except for portions corresponding to shutter portions Sa and Sb, in order to decrease the electrical resistance of the electrodes and to restrict the areas of shutter portions Sa and Sb.

Aligning films 134 and 135 which are subjected to an aligning treatment to align liquid crystal molecules in a predetermined direction with respect to the surfaces of substrates 125 and 126 are provided on the opposing surfaces, i.e., electrode forming surfaces of substrates 125 and 126 over the entire regions surrounded by seal members 127. Aligning films 134 and 135 are prepared such that organic insulating films such as polyimide films are formed and thereafter are subjected to a rubbing treatment. The direction of the rubbing treatment corresponds to the directions indicated by arrows 136 and 137 in FIG. 27, which form an angle of 180°.

A pair of polarizing plates 138 and 139 are adhered to the outer surfaces of substrates 125 and 126, and light-shielding printing is performed on the outer surface of one polarizing plate (e.g., upper polarizing plate 139) arranged on the outer surface of the substrate at the light exit side, except for an alignment area of shutter portions Sa and Sb.

Figure 27:
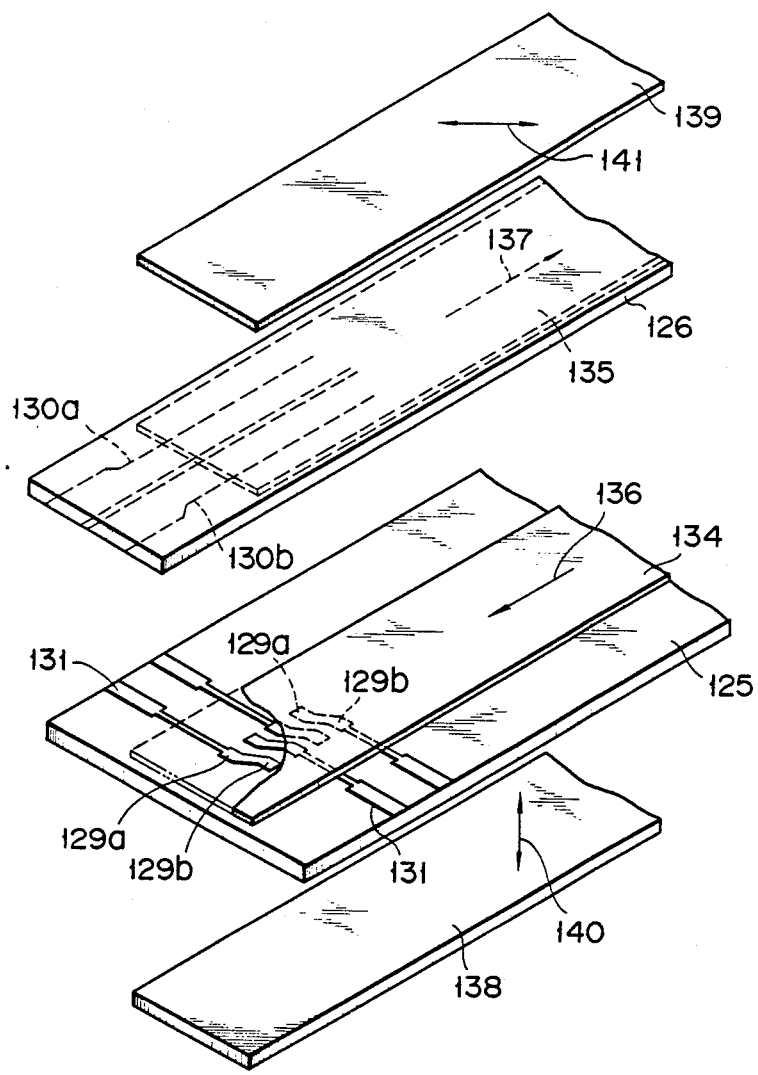
FIG. 27 is an exploded perspective view of the liquid crystal shutter shown in FIG. 25.

Of these polarizing plates 138 and 139, for example, the polarizing axis of lower polarizing plate 138 adhered to the outer surface of lower substrate 125 is arranged to intersect the rubbing direction at about 45°, as indicated by arrow 140 in FIG. 27. Upper polarizing plate 139 adhered to the outer surface of upper substrate 126 is arranged so that its polarizing axis intersects the polarizing axis of lower polarizing plate 138 as indicated by arrow 141 of FIG. 27.

Liquid crystal material 1 described above is sealed between the pair of substrates. Liquid crystal material 1 is a liquid crystal composition having two-frequency addressing characteristics.

In the liquid crystal optical device using the two-frequency addressing nematic liquid crystal, the ON/OFF operations of shutter portions Sa and Sb are controlled by a two-frequency signal including high- and low-frequency electric fields. When the low-frequency electric field is applied across signal electrodes 129a and 129b and common electrodes 130a and 130b, the liquid crystal molecules of liquid crystal material 128 are homeotropically aligned with respect to the surfaces of substrates 125 and 126 and shutter portions Sa and Sb are set in the OFF state which does not allow light transmission. When the high-frequency electric field is applied in this state, the liquid crystal molecules are to return to the initial alignment state (homogeneous alignment) due to inversion of the dielectric anisotropy. When the liquid crystal molecules begin to return from the homeotropic state to the initial alignment state, the birefringence of the liquid crystal layer is gradually changed upon a change in tilt angle of liquid crystal molecules. In this case, a bright state can be established near a specific tilt angle. The application time of the high-frequency electric field is set so that application of the high-frequency electric field is cut off at that time, and this state is used as a shutter ON state. In this manner, shutter portions Sa and Sb are opened/closed, thereby controlling light transmission.

In the liquid crystal optical device, the aligning film treatment directions of the aligning-treated film formed on the inner surfaces of the opposing substrates can be set to fall within the range of 150° to 180°. An angle formed by the aligning treatment directions and polarizing axes of the polarizing plates can be set to fall within the range of 35° to 45°. In this case, the operation characteristics of the micro shutters can be very good.

In order to allow the above-mentioned liquid crystal optical printer to perform high-speed printing, the intensities of light transmitted through the individual micro shutters must be high. For this purpose, a wavelength range exhibiting the peak value of the spectral characteristics of the micro shutters preferably coincides with a wavelength range exhibiting a peak value of the spectral intensity distribution of the light source and/or a wavelength range exhibiting a peak value of the spectral sensitivity of the photosensitive body. When the spectral characteristics of the microshutters satisfy the above-mentioned conditions, a combination of dielectric anisotropy Δna of the liquid crystal material and thickness d is selected so that product Δnb.d of birefringence Δnb of the liquid crystal material and thickness d of the liquid crystal layer can correspond to a predetermined value with respect to light of a specific wavelength. More specifically, when a fluorescent lamp having a peak value at wavelength λ=543 nm is used as the light source, and liquid crystal material 2 is used, thickness d of the liquid crystal layer is preferably set to be 4.5 μm.

The liquid crystal optical device with the above structure is driven by a circuit shown in FIG. 29. Referring to FIG. 29, data controller 211 converts video data scanned by a data processor (not shown) or an optical system (not shown) into serial print data, and sends it to shift register 212. Shift register 212 fetches data from controller 211 while sequentially shifting the data. When data for one line is fetched, the fetched data is latched in data latch 213, and is then transferred to selector 214. Timing clock signal generator 215 generates low-frequency signal (rectangular wave) fL at a frequency, e.g., 4 kHz, low-frequency signal $\overline{fL}$ whose phase is shifted from that of signal fL by ½ period, high-frequency signal (rectangular wave) fH at a frequency, e.g., 200 kHz, and high-frequency signal $\overline{fH}$ whose phase is shifted from that of signal fH by ½ period. Generator 215 supplies these signals to ON/OFF signal generator 216 and common signal generator 217 ON/OFF signal generator 216 combines the signals from generator 215 and generates ON and OFF signals. The ON and OFF signals are supplied to selector 214. Selector 214 selects the ON or OFF signal in accordance with data latched by data latch 213, and outputs the selected signal to driver 218. Driver 218 supplies the ON waveform voltage and/or OFF waveform voltage to the signal electrodes of liquid crystal shutter 219 arranged as described above. Common signal generator 217 generates common waveform voltages C1 and C2 based on the signals from generator 215, and supplies them to the common electrodes of liquid crystal shutter 219.

Figure 30:
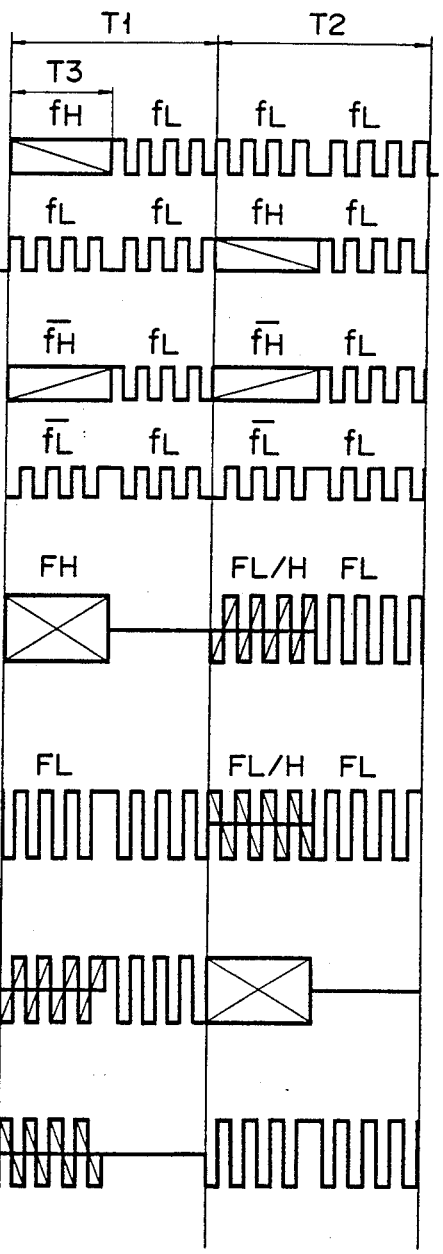
FIGS. 30A to 30H are waveform charts showing a first time-divisional drive method according to a second embodiment of the present invention.

(D) With this driver circuit, the signal and common electrodes of liquid crystal shutter 219 receive the signals as shown in FIGS. 30A to 30D, electric fields shown in FIGS. 30E to 30H are applied to the liquid crystal material, and shutter 219 is time-divisionally driven at ½ duty. A first time-divisional drive method according to a second embodiment of the present invention will now be described with reference to FIGS. 30a to 30H. Referring to FIGS. 30A and 30B, reference symbol Com1 denotes a common voltage applied to one common electrode 130a; and Com2, a common voltage applied to the other common electrode 130b. These common voltages alternately select common electrodes 130a and 130b during a write cycle. Each write cycle is set to be 2 msec. During first period T1, common electrode 130a is selected, and during second period T2, common electrode 130b is selected. Common voltage Com1 serves as 200-kHz high-frequency voltage fH during first half T3 in period T1 and serves as 5-kHz low-frequency voltage fL during the second half. During period T2, voltage Com1 serves as low-frequency voltage fL during the first half, and serves as inverted low-frequency voltage $\overline{fL}$ during the second half. Common voltage Com2 has a voltage waveform in which periods T1 and T2 of voltage Com1 are replaced with each other. Referring to FIG. 30C, reference symbols Seg1 and Seg2 denote segment voltages applied to segment electrodes 129a and 129b in synchronism with the common voltages. Segment voltage Seg1 has a waveform for turning on the shutter portions selected in first and second periods T1 and T2, and segment voltage Seg2 has a waveform for turning off the shutter portions selected during first and second periods T1 and T2. Segment voltage Seg1 serves as inverted high-frequency voltage $\overline{fH}$ of fH in the first halves of first and second periods T1 and T2 and serves as low-frequency voltage fL in the second halves thereof. Segment voltage Seg2 serves as inverted low-frequency voltage $\overline{fL}$ of fL during the first halves of periods T1 and T2 and serves as low-frequency voltage fL during the second halves thereof. Referring to FIGS. 30E to 30H, reference symbol Seg1-Com1 denotes a synthesized waveform of segment voltage Seg1 and common voltage Com1; Seg2-Com2, a synthesized waveform of segment voltage Seg2 and common voltage Com2; Seg1-Com2, a synthesized waveform of segment voltage Seg1 and common voltage Com2; and Seg2-Com1, a synthesized waveform of segment voltage Seg2 and common voltage Com1.

During the print operation, shutter portions Sa constituted segment electrodes 129a and common electrode 130a are selected in response to the above voltage during first period T1, and shutter portions Sb constituted by segment electrodes 129b and common electrode 130b are selected during second period T2. In this manner, the ON or OFF state can be selectively obtained. Light transmitted through shutter portions Sa and Sb is radiated on photosensitive drum 111, thereby forming a latent image thereon. Then, print processing onto recording paper sheet 115 is performed on the basis of the latent image formed on drum 111.

Figure 31:
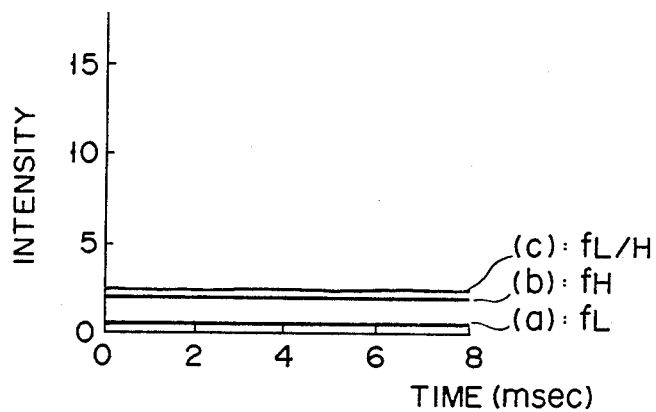
FIG. 31 is a graph of the optical characteristics showing transmitted light when voltages of various waveforms for driving the liquid crystal shutter shown in FIG. 25 are continuously applied.
Figure 32:
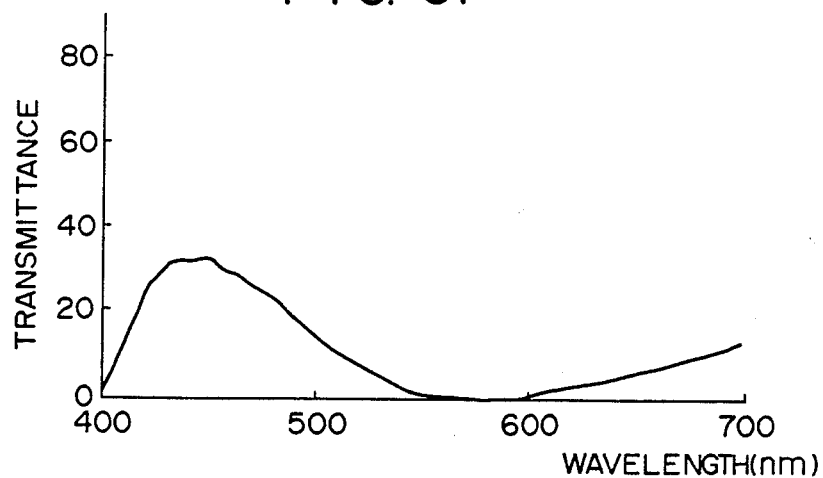
FIG. 32 is a graph showing the spectral characteristic in the initial alignment state of the liquid crystal shutter shown in FIG. 25.
Figure 33:
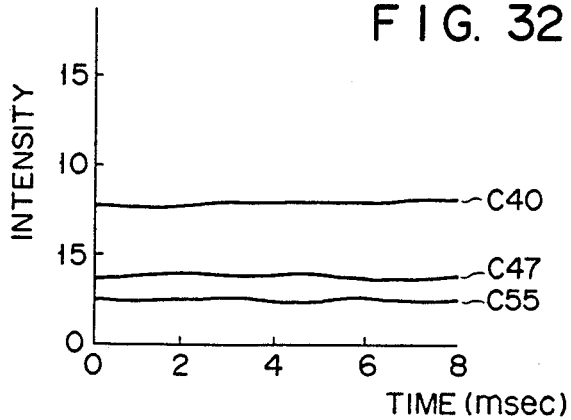
FIG. 33 is a graph of the optical characteristics showing transmitted light intensities at respective temperatures when a superimposed electric field shown in FIG. 31 is applied to the liquid crystal shutter.

A second time-divisional drive method according to the second embodiment of the present invention will now be described in detail with reference to FIGS. 31 to 37C. The fundamental response characteristics with respect to the various electric fields will first be explained. Basically, liquid crystal shutter 219 is turned on upon application of high-frequency electric field FH and is turned off upon application of low-frequency electric field FL. When liquid crystal shutter 219 is driven in a multiplexing manner, four electric fields, i.e., high-frequency electric field fH, low-frequency electric field FL, non-electric field "0", and superimposed electric field FL/H of high- and low-frequency electric fields, are applied to the liquid crystal material as a synthesized waveform. FIG. 31 shows the optical characteristics when these electric fields are continuously applied to liquid crystal shutter 219. In FIG. 31, time (msec) is plotted along the abscissa, and a transmitted light intensity is plotted along the ordinate. In FIG. 31, line (a) represents a transmitted light intensity when low-frequency electric field FL is continuously applied, line (b) represents a transmitted light intensity when high-frequency electric field FH is continuously applied, and line (c) represents a transmitted light intensity when superimposed electric field FL/H is continuously applied. At that time, high-frequency electric field FH was 200 kHz, low-frequency electric field FL was 4 kHz, application voltage Vop was 25 V, a fluorescent lamp having emission peak at a wavelength of 543 nm and a half-width of 20 nm was used as the light source, and a measurement temperature was 55° C. Referring to FIG. 31, when low-frequency electric field FL is continuously applied, the shutter is perfectly in the OFF state as indicated by line (a). The transmitted light intensity in this case depends on the polarization characteristics. When high-frequency electric field FH is continuously applied, this is equivalent to an initial alignment state. Therefore, the transmitted light intensity depends on a difference between a wavelength exhibiting a peak value of the spectral characteristics of a cell due to "Δnb.d" and a wavelength exhibiting a peak value of the spectral intensity distribution. As shown in FIG. 32, in the spectral characteristics in the initial state of the liquid crystal cell in this case, a transmittance near a wavelength of about 543 nm is low. Therefore, the transmitted light intensity is low, as indicated by line (b) in FIG. 31. This transmitted light intensity is the same as in the non-electric field continuous application state. When superimposed electric field FL/H is continuously applied, the liquid crystal cell is in a considerably dark state. As indicated by line (c) in FIG. 31, a higher transmitted light intensity is obtained than in the continuous application states of high- and low-frequency electric fields FH and FL. The transmitted light intensities upon continuous application of high- and low-frequency electric fields FH and FL almost do not depend on a temperature. This is because the liquid crystal material has a high NI point, and the temperature dependency of dielectric anisotropy Δna is substantially flat up to about 100° C. However, the transmitted light intensity is noticeably changed upon continuous application of superimposed electric field FL/H. FIG. 33 shows this state. In FIG. 33, line (C55) represents a case of 55° C., line (C47) represents a case of 47° C., and line (C40) represents a case of 40° C. Since application of superimposed electric field FL/H corresponds to a value ½ an effective voltage in high- or low-frequency electric field fH or fL and its effective frequency has a certain bandwidth, the transmitted light intensity is changed in correspondence with the temperature dependency of Δε of the liquid crystal.

Figure 34A:
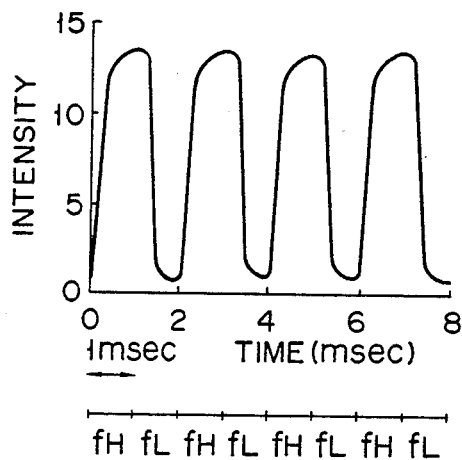
FIGS. 34A, 34B, 34C, and 34D are graphs showing the response characteristics when various waveforms are combined and are repetitively applied to the liquid crystal shutter.
Figure 34C:
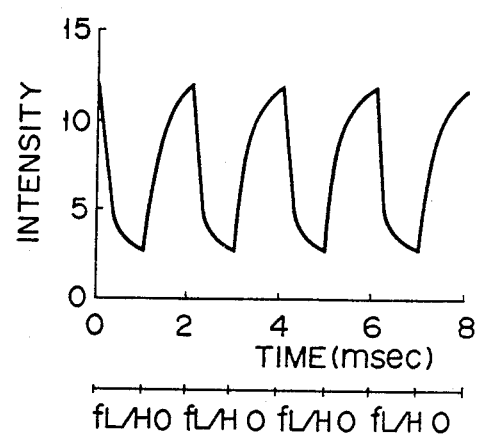
Figure 34B:
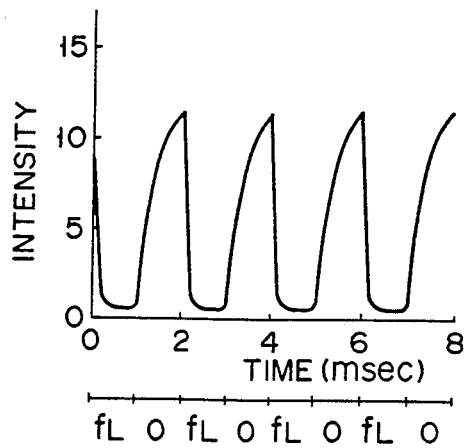
Figure 34D:
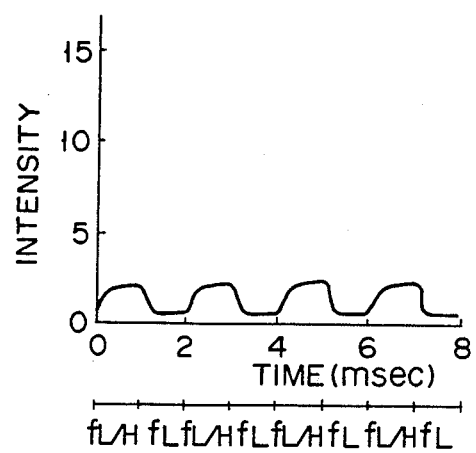

Optical response characteristics with respect to an electric field having a waveform in which two of the above-mentioned electric fields repetitively appear will now be described. FIG. 34A shows the response characteristics upon repetition of FH-FL for every 1 msec, FIG. 34B shows the response characteristics upon repetition of FL-0 for every 1 msec, FIG. 34C shows the response characteristics upon repetition of FL/H-0 for every 1 msec, and FIG. 34D shows the response characteristics upon repetition of FL/H-FL for every 1 msec. As shown in FIG. 34A, when the liquid crystal molecules are homeotropically aligned with respect to the substrates upon application of low-frequency electric field FL, the shutter is in the OFF state. Then, upon application of high-frequency electric field FH from this state, the shutter establishes the ON state in an oblique alignment state while being changed to the homogeneous alignment state. As shown in FIG. 34B, relaxation of the liquid crystal molecules to the initial state occurs when the non-electric field state is set after the application state of low-frequency electric field FL. However, since the liquid crystal molecules are obliquely aligned due to natural relaxation based on the initial alignment power of the liquid crystal molecules, the response time is long as compared to the relaxation upon application of high-frequency electric field FH. As shown in FIG. 34C, when a non-electric field is applied after application of superimposed electric field FH/L, the shutter can be turned on in the same manner as in FIG. 34B. However, an effect for closing the shutter upon application of superimposed electric field FH/L is degraded as the temperature is lowered, as shown in FIG. 33. Therefore, at low temperature, the shutter is kept open. As shown in FIG. 34D, upon repetition of superimposed electric field FL/H and low-frequency electric field FL, since continuous applications of electric fields FL/H and FL provide different transmitted light intensities as shown in FIG. 31, the shutter is in a slightly open state upon application of electric field FL/H. At low temperature, this state is noticeable.

When the shutter is to be turned off, it is preferable that low-frequency electric field FL is continuously applied to the liquid crystal material. When the shutter is driven in the multiplexing manner, superimposed electric field HL/H of high- and low-frequency electric fields FH and FL need be applied. In this case, superimposed electric field FL/H of high- and low-frequency electric fields FH and FL, and low-frequency electric field FL can be applied, so that a sufficiently dark state (OFF state) can be established. In this case, a non-electric field state can be set when the shutter is to be turned off. As shown in FIGS. 34B and 34C, since the shutter begins to open in the non-electric field state upon repetitive application of FL-0 and FL/H-0, the application time must be shortened. This also applies to the case of application of high-frequency electric field FH.

A detailed second time-divisional drive method for driving the above-mentioned liquid crystal shutter 219 at ½ duty in the multiplexing manner will now be described. Voltage waveforms applied to the electrodes and waveforms of electric fields applied to the liquid crystal material will be described with reference to FIGS. 35A to 35J. Referring to FIGS. 35A to 35F, reference symbols C1 and C2 denote common electrode application voltages; S1 to S4, segment electrode application voltages. Voltage S1 causes micro shutters Sa and Sb to perform an ON-ON operation, voltage S2 causes them to perform an ON-OFF operation, voltage S3 causes them to perform an OFF-ON operation, and voltage S4 causes them to perform an OFF-OFF operation. One frame is 2 msec. High-frequency voltages fH and f̄H̄ have a frequency of 200 kHz, and their phases are shifted by a ½ period. Low-frequency voltage fL has a frequency of 5 kHz. The above drive voltages have amplitude Vop of 25 V.

Figure 36A:
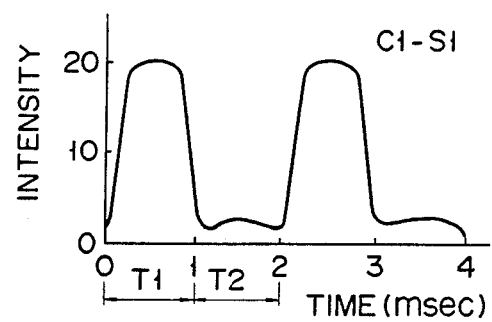
FIGS. 36A, 36B, 36C, and 36D are graphs showing the response characteristics corresponding to respective electric fields applied to the liquid crystal material when the liquid crystal shutter is driven by the drive method shown in FIGS. 35A to 35J.
Figure 36B:
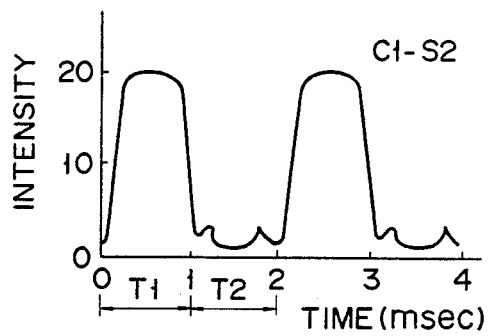
Figure 36C:
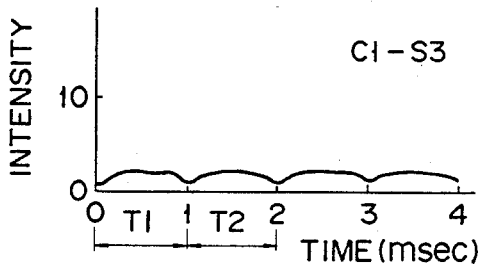
Figure 36D:
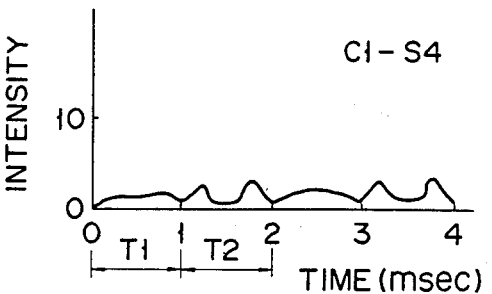

FIGS. 36A to 36D respectively show the optical response characteristics at a temperature of 50° C. when liquid crystal shutter 219 is driven by the electric fields having the waveforms shown in FIGS. 35G to 35J. FIG. 36A shows the response characteristics upon application of C1-S1, FIG. 36B shows the response characteristics upon application of C1-S2, FIG. 36C shows the response characteristics upon application of C1-S3, and FIG. 36D shows the response characteristics upon application of C1-S4.

High-frequency electric field FH is applied to the liquid crystal material of the micro shutter which is turned on during a selection period, as indicated by C1-S1 and C1-S2 during first period T1 in FIGS. 35G and 35H. Subsequently, the non-electric field is applied At the end of first period T1, low-frequency electric field FL is applied. As represented by the response characteristics during first period T1 in FIGS. 36A and 36B, transmitted light intensity at this time is high enough to set the ON state upon application of high-frequency electric field FH and to maintain the ON state, and is low enough to set the OFF state upon application of low-frequency electric field FL. Superimposed electric field FL/H of low- and high-electric fields FL and FH as indicated by C1-S1 and C1-S3 in second period T2 in FIGS. 35G and 35H or a repeating electric field of low-frequency electric field FL and a non-electric field as indicated by C1-S2 and C1-S4 in second period T2 is applied to the liquid crystal material of the micro shutter which is in a half-selection state. For the former electric field, as represented by the response characteristics in second period T2 in FIGS. 36A and 36C, the transmitted light intensity at this time is low enough to maintain the OFF state due to the influence of low-frequency electric field FL which is applied at the ends of first and second periods T1 and T2. For the latter electric field, as represented by the response characteristics in second period T2 in FIGS. 36B and 36D, the transmitted light intensity is slightly increased in the non-electric field state. However, in entire second period T2, the OFF state with a low transmitted light intensity can be maintained. Superimposed electric field FL/H is applied to the liquid crystal material of the micro shutter which is turned off in the selection period, as indicated by C1-S3 and C1-S4 in first period T1 in FIGS. 35I and 36J. As represented by the response characteristics in first period T1 in FIGS. 36C and 36D, the transmitted light intensity is minimized at the beginning of period T1 due to the influence of low-frequency electric field FL which is applied from the end of first period T1 to the end of second period T2. Although the transmitted light intensity is slightly increased upon application of superimposed electric field FL/H, the low-transmitted light intensity can be maintained as a whole. The above-mentioned electric fields are applied to the liquid crystal material of the selected micro shutter in accordance with the ON or OFF operation during the selection period, thereby turning on or off the micro shutter. At the same time, the micro shutter in the non-selection period receives an electric field for maintaining the OFF state. In this manner, the multiplexing drive operation can be realized.

Figure 37A:
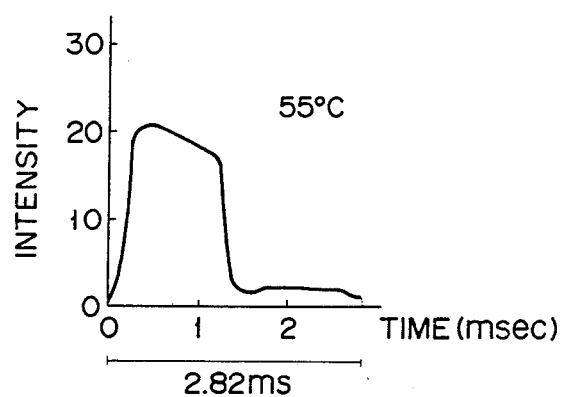
FIGS. 37A, 37B, and 37C are graphs showing the response characteristics when the liquid crystal shutter is driven by the drive method shown in FIGS. 35A to 35J.
Figure 37B:
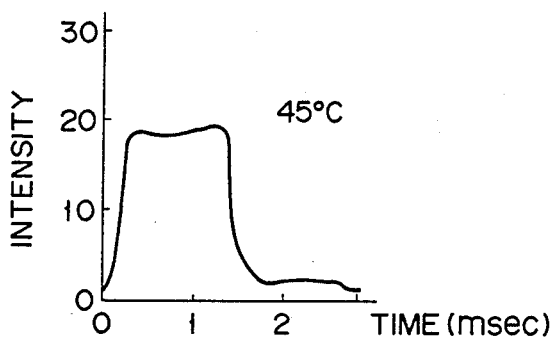
Figure 37C:
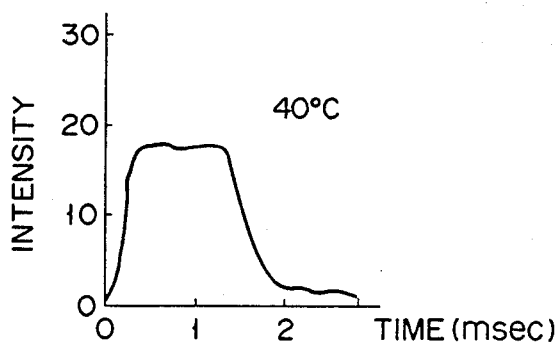

The temperature dependency of the response characteristics was measured when the electric fields having the same waveforms as in the second time-divisional drive method shown in FIGS. 35A to 35J were used, one frame was set to be 2.82 msec, and fundamental low-frequency electric field FL was set at 4 kHz. FIGS. 37A, 37B, and 37C respectively show optical response characteristics at temperatures of 55° C., 45° C., and 40° C. when the electric field indicated by C1-S1 in FIG. 35G is applied to the liquid crystal material. As can be seen from FIGS. 37A, 37B, and 37C, although the response time upon closing of the shutter is slightly prolonged as the temperature is decreased, the liquid crystal micro shutter can have stable operation characteristics according to this drive method.

A first modification of the second time-divisional drive method will now be described with reference to FIGS. 38A to 38I and FIG. 39. In the drive method of the first modification, a time in which an electric field (FH, FL/H) having a high-frequency component is shortened with respect to the electric fields having the waveforms shown in FIGS. 35A to 35J. In order to decrease the transmitted light intensity in the shutter OFF state, low-frequency electric field FL is applied to the liquid crystal material during the OFF operation period. FIGS. 38A to 38I show voltage waveforms applied to the electrodes in this method, and electric field waveforms applied to the liquid crystal material by these voltages. T1 indicates a selection period; T2, a non-selection period; T3, an application period of low-frequency electric field FL; T4, a period ¼ the remaining period other than period T3 of electric field FL. FIGS. 39A to 39D show the response characteristics of liquid crystal shutter 219 at a temperature of 55° C. when this drive method is used, T1=T2=1.41 msec, i.e., one frame is set to be 2.82 msec, T3=0.25 msec (FL=4 kHz), and T4=0.29 msec. FIG. 39A shows the response characteristics upon application of electric field C1-S1, FIG. 39B shows the response characteristics upon application of electric field C1-S2, FIG. 39C shows the response characteristics upon application of electric field C1-S3, and FIG. 39D shows the response characteristics upon application of electric field C1-S4. As can be seen from FIGS. 39A to 39D, since an electric field for obtaining the ON state substantially corresponds to the electric field waveform of C1-S1 shown in FIG. 35G, there is no large difference in ON characteristics. However, since an OFF waveform during periods T1 and T2 includes low-frequency electric field FL at its middle portion, the transmittance in the OFF state is very low, and hence, the shutter characteristics with high contrast can be obtained. Since the application time of the electric fields having the high-frequency component is shortened, the influence of the high-frequency hysteresis effect can be eliminated, and the temperature stability can be improved. When the application time of the high-frequency electric field is short, a high-frequency current is reduced, resulting in a decrease in dielectric heat dissipation and power consumption.

Figure 41A:
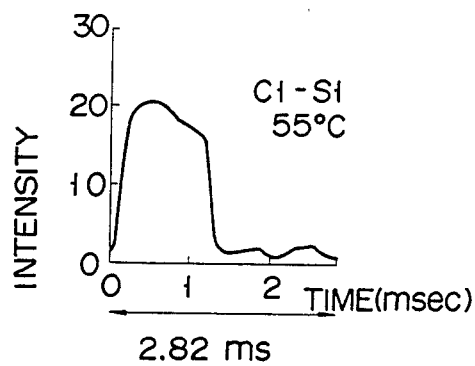
FIGS. 41A and 41B are graphs corresponding to respective electric fields applied to the liquid crystal material when the liquid crystal shutter is driven by the drive method shown in FIGS. 40A to 40I.
Figure 41B:
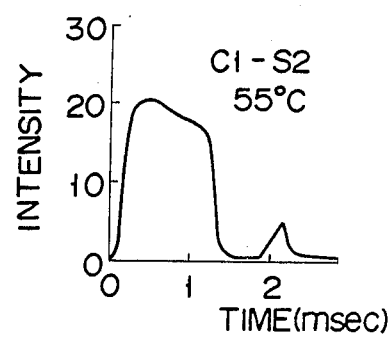

A second modification of the second time-divisional drive method will now be described with reference to FIGS. 40A to 42. In this drive method, since an amount of transmitted light in the ON state is increased, high-frequency electric field FH is inserted for a short period of time at the middle of the non-electric field state in the ON electric field for obtaining the ON state. FIGS. 40A to 40I respectively show voltages supplied to the electrodes in this method, and waveforms of electric fields applied to the liquid crystal material. Note that a voltage applied to the second common electrode has a waveform in which the order of selection period T1 and non-selection period T2 of voltage C1 supplied to the first common electrode is replaced, and a description thereof will be omitted. Note that T1=T2=1.41, T3=0.25 msec, T4=0.29 msec, and T5=0.1 msec. In this drive method, electric fields C1-S3 and C1-S4 are the substantially the same as those shown in FIGS. 38H and 38I, and their optical response characteristics are also substantially the same. FIGS. 41A and 41B show the response characteristics with respect to electric fields C1-S1 and C1-S2.

As shown in FIGS. 40A to 41B, in the drive method of the second modification, since high-frequency electric field FH is inserted in the middle of the non-electric field state for a short period of time after the application of high-electric field FH in the ON electric field waveform, drop of the transmittance in the second half of the ON operation of the micro shutter can be moderated. It can be considered that such a phenomenon occurs due to the following behavior of the liquid crystal molecules. More specifically, the liquid crystal molecules which are obliquely aligned upon application of high-frequency electric field FH behave to be homeotropically aligned due to the hysteresis effect of low-frequency electric field FL which is repetitively applied in the following non-electric field state since one frame includes low-frequency electric field components at a large ratio. At this time, when high-frequency electric field FH is applied for a short period of time, the liquid crystal molecules behave to be again obliquely aligned in order to obtain the ON state, thereby increasing the transmittance in the second half of the ON operation.

Figure 42:
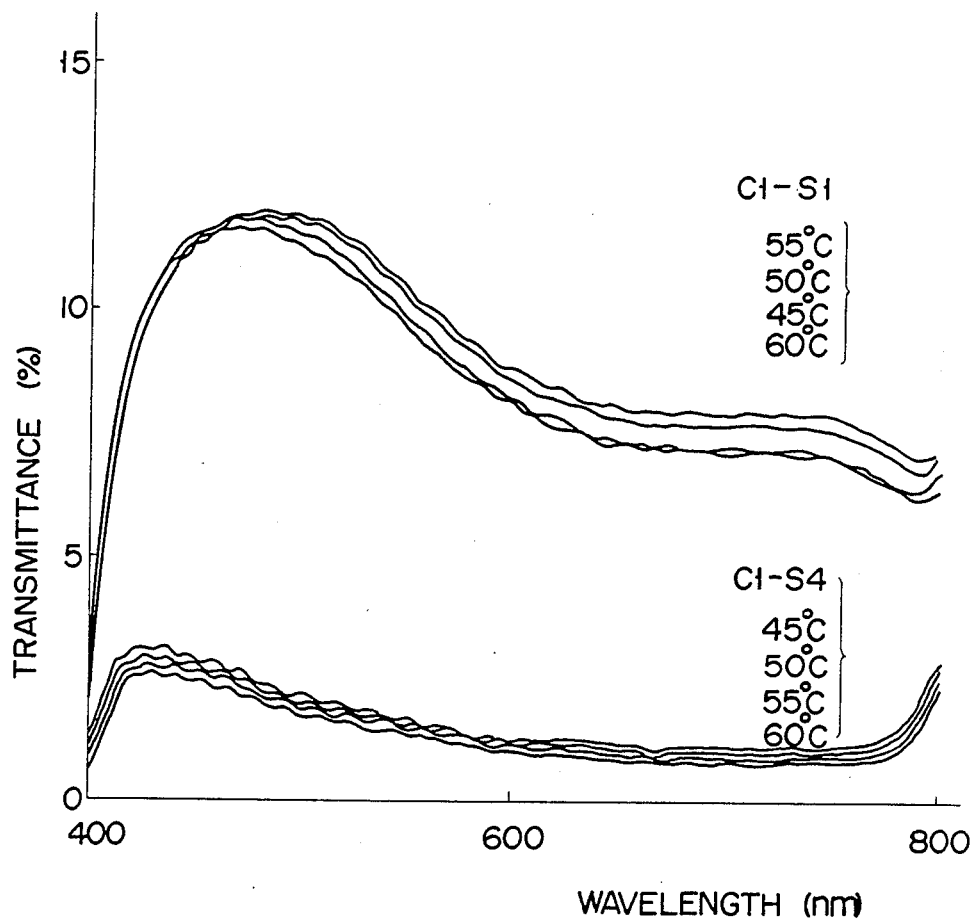
FIG. 42 is a graph showing the spectral characteristics of the liquid crystal shutter when the liquid crystal, shutter is driven by the drive method shown in FIGS. 40A to 40I.

FIG. 42 show the spectral characteristics of liquid crystal shutter 219 in electric field waveforms C1-S1 (ON) and C1-S4 (OFF) when liquid crystal shutter 219 is driven by the above drive method In this case, cell thickness d was set to be 5.09 μm, and measurement temperatures were 60° C., 55° C., 50° C., and 45° C. The spectral characteristics of liquid crystal shutter 219 by this drive method are substantially flat and ideal as those of the shutter. In addition, since the shutter can have high-speed response characteristics, it is suitable for a shutter in, e.g., an electro-photographic printer. (Third Embodiment)

A third embodiment of the present invention for increasing an amount of transmitted light in the ON state of the liquid crystal shutter will now be described In the ½ duty time-divisional drive method of the second embodiment, the liquid crystal shutter is selectively operated to establish the ON or OFF state during the selection period ½ one write period (one frame), and is controlled to establish the OFF state during the non-selection period corresponding to the remaining half period. Therefore, an amount of transmitted light per frame is at most ½ that in the ON state in the selection period. When the liquid crystal shutter is applied, particularly, to a liquid crystal optical printer, the transmitted light intensity influences the printing speed of the printer, as described above. A large amount of transmitted light is advantageous upon designing of an optical system for guiding light transmitted through the liquid crystal shutter to a photosensitive body, and is also advantageous upon selection of a sensitivity of the photosensitive body.

In the time-divisional drive method according to the third embodiment of the present invention, for one micro shutter, the ON state obtained in the selection period is maintained in the non-selection period by applying a holding signal for holding this state even in the non-selection period. In this manner, an amount of transmitted light in the ON state of the liquid crystal shutter can be increased.

In a first time-divisional drive method in the third embodiment, an electric field having a waveform for causing the shutter to hold the ON state over a longer period of time than the selection period is applied to the liquid crystal shutter in the ON operation. FIGS. 43A to 43I respectively show voltages applied to the electrodes and electric field waveforms applied to the liquid crystal material. Referring to FIGS. 43A to 43I, common voltage C1 is applied to shutter portion Sa. The phase of common voltage C2 applied to shutter portion Sb is shifted from that of common voltage C1 by a period ½ one write period. Segment voltages S1 to S4 are applied to segment electrodes of the micro shutters. Segment voltages S1 and S2 cause shutter portion Sa to establish the ON state and voltages S3 and S4 cause it to establish the OFF state. Segment voltages S1 and S3 cause shutter portion Sb to establish the ON state and voltages S2 and S4 cause it to establish the OFF state. Note that T1 indicates a selection period (1 msec); T2, a non-selection period (1 msec); T3, a first application period of high-frequency electric field FH; T4, a second application period of electric field FH; T5, a non-electric field application period; T6, a holding voltage application period corresponding to the remaining period of selection period T1; T7, an application period of low-frequency electric field FL which is set at the end of one write period so as to turn off the shutter; T8, a remaining period in non-selection period T2. In this case, during period T6 in period T1 and period T8 in period T2, a holding electric field for holding the shutter ON or OFF state is applied. Period T6 is set to have the same duration as that of period T7 in period T2.

During selection period T1, common voltage C1 causes the electrode to generate high-frequency electric field FH and is inverted in period T5. During non-selection period t2, voltage C1 causes the electrode to generate superimposed electric field FL/H during period T8 and to generate low-frequency electric field FL during period T7. In this case, electric field FL/H is obtained by alternately applying high-frequency electric field FH while dividing period T8 into eight sub-periods. Segment voltage S1 for turning on shutter portions Sa and Sb causes the electrode to generate low-frequency electric field FL during periods T6 and T7, and to generate high-frequency electric field FH during the remaining period. Segment voltage S2 for turning on shutter portion Sa and turning off shutter portion Sb causes the electrode to generate low-frequency electric field FL during period T6 in selection period T1 and during entire non-selection period T2, and to generate high-frequency electric field FH during the remaining period in selection period T1. Segment voltage S3 for turning off shutter portion Sa and turning on shutter portion Sb causes the electrode to generate low-frequency electric field FL during entire selection period T1, to generate high-frequency electric field FH during period T8 and to generate low-frequency electric field FL during period T7 in non-selection period T2. Segment voltage S4 for turning off shutter portions Sa and Sb causes the electrode to generate low-frequency electric field FL during entire selection and non-selection periods T1 and T2.

C1-S1, C1-S2, C1-S3, and C1-S4 in FIGS. 43F to 43I represent synthesized waveforms of common voltage C1 and segment voltages S1 to S4. As indicated by these synthesized waveforms, superimposed electric field FL/H of low- and high-frequency electric fields FL and FH is applied during period T6 in selection period T1, and superimposed electric field FL/H and a non-electric field are repetitively applied at equal time intervals during period T8 in non-selection period T2. More specifically, the holding electric field is continuously applied to liquid crystal material during periods T6 and T8.

The operation characteristics of the liquid crystal shutter which is driven by the above drive method will be explained below.

Figure 25:
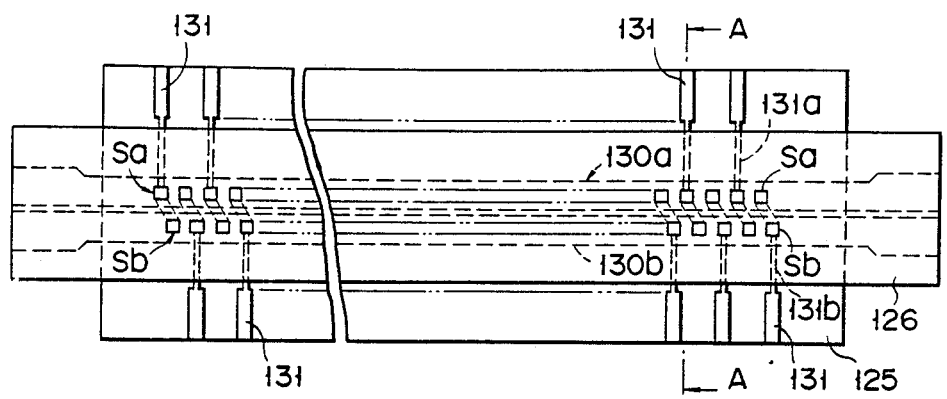
FIG. 25 is a plan view of a liquid crystal shutter used in the liquid crystal optical printer shown in FIG. 22.
Figure 26:
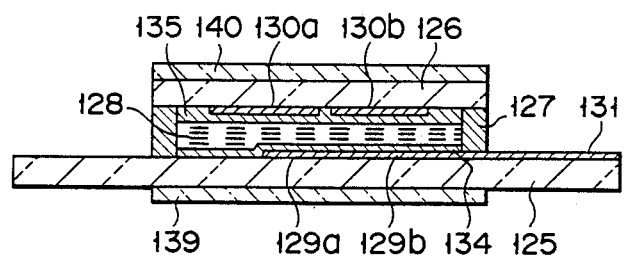
FIG. 26 is a sectional view of the liquid crystal shutter taken along a line A—A in FIG. 25.
Figure 28:
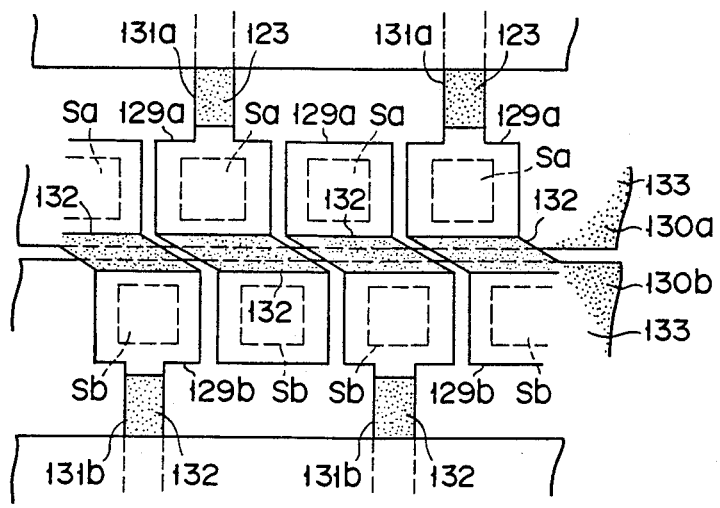
FIG. 28 is an enlarged plan view of a shutter portion of the liquid crystal shutter shown in FIG. 25.

A liquid crystal material for two-frequency addressing shown in Table 1 was sealed in the liquid crystal shutter which was arranged as shown in FIGS. 25 and 26 and had a cell gap (thickness of the liquid crystal layer) of 4.36 μm, and the signal waveforms shown in FIGS. 43A to 43I were continuously applied thereto. In this case, the shutter characteristics at temperatures of 55° C., 50° C., 45° C., and 40° C. were respectively measured. FIGS. 44A to 51D show the measurement results while plotting the transmitted light intensity along the ordinate. Note that a fluorescent lamp having an emission peak at a wavelength of 543 nm was used as the light source, and high-frequency electric field FH was set at 200 kHz.

FIGS. 44A to 44D show the response characteristics when period T5 is "0", i.e., when period T3 is followed by period T4 so that high-frequency electric field FH is continuously applied for 0.6 msec, and period T7 is set to be 0.4 msec. As shown in FIGS. 44A to 44D, according to the drive method of the present invention, since the superimposed electric field or the holding electric field consisting of repetition of the superimposed electric field and the non-electric field is applied during periods T6 and T8, the ON state in selection period T1 is continued to period T8 in non-selection period T2. Low-frequency electric field FL is applied during period T7 at the end of one write period to turn off the shutter. In this manner, a single shutter operation is completed.

However, the response characteristics of the liquid crystal shutter changes in accordance with its temperature.

Figure 44A:
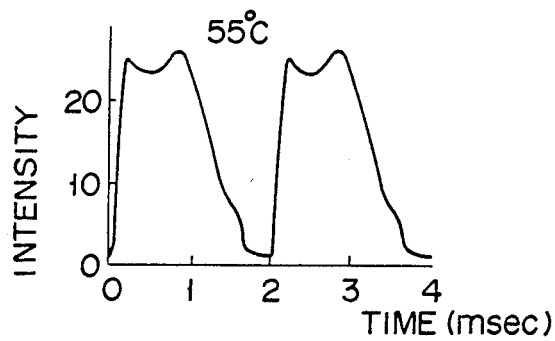
FIGS. 44A, 44B, 44C, and 44D are graphs showing the response characteristics at respective temperatures when the liquid crystal shutter is driven by the drive method shown in FIGS. 43A to 43I wherein non-electric field period T5 is 0.

More specifically, in the case of 55° C. shown in FIG. 44A, the liquid crystal molecules which first receive high-frequency electric field FH exceed a tilt angle corresponding to a first peak of maximum transmitted light and then exhibit a first maximum value of the transmitted light intensity. When superimposed electric field FL/H is applied, since a force for obliquely aligning the liquid crystal molecules by $|\Delta\epsilon H|$ is smaller than a force for homeotropically aligning them by $|\Delta\epsilon L|$ at a temperature of 55° C., the influence of low-frequency electric field FL strongly appears. Thus, the liquid crystal molecules begin to slowly stand and exceed the tilt angle. At this time, a second maximum value of the transmitted light intensity appears. Thereafter, the liquid crystal molecules are being slowly standing. When low-frequency electric field FL is applied at last, the liquid crystal molecules abruptly stand, and the transmitted light intensity is immediately decreased.

Figure 44B:
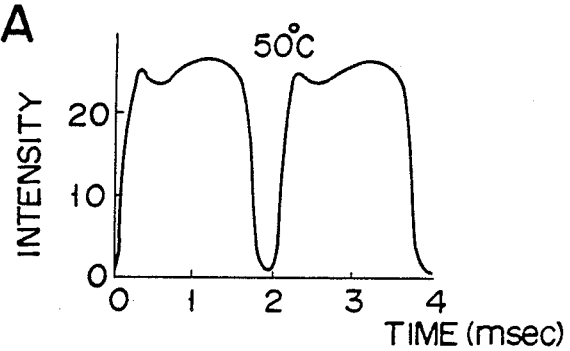

The case of 50° C. shown in FIG. 44B is substantially the same as that in the case of FIG. 44A. Since a difference between forces due to $|\Delta\epsilon H|$ and $|\Delta\epsilon L|$ is decreased, the influence of low-frequency electric field FL is eliminated, and behavior of the liquid crystal molecules upon application of superimposed electric field FL/H is further moderated. Therefore, until low-frequency electric field FL is applied, a decrease in transmitted light intensity is small, and good shutter characteristics can be obtained In the case of 45° C. shown in FIG. 44C, a response time is prolonged upon a decrease in temperature, and the liquid crystal molecules reach the tilt angle immediately before the completion of high-frequency electric field FH. At this temperature, since forces due to $|\Delta\epsilon H|$ and $|\Delta\epsilon L|$ are substantially balanced, a tilting rate of the liquid crystal molecules is extremely decreased. Therefore, the curve of the transmitted light intensity becomes flat. In this case, however, an unstable state may occur, i.e., the transmitted light intensity may be fluctuated as time elapses.

Figure 44C:
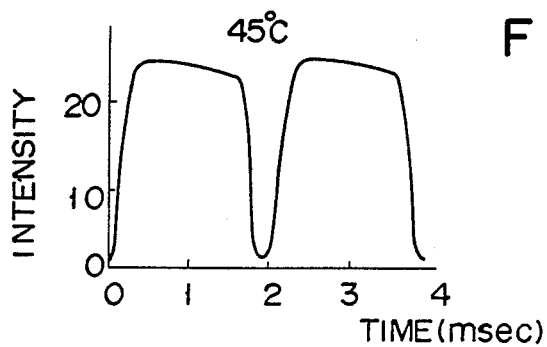
Figure 44D:
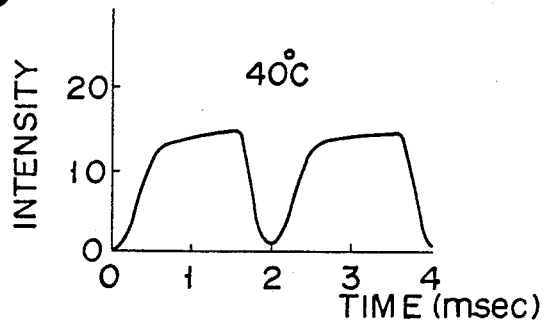
Figure 48A:
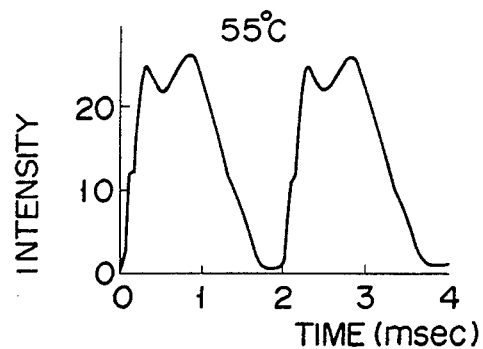
FIGS. 48A, 48B, 48C, and 48D are graphs showing the response characteristics when the liquid crystal shutter is driven by the drive method shown in FIGS. 43A to 43I, wherein first period T3 in a period in which a high-frequency electric field is applied is set to be 0.1 msec, next period T4 is set to be 0.4 msec, and period T5 of a non-electric field is set to be 0.1 msec.
Figure 48B:
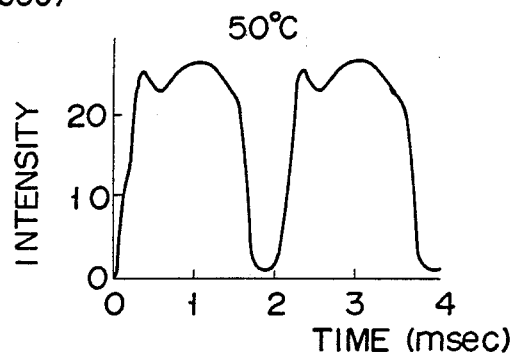
Figure 48C:
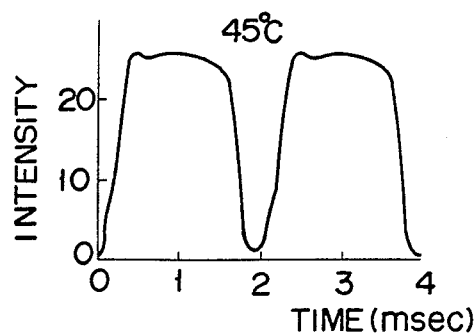
Figure 48D:
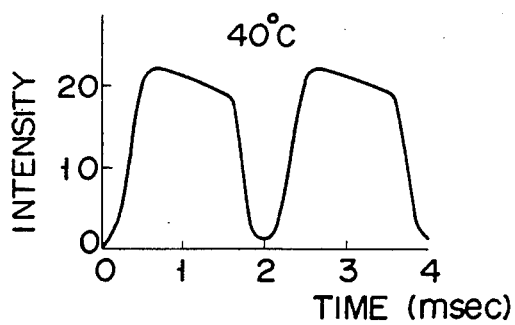
Figure 51A:
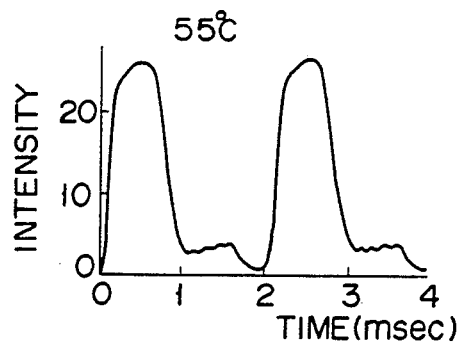
FIGS. 51A, 51B, 51C, and 51D are graphs showing the response characteristics at respective temperatures when the liquid crystal shutter is driven by the drive method shown in FIGS. 43A to 43I, wherein the total application time of the high-frequency electric field is set to be 0.3 msec.
Figure 51B:
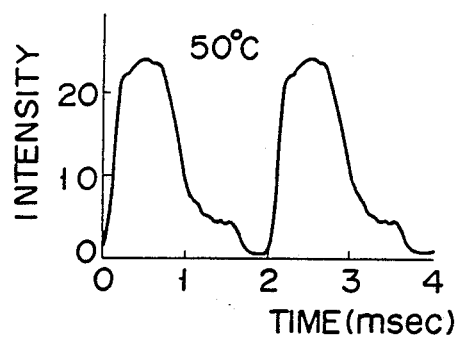
Figure 51C:
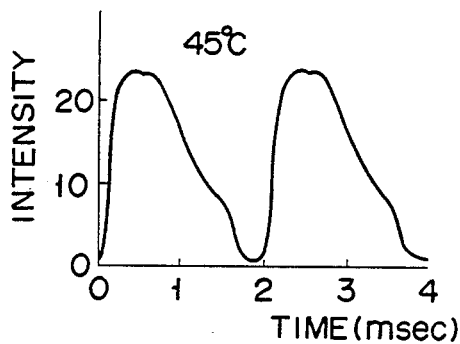
Figure 51D:
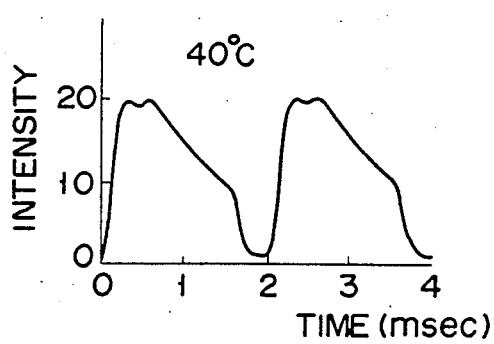
Figure 57A:
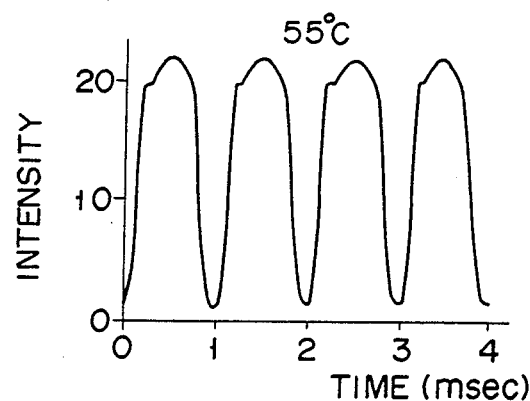
FIGS. 57A, 57B, and 57C are graphs showing the response characteristics at respective temperatures when liquid crystal shutter 2 using liquid crystal material (2) is driven by the drive method shown in FIGS. 52A to 52I.
Figure 57B:
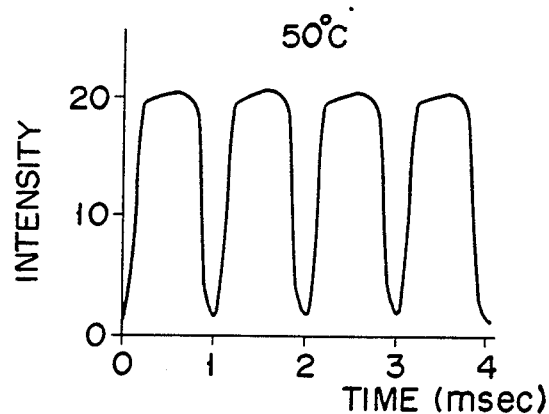
Figure 57C:
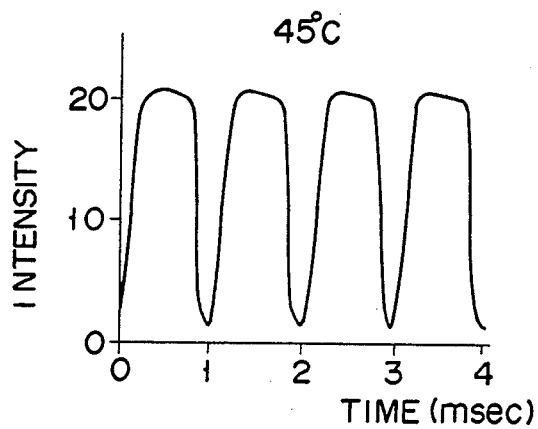

In the case of 40° C. shown in FIG. 44D, since a force due to $|\Delta\epsilon H|$ becomes stronger than a force due to $|\Delta\epsilon L|$ and an average application time of high-frequency electric field FH is prolonged, the high-frequency hysteresis effect strongly appears. For this reason, the homeotropic alignment state of the liquid crystal molecules upon application of the low-frequency electric field varies, and the liquid crystal molecules cannot behave as shown in FIGS. 44A to 44C. A domain which cannot be normally formed upon application of the electric field occurs, and the transmitted light intensity is decreased. Therefore, when high-frequency electric field FH is continuously applied, the temperature is preferably set to be 50° C.

FIGS. 45A to 45D respectively show the shutter characteristics at temperatures of 55° C., 50° C., 45° C., and 40° C. when the ON signal (C1-S1 signal) is continuously applied while T3=T4=0.25 msec, T5=0.1 msec, and T6=T7=0.4 msec in the liquid crystal drive signal waveforms shown in FIGS. 43A to 43I. In this case, drop of the transmitted light intensity is small even at a temperature of 40° C., and an unstable state in which the intensity fluctuates upon a lapse of time cannot be observed. A total application time of high-frequency electric field FH at this time is 0.5 msec, and is preferably half a selection period. In this manner, when non-electric field period T5 is interposed between periods T3 and T4, the influence of the high-frequency hysteresis effect can be reduced, the temperature characteristics can be improved, and the stable shutter ON/OFF operation can be performed. Since the individual liquid crystal molecules can be obliquely aligned in an identical direction, the transmitted light intensity of the liquid crystal shutter can be increased.

The response characteristics for a duration of periods T6 and T7 were examined. The shutter characteristics were measured while fixing T3=T4=0.25 msec and setting T6=T7=0.1, 0.2, 0.3, and 0.4 msec (in this case T5=0.4, 0.3, 0.2, and 0.1 msec, respectively). FIGS. 45A to 45D respectively show the shutter characteristics when T6=T7=0.4 msec.

When T6=T7=0.2 msec, the characteristics shown in FIGS. 46A to 46C are respectively obtained at temperatures 55° C., 50° C., and 45° C. during the continuous ON state. In FIG. 46C, at a temperature of 45° C., the liquid crystal does not almost respond, and brightness at a constant level is provided. When T6=T7=0.1 msec, the same state as shown in FIG. 46C is set at a temperature of 50° C. although not shown. This is because since high-frequency electric field components are included at a high ratio, the influence of the high-frequency hysteresis effect is remained high. When the OFF state continues (when low-frequency electric field FL is continuously applied), the liquid crystal can respond to even a one-shot ON electric field (high-frequency electric field FH), as shown in FIG. 47 since no high-frequency hysteresis effect remains.

When T6=T7=0.3 msec, the same response characteristics as in FIGS. 45A to 45D are exhibited.

As described above, the durations of periods T6 and T7 contribute to stability of the temperature characteristics. Even if the liquid crystal device is used while performing temperature adjustment, the durations of periods T6 and T7 must be 20% or more of those of periods T1 and T2, respectively. If these periods are too long, the application time of high-frequency electric field FH is inevitably shortened, and an amount of transmitted light is decreased. Therefore, the durations of periods T6 and T7 preferably fall within the range of 20% to 50% of those of periods T1 and T2.

When the shutter is to be turned on, high-frequency electric field FH is applied. A duration in which high-frequency electric field FH for initially, obliquely aligning the liquid crystal molecules was examined. The ratio of periods T3 and T4 were changed as shown in Table 8 below when a total FH application time during periods T3 and T4 was 0.5 msec, T5=0.1 msec, and T6=T7=0.4 msec.

TABLE 8

| No. | T3 | T4 |
|-----|------|------|
| 1 | 0.10 | 0.40 |
| 2 | 0.15 | 0.35 |
| 3 | 0.20 | 0.30 |
| 4 | 0.25 | 0.25 |
| 5 | 0.30 | 0.20 |
| 6 | 0.35 | 0.15 |

FIGS. 48A to 48D show the response characteristics of No. 1 in Table 8. In this case, as shown in FIGS. 48A to 48D, apparent response characteristics are not good. However, since high-frequency electric field FH is applied again after non-electric field period T5=0.1 msec, the transmitted light intensity is high, and good shutter operation can be provided within the temperature range of 45° to 50° C. When T5=0.2 msec, T3=0.1 msec, T4=0.4 msec, and T6=T7=0.4 msec, i.e., when period T5 is long and period T3 is short until the second high-frequency electric field FH is applied, the liquid crystal shutter cannot be set in a satisfactory ON state. Therefore, as shown in FIG. 49, since sufficient brightness cannot be maintained even at a temperature of 50° C., the liquid crystal shutter cannot have good response characteristics. Therefore, when period T3 is shorter than the response time of the liquid crystal, period T5 is preferably short. Since the response time at a temperature of 50° C. is about 0.15 msec, when period T3 is shorter than the response time of the liquid crystal, i.e., 0.1 msec, high-frequency electric field FH must be further applied in order to behave the liquid crystal at a tilt angle at which the first peak can be obtained. Therefore, a time until the second application must be shortened. A total application time of high-frequency electric field FH is associated with an amount of transmitted light. When the amount of transmitted light is to be increased, the application time of electric field FH can be prolonged. However, in this case, the temperature characteristics are degraded as shown in FIGS. 44A to 44D.

In this case, particularly in the low temperature range, the characteristics are degraded. In order to continue the ON state in selection period T1 over non-selection period T2, FH application time during period T4 can be prolonged. Note that if a shutter with good temperature characteristics is necessary even if the amount of transmitted light is small, FH application time is preferably shortened and periods T6 and T7 are preferably prolonged. As described above, periods T3, T4, T5, T6, T7, and T8 in the signal waveforms shown in FIGS. 43A to 43I can be arbitrarily set within the above-mentioned ranges in accordance with the conditions of use of the liquid crystal shutter.

According to the above-mentioned drive method, when a total application time of high-frequency electric field FH of the application electric fields is determined, the amount of transmitted light of the liquid crystal shutter can be arbitrarily set.

FIGS. 50A to 51D show the response characteristics when the total application time of high-frequency electric field FH is changed. FIGS. 50A to 50D show the response characteristics at respective temperatures when T3=0.25 msec, T4=0.15 msec, T5=0.2 msec, and T6=T7=0.4 msec. FIGS. 51A to 51D show the response characteristics at respective temperatures when T3=0.25 msec, T4=0.05 msec, T5=0.3 msec, and T6=T7=0.4 msec. More specifically, FIGS. 50A to 51D show the response characteristics at respective temperatures when T3+T4=0.4 msec and 0.3 msec. As can be seen from FIGS. 50A to 51D, a large amount of transmitted light can be obtained as compared to a case of ½ duty. However, as T3+T4 decreases, the amount of transmitted light comes closer to ½ duty. Therefore, T3+T4 is adjusted, so that the amount of light can be adjusted (Fourth Embodiment)

A fourth embodiment for increasing an amount of transmitted light in the ON state of the liquid crystal shutter, different from the above-mentioned third embodiment will now be described. In the time-divisional drive method of the fourth embodiment, the ON state is continued from the selection period until a part of the non-selection period as in the third embodiment, thereby increasing an amount of light. However, in this embodiment, a holding electric field for maintaining the ON state is different from that in the third embodiment. More specifically, in the time-divisional drive method of the third embodiment, during selection period T1, after high-frequency electric field FH for obliquely aligning the liquid crystal material to obtain the ON state is applied, a non-electric field state is set. During a predetermined period in the non-selection period, a superimposed electric field and a non-electric field are repetitively applied to maintain the obliquely aligned state of the liquid crystal molecules by electric field FH. Thereafter, low-frequency electric field FL is applied to the liquid crystal material at the end of non-selection period T2 to homeotropically align the liquid crystal molecules with respect to the substrates, thereby establishing the OFF state. This drive method is effective when unit write time Tw for executing ON or OFF operation and OFF operation of the liquid crystal shutter once (in the case of ½ duty) is sufficiently short as compared with a time until the liquid crystal molecules are returned to the homogeneous alignment state by natural relaxation.

The time-divisional drive method according to the fourth embodiment of the present invention will now be described. FIGS. 52A to 52I show voltage waveforms applied to the electrodes in this drive method and electric field waveforms applied to the liquid crystal material. Referring to FIGS. 52A to 52I, common voltage C1 is supplied to shutter portion Sa. The phase of a common voltage applied to shutter portion Sb is shifted from that of common voltage C1 by ½ a unit write period. Segment voltages S1 to S4 are applied to segment electrodes of the micro shutters. Segment voltages S1 and S2 cause shutter portion Sa to obtain the ON state, and voltages S3 and S4 cause it to obtain the OFF state. Segment voltages S1 and S3 cause shutter portion Sb to obtain the ON state and voltages S2 and S4 cause it to obtain the OFF state. Tw indicates a unit write time (1 msec); T1, a selection period (0.5 msec); T2, a non-selection period (0.5 msec); T3, an application time of high-frequency electric field FH; T4, a remaining period in period T2 excluding period T2; T5, a non-electric field application period; T6, an application time of low-frequency electric field FL which is provided at the end of the unit write period so as to set the shutter in the OFF state; and T7, a remaining period in non-selection period T2 excluding period T6. During period T4 in selection period T1 and period T7 in non-selection period T2, a holding voltage for maintaining the shutter ON or OFF state is applied.

Common voltage C1 is set to apply low-frequency voltage fL during period T5 in selection period T1 and during period T6 in non-selection period T2, to apply high-frequency voltage fH during the remaining period in the selection period T1, and to apply superimposed voltage fL/H of low-frequency voltage fL and high-frequency voltage f̄H̄ whose phase is inverted to that of high-frequency voltage fH. Segment voltage S1 for turning on both shutter portions Sa and Sb is set to apply low-frequency voltage fL during periods T5 and T6, and to apply high-frequency voltage fH during the remaining period. The phase of high-frequency voltage fH during period T3 in selection period T1 is inverted to that in the remaining period. In non-selection period T2, the phase of voltage fH in a period corresponding to period T3 is inverted to that in the remaining period. More specifically, segment voltage S1 is set to apply ON selection voltages having the same waveform during the selection period T1 and non-selection period T2. Segment voltage S2 for turning on shutter portion Sa and turning off shutter portion Sb is set to apply the ON selection voltage during selection period T1 and to apply an OFF selection voltage consisting of only low-frequency voltage fL during the non-selection period. Segment voltage S3 for turning off shutter portion Sa and turning on shutter portion Sb is set to apply the OFF selection voltage during selection period T1 and to apply the ON selection voltage during non-selection period T2. Segment voltage S4 for turning off both shutter portions Sa and Sb is set to apply the OFF selection voltages during selection period T1 and non-selection period T2.

C1-S1, C1-S2, C1-S3, and C1-S4 in FIGS. 52F to 52I indicate synthesized waveforms of common voltage C1 and segment voltages S1 to S4, respectively. Electric fields of the synthesized waveforms are applied to the liquid crystal material. Electric fields C1-S1 and C1-S2 cause shutter portion Sa to turn on during selection period T1 and to turn off during non-selection period T2. More specifically, high-frequency electric field FH is applied to the liquid crystal material during period T3 to obliquely align the liquid crystal molecules, a non-electric field is applied thereto during period T4, and superimposed electric field FL/H of low- and high-frequency electric fields FL and FH and a non-electric field are repetitively applied thereto, thereby maintaining the oblique alignment state. Thereafter, upon application of low-frequency electric field FL, the liquid crystal molecules are homeotropically aligned, and shutter portion Sa is in the OFF state. Electric fields C1-S3 and C1-S4 cause shutter portion Sa to turn off during both selection period T1 and non-selection period T2. The electric field causes the electrode to generate superimposed electric field FL/H during a period in selection period T1 other than period T5, to generate a non-electric field during period T5, to repetitively generate superimposed electric field FL/H and the non-electric field during period T7 in non-selection period T2, and thereafter to generate low-frequency electric field FL during period T6.

In this manner, during the ON operation, even if the non-electric field state is set after application of high-frequency electric field FH during period T3, the liquid crystal molecules behave slowly. Therefore, if write period Tw is short, behavior of the liquid crystal molecules is small, and they will not largely exceed a tilt angle at which a maximum amount of transmitted light can be obtained. Since the liquid crystal molecules behave slowly due to the superimposed electric field applied thereafter, this state can be maintained. More specifically, this drive method utilizes the fact that behavior of the liquid crystal molecules upon application of the non-electric field and superimposed electric field FL/H is slow as compared to the duration of write period Tw, thereby maintaining the ON state upon application of high-frequency electric field FH. In the OFF waveform, although the non-electric field is applied, since write period Tw is short, behavior of the liquid crystal molecules to return to the initial alignment state by the non-electric field is very small. Therefore, the OFF state can be maintained.

A case will be described wherein the liquid crystal shutter shown in FIGS. 25 and 26 is driven by the above-mentioned method. In this liquid crystal shutter, liquid crystal material (1) and liquid crystal material (2) shown in Table 9 below were used.

TABLE 9

| (Liquid Crystal Material 2) | | | |
|---|---|---|---|
| NI Point | Viscosity | Refractive Index | Optical Anisotropy |
| 139.4° C. | 88 cp at 25° C. | $n\parallel$ = 1.692 (544 nm) $n\perp$ = 1.507 (at 23° C.) | $\Delta n$ = 0.185 |

Liquid crystal material (1) described above has refractive indexes of $n// = 1.638$ and $n\perp = 1.498$ with respect to light at a wavelength of 544 nm at a temperature of 23° C., and has optical anisotropy $\Delta na = 0.14$. FIG. 53 shows the temperature dependency of the dielectric dispersion phenomenon of liquid crystal material (2). As can be understood from the comparison among Table 1 showing the physical characteristics of liquid crystal material (1), FIG. 3, Table 9 showing the physical characteristics of liquid crystal material (2), and FIG. 53, these liquid crystal materials have no difference in their dielectric characteristics, and optical anisotropy $\Delta na$ of liquid crystal material (2) is larger than that of material (1).

As described above, the liquid crystal shutter shields light in a state wherein the liquid crystal molecules are homeotropically aligned. The liquid crystal molecules are inclined from this state, and when the tilt angle of the molecules reaches predetermined angle $\phi max$, the maximum transmitted light intensity is obtained. Tilt angle $\phi max$ depends on a product of refractive index anisotropy $\Delta na$ of the liquid crystal material and thickness (cell gap) d of the liquid crystal layer. FIGS. 54 and 55 respectively show transmitted light intensities with respect to tilt angles $\phi$ when these liquid crystal materials are used. For example, when liquid crystal material (1) is sealed in a liquid crystal cell having a cell gap of 4.36 $\mu$m (liquid crystal shutter 1), $\phi max$ is 43.7 (deg), as shown in FIG. 54. When liquid crystal material (2) is sealed in a liquid crystal cell having a cell gap of 4.28 $\mu$m (liquid crystal shutter 2), $\phi max$ is 38.2 (deg), as shown in FIG. 55. In this manner, when the cell gaps are substantially equal to each other, the liquid crystal shutter having larger optical anisotropy $\Delta na$ of the liquid crystal material has smaller $\phi max$. The smaller $\phi max$ is, the shorter a time required for tilting the liquid crystal molecules at angle $\phi max$ becomes, resulting in short response time. Note that even if cell gap d is increased, although $\phi max$ is decreased, an electric field intensity is weakened in this case, and hence, the response time is prolonged.

In this manner, a short response time contributes to an increase in transmitted light intensity and amount of transmitted light. If $\phi$max is small, even if the viscosity of the liquid crystal material is changed upon change in temperature, a tilt angle of the liquid crystal molecules is small. Therefore, behavior of the molecules is not so affected, and hence, the temperature characteristics can be stabilized.

Liquid crystal shutter 1 using liquid crystal material (1) and liquid crystal shutter 2 using liquid crystal material (2) were driven by electric fields shown in FIGS. 52A to 52I. FIGS. 56A to 57C respectively show the shutter characteristics at temperatures 55° C., 50° C., and 45° C. when ON electric field C1-S1 shown in FIG. 52F was continuously applied and T3=T4=T5=T6=T7=0.25 msec. In FIGS. 56A to 57C, time (msec) is plotted along the abscissa, and the transmitted light intensity is plotted along the ordinate. As can be seen from FIGS. 56A to 57C, liquid crystal shutter 2 using liquid crystal material (2) with large optical anisotropy $\Delta$na has less temperature dependency as compared to liquid crystal shutter 1 using liquid crystal material (1) with a small optical anisotropy $\Delta$na.

When the liquid crystal shutter is driven by the drive method as shown in FIGS. 52A to 52I, a sufficient amount of light can be obtained using either liquid crystal material (1) with small optical anisotropy $\Delta$na or liquid crystal material (2) with a large $\Delta$na. However, as described above, since the liquid crystal shutter using the liquid crystal material with a small optical anisotropy $\Delta$na has inferior temperature characteristics, the liquid crystal material with a large $\Delta$na is preferably used. When write period Tw is short, an application time of high-frequency electric field FH is short, and hence, a response time is prolonged. Therefore, a completely ON state cannot be obtained during application of high-frequency electric field FH. For this reason, the liquid crystal material with a large optical anisotropy $\Delta$na is preferable.

Figure 60:
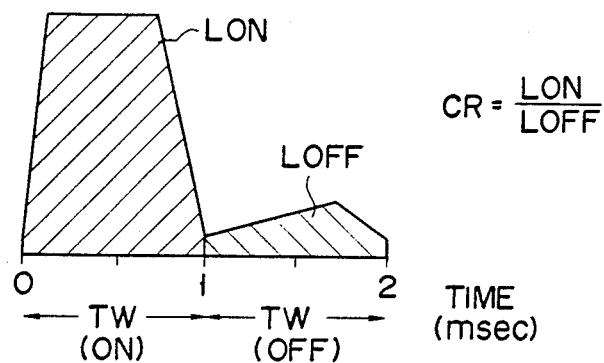
FIG. 60 is a view for explaining the definition of an amount of light.

FIGS. 58 and 59 show the temperature dependency of the shutter operation characteristics when the above-mentioned liquid crystal shutter is driven by the drive method shown in FIGS. 52A to 52I. FIG. 58 shows the characteristics when T3=T4=T5=T6=T7=0.25 msec in the drive method shown in FIGS. 52A to 52I. FIG. 59 shows the characteristics when T3=0.2 msec, T4=0.3 msec, and T5=T6=0.25 msec in the drive method shown in FIGS. 52A to 52I. An ON integrated amount of light LON and an OFF integrated amount of light LOFF are defined as shown in FIG. 60. Contrast CR is given by CR=LON/LOFF.

As can be seen from FIGS. 58 and 59, according to this drive method, the liquid crystal shutter can be ON/OFF operated at high speed since write period Tw=0.1 msec, a change in shutter operation characteristics due to a change in temperature is small, and a large amount of light can be obtained on the ON state. In particular, even if application period T3 of high-frequency electric field FH is shortened from 0.25 msec to 0.2 msec, the shutter operation characteristics are not so changed. Therefore, since the application period of the high-frequency electric field can be shortened in this manner, a high-frequency current due to the application of the high-frequency electric field can be eliminated, resulting in reduced power consumption and heat generation.

The response characteristics and the shutter operation characteristics by the drive method shown in FIGS. 38A to 38I will be described for the sake of comparison between the drive method of the fourth embodiment and the above-mentioned complete $\frac{1}{2}$ duty drive method.

Figure 61:
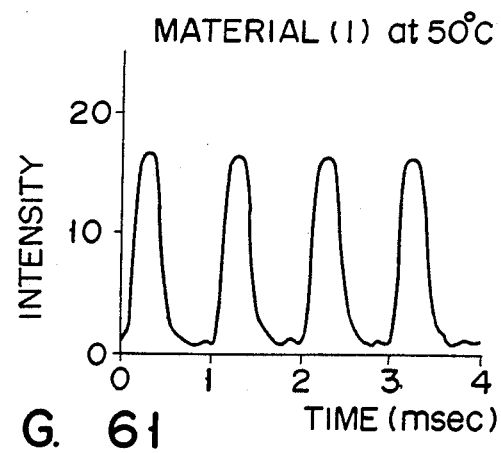
FIG. 61 is a graph showing the response characteristics when the liquid crystal shutter using liquid crystal material (1) is driven by the drive method shown in FIGS. 38A to 38I, wherein a unit write time is set to be 1 msec.
Figure 62:
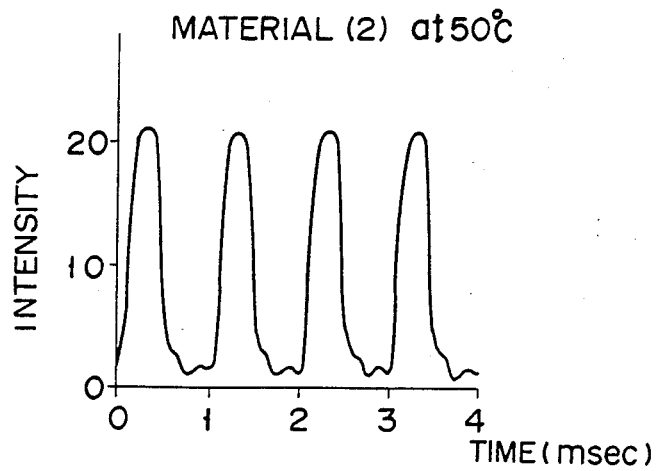
FIG. 62 is a graph showing the response characteristics when the liquid crystal shutter using liquid crystal material (2) is driven by the drive method shown in FIGS. 38A to 38I, wherein a unit write period is set to be 1 msec.
Figure 63:
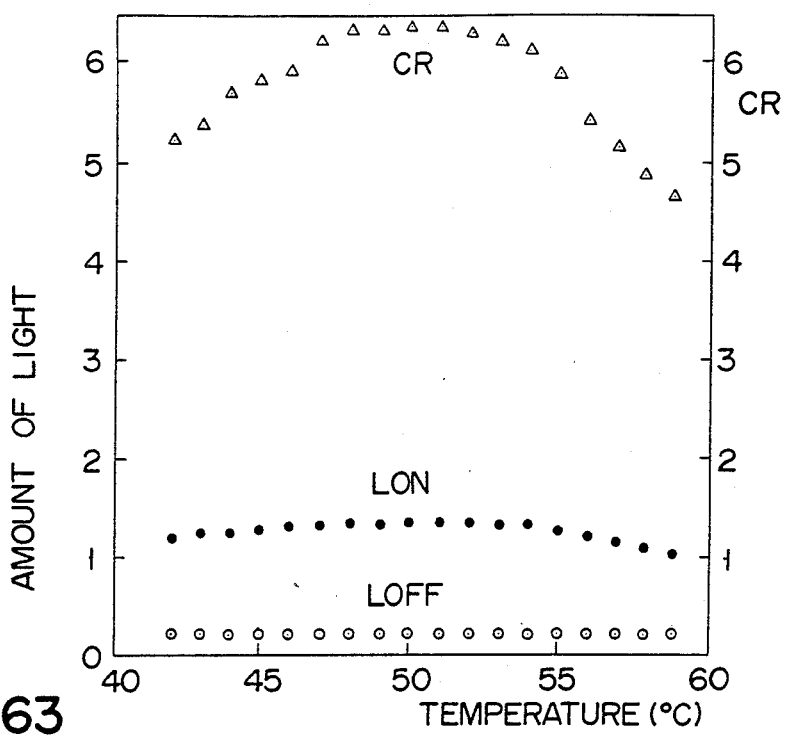
FIG. 63 is a graph showing the temperature characteristics of the liquid crystal shutter having the response characteristics shown in FIG. 61.
Figure 64:
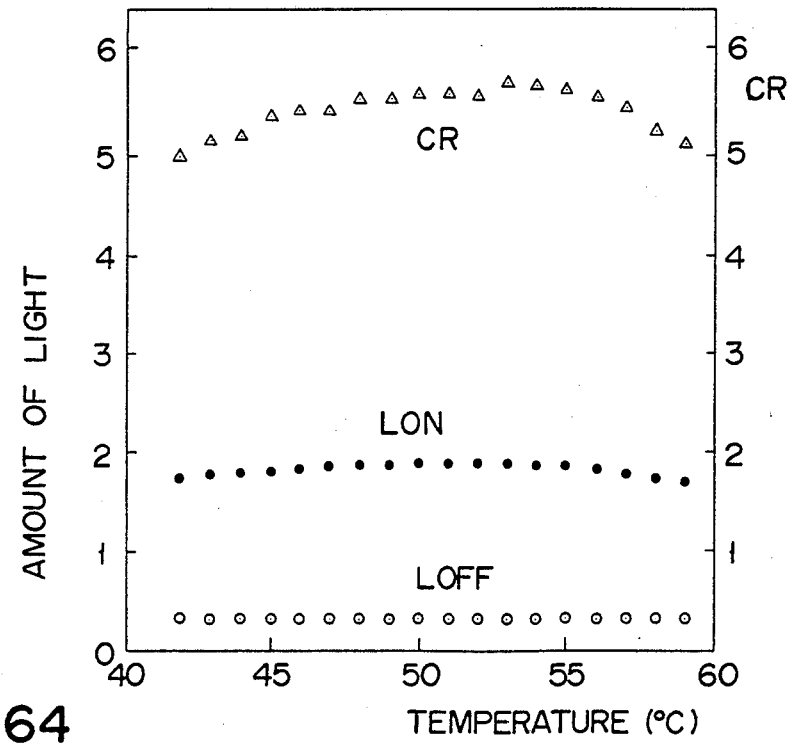
FIG. 64 is a graph showing the temperature characteristics of the liquid crystal shutter having the response characteristics shown in FIG. 62.
Figure 65:
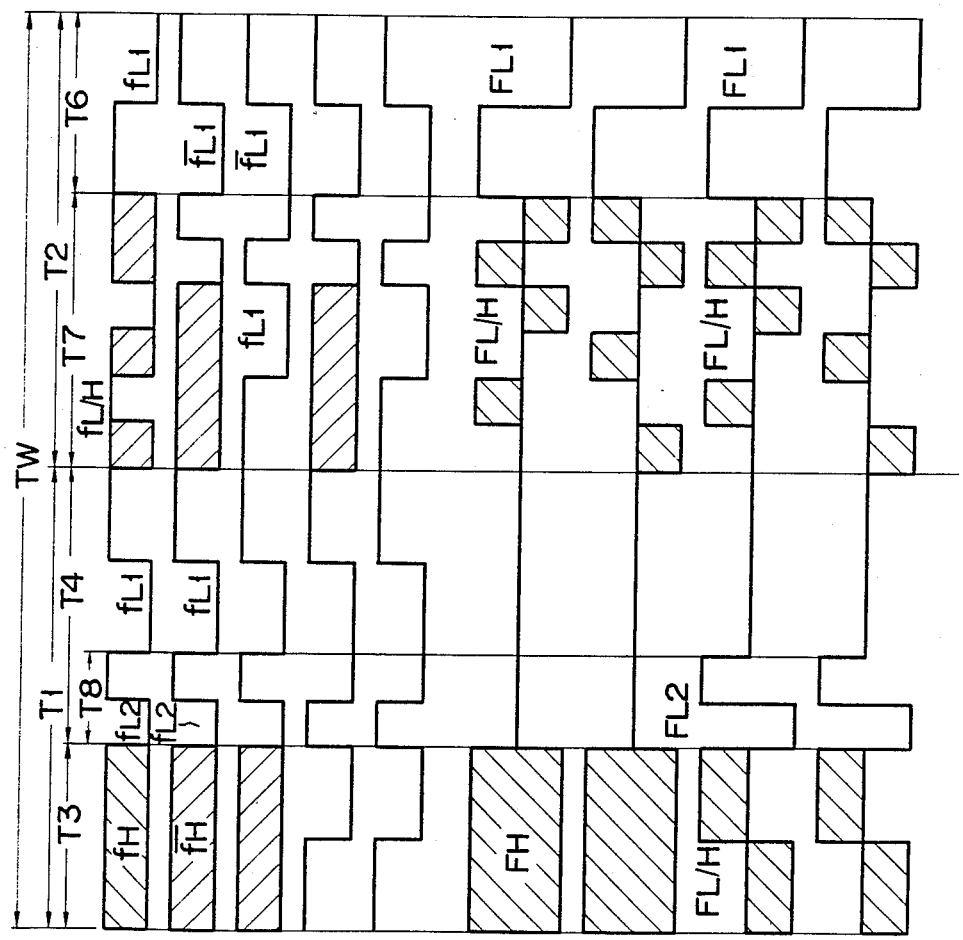
FIGS. 65A to 65I are waveform charts showing a time-divisional drive method as a first modification of the fourth embodiment of the present invention.

FIG. 61 shows the optical response characteristics at a temperature of 50° C. when ON electric field C1-S1 shown in FIG. 38F is continuously applied to liquid crystal shutter using liquid crystal material (1). FIG. 62 shows the optical response characteristics at a temperature of 50° C. when ON electric field C1-S1 shown in FIG. 38F is continuously applied to liquid crystal shutter using liquid crystal material (2). FIGS. 63 and 64 respectively show the shutter operation characteristics when the above ON electric field is applied using liquid crystal materials (1) and (2). Note that high-frequency electric field FH as an electric field applied to the liquid crystal material is at 200 kHz, amplitude Vop is 25 V, selection periods T1 and non-selection period T2 in the electric field waveform are respectively 0.5 msec, an application time of high-frequency electric field FH in selection period T1 is 0.13 msec, and an application time of low-frequency electric field FL in selection period T1 is 0.09 msec. In this case, liquid crystal material (1) was sealed in a liquid crystal cell having a cell gap of 4.36 $\mu$m, liquid crystal material (2) was sealed in a liquid crystal cell having a cell gap of 4.28 $\mu$m, and a fluorescent lamp having an emission peak at a wavelength of 543 nm was used as the light source, so that the shutter operation characteristics were measured.

As is apparent from the comparison between the characteristics shown in FIGS. 56A to 59 and FIGS. 61 to 64, the liquid crystal shutter driven by the drive method shown in FIGS. 52A to 52I has a larger amount of ON light than that of the liquid crystal shutter driven by the drive method shown in FIGS. 38A to 38I by 70% or more, and has less temperature dependency of the contrast.

According to the drive method of the fourth embodiment, the liquid crystal shutter can have a large amount of ON light and can be driven at high speed.

However, if the non-electric field state during period T5 is prolonged, an amount of transmitted light of the shutter portion upon application of the OFF electric field is slightly increased, and this may result in a decrease in contrast. In order to prevent a decrease in contrast, the transmitted light intensity in the OFF state must be further decreased. For this purpose, period T8 for applying the low-frequency electric field or the superimposed electric field is provided during non-electric field period T4 after period T3 in which the high-frequency electric field is applied, thereby decreasing the transmitted light intensity in the OFF state.

A first modification of the fourth embodiment of the present invention will now be described. FIGS. 65A to 65I respectively show voltages applied to electrodes and electric fields applied to the liquid crystal material in the drive method of the first modification. In this drive method, in order to reduce an amount of transmitted light in the OFF state, period T8 for applying a low-frequency electric field is provided after period T3 for applying high-frequency electric field FH, as indicated by C1-S3 and C1-S4 in FIGS. 65H and 65I. In this manner, since low-frequency electric field FL is applied during period T8, the liquid crystal shutter can be completely turned off in period T8, and hence, the amount of light in the OFF state of this liquid crystal shutter can be reduced. FIG. 66 shows the temperature dependency of the shutter operation characteristics when T3=0.2 msec, T4=0.25 msec, and T8=0.1 msec in the drive method shown in FIGS. 65A to 65I. As can be seen from FIG. 66, the temperature characteristics are good.

A second modification of the fourth embodiment of the present invention will now be described. FIGS. 67A to 67I respectively show voltages applied to electrodes and electric fields applied to the liquid crystal material in the drive method of the second modification. This drive method aims at reducing an amount of light in the OFF state as in the case of FIGS. 65A to 65I. Period T8 is provided at substantially the middle of selection period T1, thus applying superimproved electric field. FIGS. 68A and 68B show the optical response characteristics at a temperature of 50° C. when liquid crystal shutter 2 is driven by this drive method to maintain the ON and OFF operations. In this case, application periods of electric fields were set so that T3=T4=T6=T7=0.25 msec, and T8=0.1 msec. In this manner, since the superimposed electric field is applied to the liquid crystal material at the middle of the non-electric field period, behavior of the liquid crystal molecules can be suppressed by the influence of the low-frequency components of the superimposed electric field. As a result, an increase in amount of light in the OFF state can be prevented.

FIG. 69 shows the temperature dependency of the shutter operation characteristics when T3=T4=0.25 msec and T8=0.1 msec in the drive method shown in FIGS. 67A to 67I. In this case, good temperature characteristics can be obtained. As described above, the amount of light in the OFF state is reduced to improve the contrast As described above, the drive method of the fourth embodiment utilizes the fact that a natural relaxation speed of the liquid crystal molecules from the homeotropic alignment to the homogeneous alignment (initial alignment state) is low and behavior of the liquid crystal molecules is suppressed upon application of the superimposed electric field, so that the liquid crystal shutter is controlled to maintain the ON state upon application of the high-frequency electric field over the non-selection period. Therefore, this drive method can be applied to a case wherein a natural relaxation time of the liquid crystal material and a time required for aligning the liquid crystal molecules which is controlled by the superimposed electric field to a stable state (initial alignment state) are sufficiently longer than unit write period Tw. In other words, this method is effective when unit write time Tw is sufficiently shorter than the natural relaxation time and a time required to reach the stable state. For example, the drive method of this embodiment is preferably applied to a case wherein Tw is shorter than 1.5 msec or is equal thereto.

(Fifth Embodiment)

A fifth embodiment of the present invention will be described hereinafter.

In the drive method of the third embodiment described above, a high-frequency electric field is applied to obliquely align the liquid crystal molecules, and this state is maintained upon application of a superimposed electric field and a holding electric field consisting of repetition of the superimposed electric field and non-electric field. In the third embodiment, the liquid crystal shutter can be satisfactorily operated. However, the liquid crystal molecules unstably behave with respect to the superimposed electric field. If the absolute value of dielectric anisotropy $\Delta\epsilon$ of the liquid crystal material is changed upon a change in temperature, the degree of effects of the high- and low-frequency components included in the superimposed electric field with respect to the liquid crystal material is changed. As a result, the temperature stability of the liquid crystal shutter remains unstable.

The drive method of the fourth embodiment described above is not suitable for long write period Tw since the amount of light in the OFF state is increased and at the same time the amount of light in the ON state is decreased.

The drive method of the fifth embodiment described below is suitable for driving the liquid crystal shutter with a relatively long write period. In this drive method, a high-frequency electric field is applied at least twice during a selection period in which the ON operation is selected, and a low-frequency electric field is applied during at least one period between the adjacent high-frequency electric fields, thereby driving the liquid crystal shutter. FIGS. 70A to 70J respectively show voltages applied to electrodes and electric fields applied to the liquid crystal material with the time-divisional drive method of the fifth embodiment. Referring to FIGS. 70A to 70J, common voltages C1 and C2 are respectively applied to shutter portions Sa and Sb. The phase of common voltage C2 is shifted from that of common voltage C1 by a period ½ a unit write time. Segment voltages S1 to S4 are applied to segment electrodes of micro shutters. Segment voltages S1 and S2 set shutter portion Sa in the ON state, and segment voltages S3 and S4 set it in the OFF state. Segment voltages S1 and S3 set shutter portion Sa in the ON state, and voltages S2 and S4 set shutter portion Sb in the OFF state. Tw indicates a unit write period (2.38 msec); T1, a selection period (1.19 msec); and T2, a non-selection period (1.19 msec). Selection period T1 consists of periods T3, T4, T5, and T6.

Common voltage C1 is set to apply low-frequency voltage fL during period T4 in selection period T1 and to apply high-frequency voltage fH during the remaining period. In non-selection period T2, voltage C1 is set to repetitively apply superimposed voltage fL/H and low-frequency voltage fL during period T7. The phase of the high-frequency component is shifted by 180° from that of the high-frequency voltage applied during the selection period. During period T8 in non-selection period T2, voltage C1 is set to apply low-frequency voltage fL. Common voltage C2 has a waveform in which selection period T1 of voltage C1 is replaced with non-selection period T2 thereof. Segment voltage S1 for turning on both shutter portions Sa and Sb includes low-frequency voltage $\overline{fL}$ whose phase is inverted to that of low-frequency voltage fL included in the common voltage. Voltage S1 also includes high-frequency voltage $\overline{fH}$ whose phase is inverted to that of high-frequency voltage included in the common voltage. A voltage having a waveform applied during this selection period corresponds to an ON operation voltage for turning on shutter portions Sa and Sb during the selection period. During non-selection period T2 of segment voltage S1, the ON operation voltage is applied. Segment voltage S2 for turning on shutter portion Sa and turning off shutter portion Sb is set to apply the ON operation voltage during selection period T1 and to apply the OFF operation voltage consisting of only low-frequency voltage fL during non-selection period T2. Segment voltage S3 for turning off shutter portion Sa and turning on shutter portion Sb is set to apply the OFF operation voltage during selection period T1 and the ON operation voltage during non-selection period T2. Segment voltages S4 for turning off shutter portions Sa and Sb is set to apply the OFF operation voltages during selection period T1 and non-selection period T2.

In FIGS. 70G to 70J, C1-S1, C1-S2, C1-S3, and C1-S4 represent synthesized waveforms of common voltage C1 and segment voltages S1 to S4. The electric fields of the synthesized waveforms are applied to the liquid crystal material. Electric fields C1-S1 and C1-S2 cause shutter portion Sa to be turned on during selection period T1 and to turn off it during non-selection period T2. In selection period T1, this electric field applies to the liquid crystal material high-frequency electric field FH during period T3, low-frequency electric field FL during period T4, high-frequency electric field FH during period T5, and superimposed electric field FL/H during non-selection period T2. During non-selection period T2, a non-electric field and a superimposed electric field are repetitively applied during a period corresponding to period T3 in selection period T1, a non-electric field and a superimposed electric field are repetitively applied during a period corresponding to period T5, and low-frequency electric field FL is applied during period T8. Electric fields C1-S3 and C1-S4 have a waveform for turning off shutter portion Sa during selection period T1 and non-selection period T2. In these electric fields, low-frequency electric field FL is applied during period T4 in selection period T1, a period in selection period T2 corresponding to period T4, and period T8, and superimposed electric field FL/H is applied or superimposed electric field FL/H and the non-electric field are repetitively applied during the remaining periods.

Figure 70:
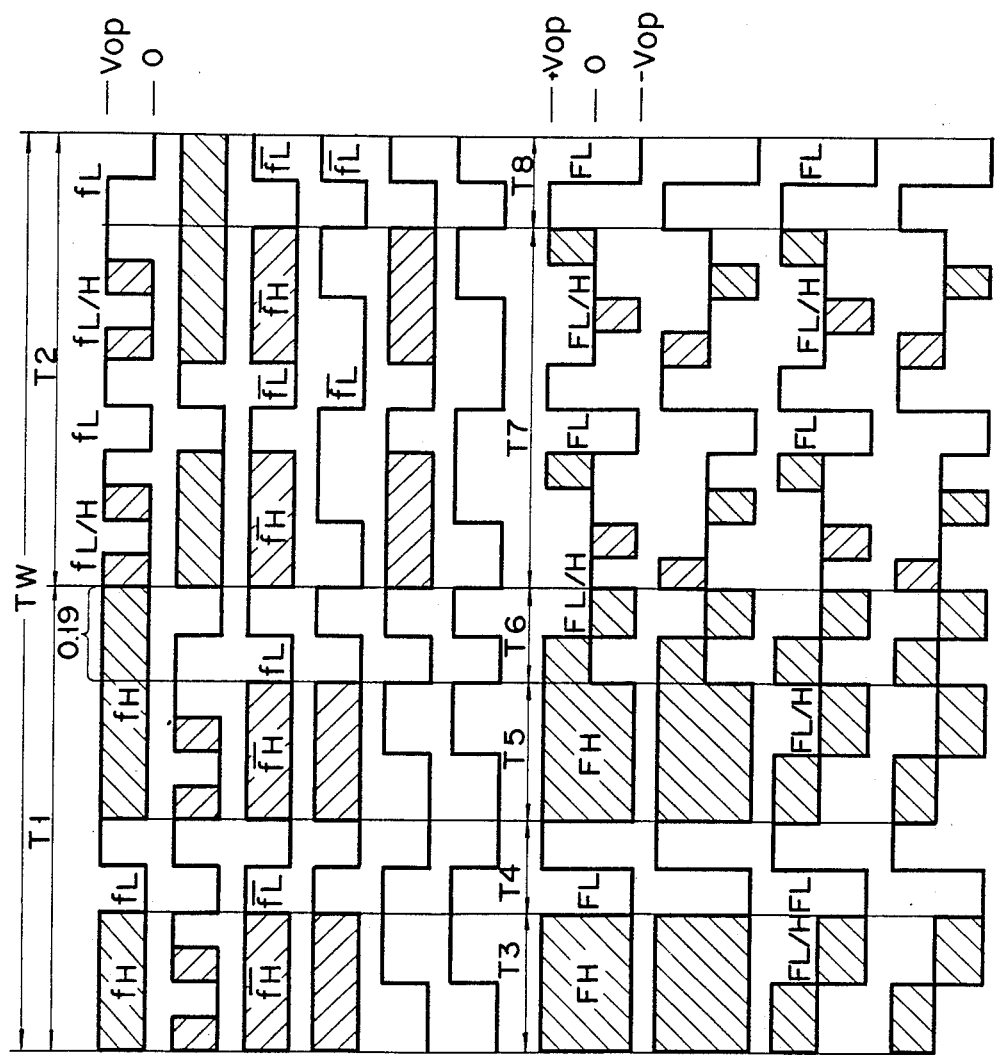
FIGS. 70A to 70J are waveform charts showing a time-divisional drive method according to a fifth embodiment of the present invention.

Shutter portion Sa receiving the electric field indicated by C1-S1 and C1-S2 shown in FIGS. 70G and 70H is turned on upon application of electric field FH during period T3, and is turned off upon application of electric field FL during period T4. During subsequent period T5, portion Sa is again turned on, and maintains the ON state upon application of a holding electric field consisting of electric field FL/H applied thereafter during period T6. Shutter portion Sa is turned off upon application of electric field FL during period T7, maintains the OFF state upon application of electric field FL/H, and is completely turned off upon application of electric field FL at the end of period Tw. Shutter portion Sa receiving the electric field indicated by C1-S3 and C1-S4 in FIGS. 70I and 70J maintains a state set by electric field FL applied before selection period T1, upon application of electric field FL/H during period T3, and is completely turned off upon application of electric field FL during period T4. The OFF state of shutter portion Sa can be maintained by electric field FL/H and repeating waveforms of FL/H and the non-electric field which are applied during periods T5 and T6 and until the middle of period T7. Portion Sa is turned off upon application of electric field FL during period T7. Portion Sa maintains this state upon repetitive application of FL/H and the non-electric field, and is completely turned off upon application of electric field FL at the end of period T2.

In this manner, when the high-frequency electric field is repetitively applied, and the low-frequency electric field is applied between adjacent high-frequency electric fields, the liquid crystal shutter repeats the ON and OFF states, and a total time of the ON state can be prolonged, resulting in an increase in amount of light. Since the low-frequency electric field is applied at short time intervals, the influence of the hysteresis effect of the high-frequency electric field can be eliminated, and the temperature stability characteristics can be improved.

Figure 71:
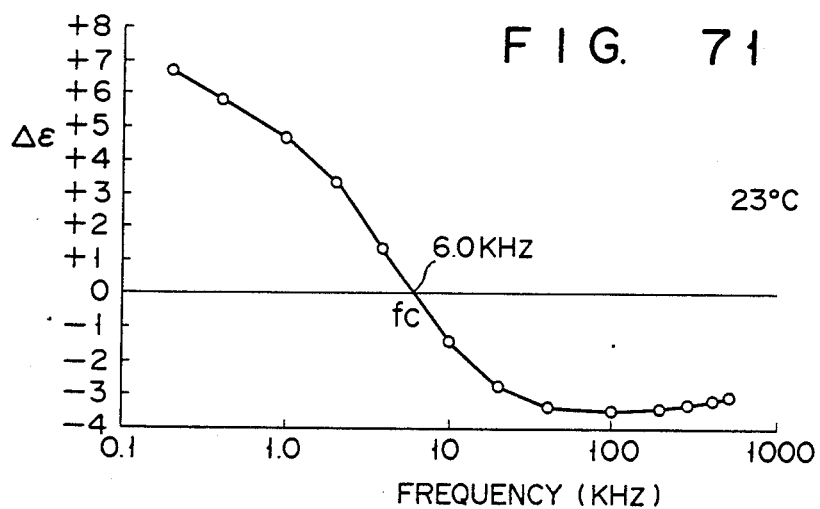
FIG. 71 is a graph showing frequency dependency of a dielectric anisotropy of liquid crystal material (3) used for the liquid crystal shutter driven by the drive method shown in FIGS. 70A to 70J.

The operation characteristics when the liquid crystal shutter shown in FIGS. 25 and 26 is driven by the above-mentioned method will now be described. As a liquid crystal material for two-frequency addressing, liquid crystal material 3 shown in Table 10 below was used, and a liquid crystal cell having a cell gap of 4.5 µm was used. FIG. 71 shows the frequency dependency of dielectric anisotropy $\Delta\epsilon$ at a temperature of 23° C. of liquid crystal material 3.

TABLE 10

| NI Point | Viscosity | Refractive Index |
|---|---|---|
| 153° C. | 86 cp at 30° C. | $n\|\| = 1.643$ (589 nm) $n\perp = 1.499$ (at 23° C.) |

FIGS. 72A to 75D respectively show the shutter operation characteristics at temperatures 60° C., 55° C., 50° C., and 45° C. when electric field C1-S1 shown in FIG. 70G for obtaining the ON state is continuously applied to the liquid crystal shutter and T3 (T5) and T4 was changed as shown in Table 11 below while setting T6=0.19 msec (constant). In FIGS. 72A to 75D, time is plotted along the abscissa, and the transmitted light intensity is plotted along the ordinate.

TABLE 11

| No. | T3 (T5) (msec) | T4 (msec) |
|---|---|---|
| 1 | 0.45 | 0 |
| 2 | 0.4 | 0.2 |
| 3 | 0.35 | 0.3 |
| 4 | 0.3 | 0.4 |

The shutter operation characteristics were measured under the condition in that a fluorescent lamp having an emission peak at a wavelength of 543 nm was used as the light source, high-frequency electric field FH was set at 200 kHz, and Vop was set to be 25 V. Since a superimposed electric field or a holding electric field consisting of the superimposed electric field and the non-electric field is applied during period T6 and a part of subsequent period T7 in the liquid crystal drive signal waveforms shown in FIGS. 70A to 70J, the ON state during period T1 can be prolonged up to a part of period T7 in period T2. When low-frequency electric field FL is applied during period T8 at the end of the unit write period, the shutter is turned off, thus completing a single shutter operation. As shown in FIGS. 72A to 75D, the shutter operation characteristics are changed in accordance with durations of periods T3 (T5) and T4.

Figure 72A:
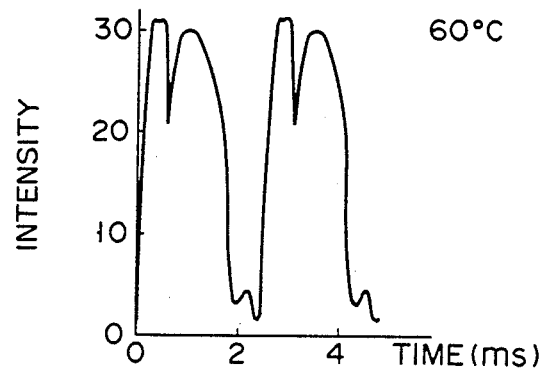
FIGS. 72A and 72B are graphs showing the response characteristics when the liquid crystal shutter is driven by the drive method shown in FIGS. 70A to 70J, wherein high-frequency application period T3 is set to be 0.45 msec and low-frequency application period T4 is set to be 0.1 msec.
Figure 72B:
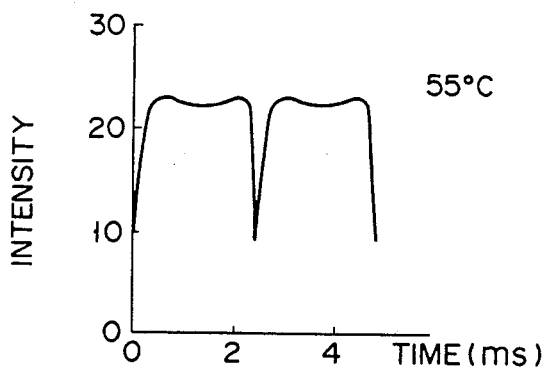

More specifically, in the electric field of waveform No. 1, period T4 is short, i.e., 0.1 msec, and hence, high-frequency electric field FH is applied too long. Therefore, as shown in FIGS. 72A and 72B, the liquid crystal cannot respond to low-frequency electric field FL during period T4 even at a temperature of 60° C., and the OFF state cannot be obtained. At a temperature of 55° C., the liquid crystal is influenced by only high-frequency electric field FH, and provides an entirely dark state.

Figure 73A:
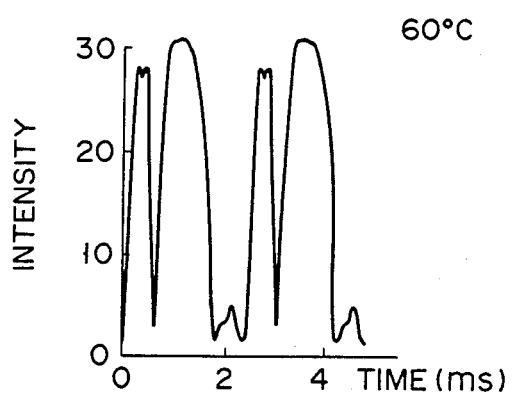
FIGS. 73A, 73B, and 73C are graphs showing the response characteristics at respective temperatures when the liquid crystal shutter is driven by the drive method shown in FIGS. 70A to 70J, wherein high-frequency application period T3 is set to be 0.4 msec and low-frequency application period T4 is set to be 0.2 msec.
Figure 73B:
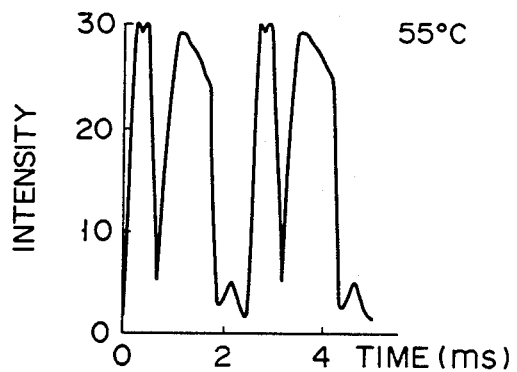
Figure 73C:
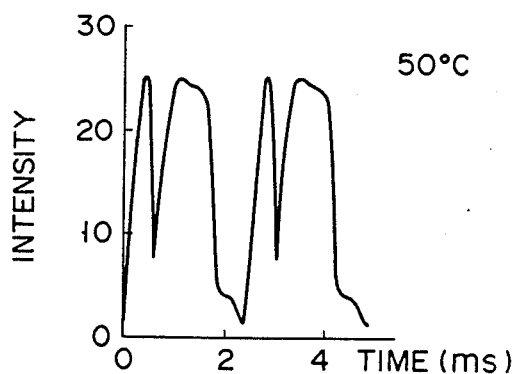

In the electric field of waveform No. 2, since period T4 is prolonged to 0.2 msec, although drop to the OFF state becomes deep, the complete OFF state is not established, as compared to the case of No. 1, as shown in FIGS. 73A to 73C. More specifically, the influence of the high-frequency hysteresis effect is still large. For this reason, the liquid crystal provides a dark state by the influence of high-frequency electric field FH at a temperature of about 50° C. Therefore, the electric field of this waveform is unstable with respect to a change in temperature.

In the electric field of waveform No. 3, since period T4 is 0.3 msec, the OFF state during period T4 can be satisfactorily maintained as shown in FIGS. 74A to 74D. For this reason, the shutter operation can be performed even at a low temperature of 45° C. (FIG. 74D).

In the electric field of waveform No. 4, since period T4 is long, i.e., 0.4 msec, the tendency in No. 3 becomes noticeable, and stable shutter characteristics against a change in temperature can be obtained.

In this manner, the duration of period T4 contributes to the temperature stability characteristics. In order to improve the temperature stability characteristics, period T4 is preferably set to be longer than a response time in the OFF state of the liquid crystal (i.e., 0.15 to 0.2 msec).

Figure 76:
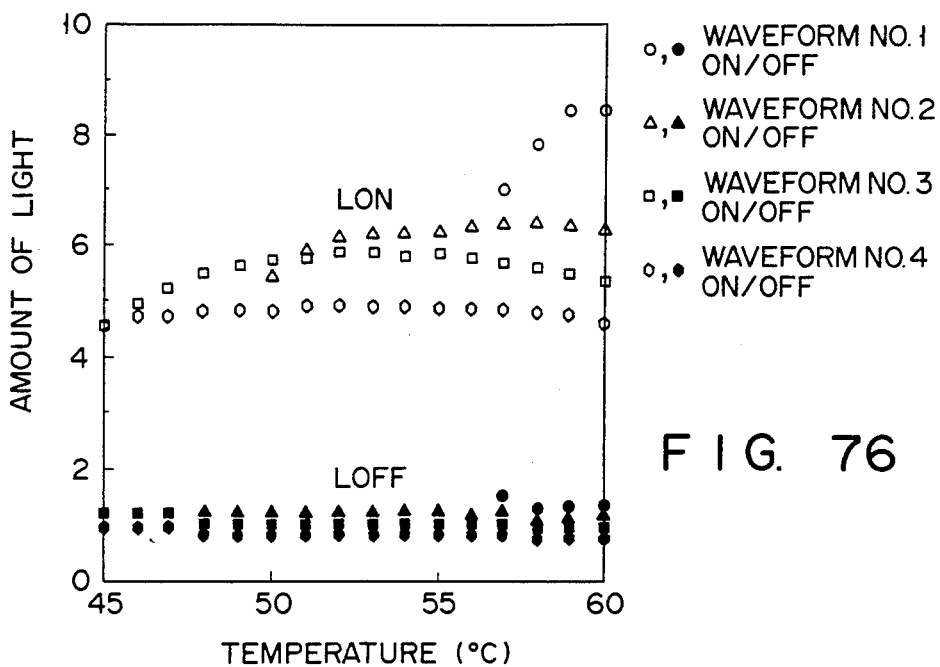
FIG. 76 is a graph showing the temperature characteristics when the liquid crystal shutter is driven by the drive method shown in FIGS. 70A to 70J.

FIG. 76 shows the temperature dependency of an integrated amount of light in the ON state (upon continuous application of C1-S1) and in the OFF state (upon continuous application of C1-S4). As the integrated amount of light in this case, an integrated amount of light in the ON state and an amount of light in the OFF state during unit write period Tw are defined, as shown in FIG. 60.

FIG. 76 shows integrated amounts of light for electric fields of waveforms No. 1 to No. 4. In the electric field of waveform No. 1, although the operation temperature range is narrow, an amount of light can be increased. In the electric field of waveform No. 2, a substantially constant amount of light in the ON state can be obtained at a temperature of 51° C. or higher. In the electric field of waveform No. 3, a constant amount of light in the ON state can be obtained at a temperature of 47° C. to 48° C. or higher. In the electric field of waveform No. 4, a substantially constant amount of light in the ON state can be obtained within the temperature range of 45° C. to 60° C.

The temperature range is gradually widened from No. 1 to No. 4, and an amount of light in the ON state is decreased, at the same time. Waveform No. 4 takes about fifth place. For an electro-photographic printer, since the temperature of the liquid crystal shutter is increased due to heat radiation from a light source, a monitor, and the like, portions with good temperature stability characteristics of electric fields of waveforms No. 2 and No. 3 can be used. At this time, an amount of the light in the ON state is up to 6.

Figure 77:
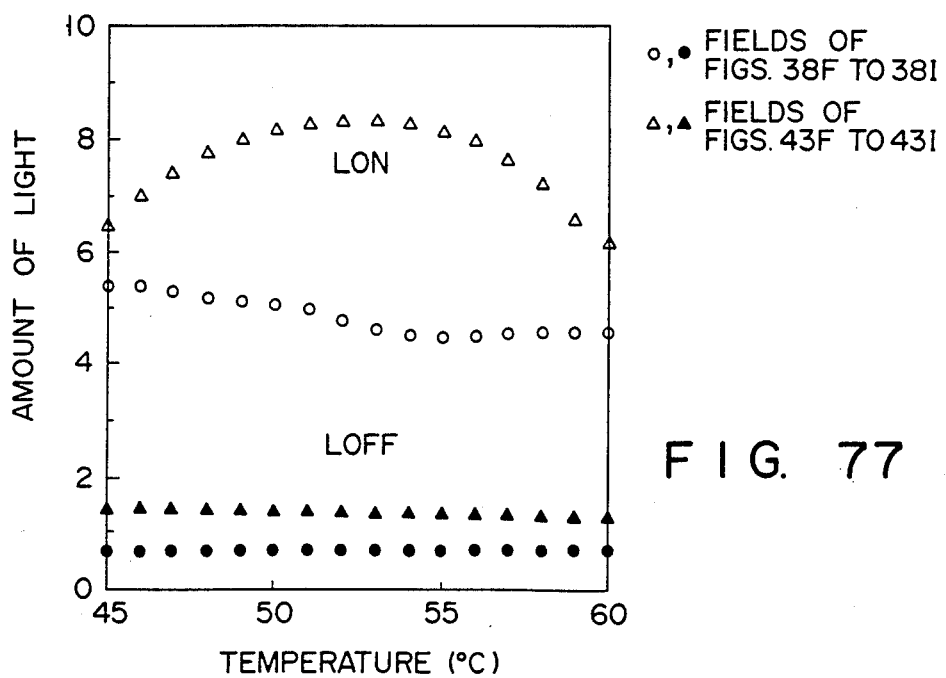
FIG. 77 is a graph showing the temperature characteristics when the liquid crystal shutter is driven by the drive method shown in FIGS. 43A to 43I.
Figure 78A:
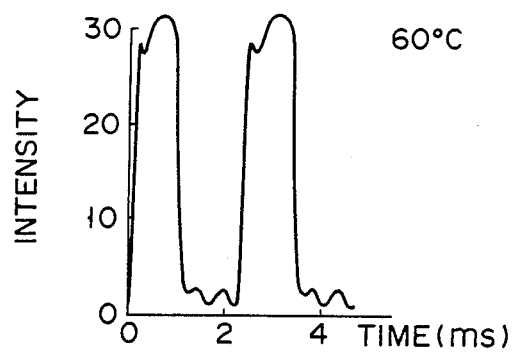
FIGS. 78A, 78B, 78C, and 78D are graphs showing the response characteristics when the liquid crystal shutter is driven by the drive method shown in FIGS. 38A to 38I.
Figure 78B:
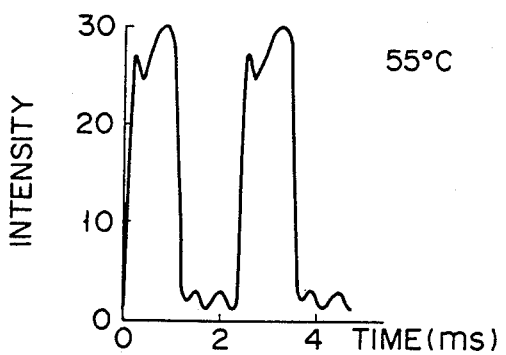
Figure 78C:
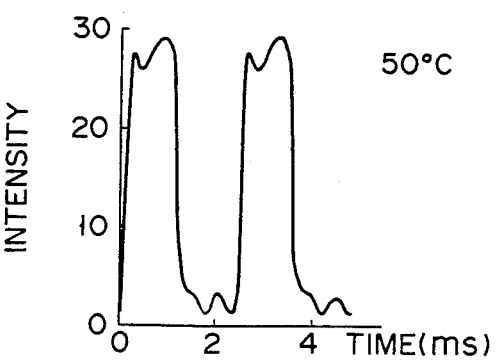
Figure 78D:
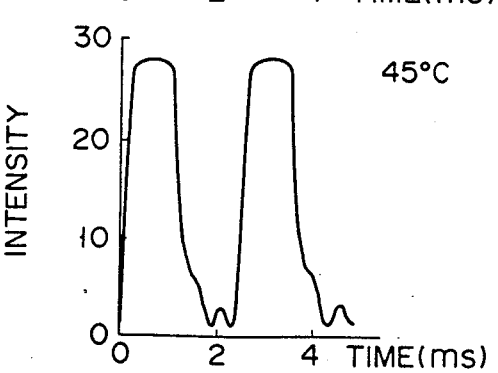

FIGS. 77 to 79D respectively show the temperature dependency of an integrated amount of light and the optical response characteristics in the drive methods shown in FIGS. 38A to 38I and FIGS. 43A to 43I for the sake of comparison with the drive method of this embodiment. In this case, in the drive method shown in FIGS. 38A to 38I, FH was 200 kHz and Vop was 25 V, periods T1 and T2 of the electric field waveform were respectively 1.19 msec, period T3 was 0.19 msec, period T4 was 0.375 msec, period T5 was 0.25 msec, and period T7 was 0.5 msec. In the drive method shown in FIGS. 43A to 43I, periods T1 and T2 in the electric field waveform were respectively 1.19 msec, periods T3, T4, and T5 were respectively 0.25 msec, T6 and T8 were respectively 0.44 msec, and period T7 was 0.75 msec. Referring to FIG. 77, in the case of complete ½ duty (the drive method shown in FIGS. 38A to 38I), although an amount of light in the ON state tends to be increased at the low temperature side, the temperature stability characteristics are good and the brightness is up to about 5. In the signal waveforms shown in FIGS. 43A to 43I, an amount of light in the ON state is increased, and its peak value exceeds 8.

However, upon comparison with FIG. 76, the drive method of the fifth embodiment shown in FIGS. 70A to 70J can provide a larger integrated amount of light than that of the complete ½ duty drive method by 20%. The drive method shown in FIGS. 70A to 70J has higher temperature stability than that of the drive method shown in FIGS. 43A to 43J.

Figure 81:
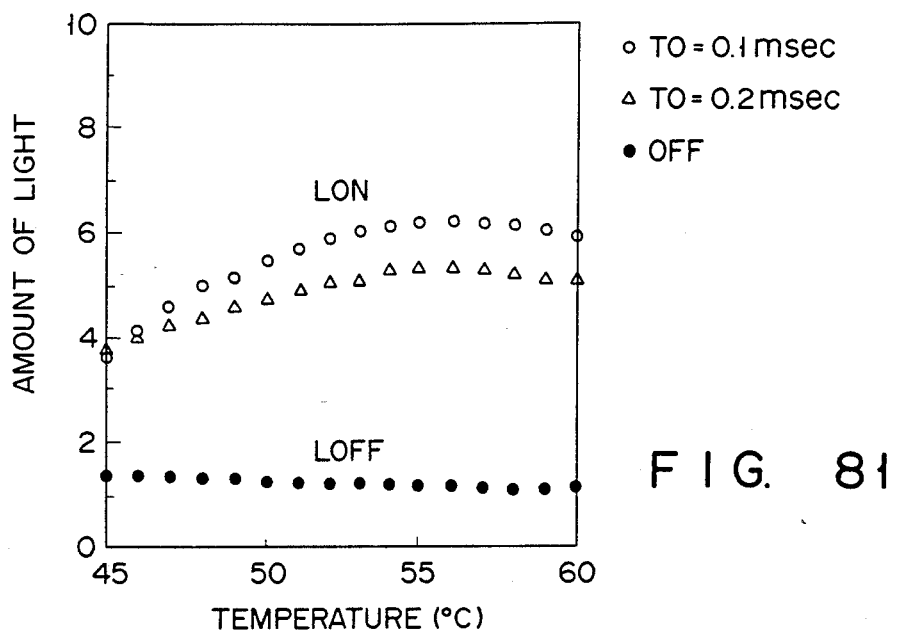
FIG. 81 is a graph showing the temperature characteristics when the liquid crystal shutter is driven by the drive method shown in FIGS. 80A to 80I.

A modification of the drive method of the fifth embodiment will now be described. FIGS. 80A to 80I show voltages applied to electrodes and electric fields applied to the liquid crystal material in the first modification. In the drive method of the first modification, non-electric field periods t1 and t2 are respectively provided at the end of periods T3 and T5 in which high-frequency electric field FH is applied in selection period T1. FIG. 81 shows the temperature dependency of the integrated amount of light when 0.1 msec non-electric field periods t1 and t2 are provided at the end of periods T3 and T5 and when periods t1 and t2 are set to be 0.2 msec. In the case of the 0.1 msec non-electric field period, in the electric field waveform, T3=0.3 msec, T4=0.2 msec, T5=0.3 msec, and T6=0.19 msec. In the case of the 0.2 msec non-electric field period, in the electric field waveform, T3=0.2 msec, T4=0.2 msec, T5=0.2 msec, and T6=0.19 msec. As can be seen from FIG. 81, drive method with the 0.2 msec non-electric field period can provide substantially the same characteristics as that in the case of using the electric field of waveform No. 2 in Table 11. Therefore, current consumption and dielectric heat can be advantageously reduced by the non-electric field period. In the drive method with the 0.2 msec non-electric field period, an integrated amount of light is decreased. This is because the ON state by second FH cannot satisfactorily be maintained by application of the non-electric field and subsequent FL/H, and hence, the transmitted light intensity is decreased. The reason why the ON state cannot be maintained is that the FH hysteresis effect is weakened due to the long non-electric field period after the FH application time.

FIGS. 82A to 82I show a second modification of the drive method for preventing a decrease in amount of light. In the drive method of the second modification, electric field FH is applied to the liquid crystal material during 0.1 msec period t3 corresponding to the second half of the 0.2 msec non-electric field period after the second application of FH, thereby turning on the liquid crystal shutter. With this drive method, since third FH is applied after the non-electric field after second application of FH, the liquid crystal is turned on again upon third application of FH, and the ON state can be maintained by the holding electric field. This drive method effectively utilizes the high-frequency hysteresis effect although the FH application time is shorter than the drive method with 0.1 msec non-electric field period in the first modification shown in FIGS. 80A to 80I. The integrated amount of light and the temperature dependency were the same as those in the drive method of the first modification. The short FH application time means low high-frequency power. Therefore, heat radiation due to high-frequency current can be prevented, resulting in reduced power consumption.

Figure 83:
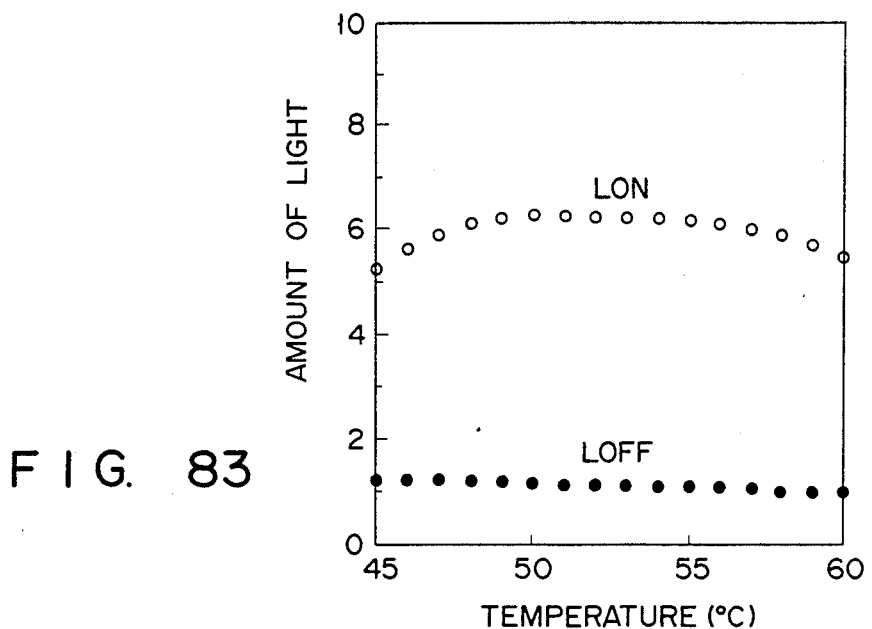
FIG. 83 is a graph showing the temperature characteristics when the liquid crystal shutter is driven by the drive method shown in FIGS. 82A to 82I.

FIG. 83 shows the temperature dependency of the integrated amount of light when the liquid crystal shutter is driven by the drive method of the second modification. In this case, in the voltage waveform, T3=T5=0.35 msec, T4=0.2 msec, and T6=0.29 msec. As shown in FIG. 83, in the drive method of the second modification, an integrated amount of light is 6 or more, and the temperature characteristics are also good.

In the above embodiment, write period Tw is 2.38 msec, and a response time of the liquid crystal device is 0.15 msec to 0.2 msec. In this manner, when the write period is relatively longer than the response time of the liquid crystal device, the drive method shown in the fifth embodiment is most suitable. More specifically, in order to increase an amount of light, the shutter ON period must be prolonged. Since the write period is longer than the response time, it is impossible to hold the obliquely aligned state of the liquid crystal molecules corresponding to the shutter ON state. This is because the liquid crystal molecules are controlled so that their tilt angle is always changed. It is possible to delay the behavior of the liquid crystal molecules in the ON state after application of the superimposed electric field. The long ON state means a long unstable state, degrading temperature stability characteristics. Therefore, when the ON and OFF operations are repeated during the write period as in the fifth embodiment, an amount of light can be increased without degrading the temperature stability characteristics.

What is claimed is:

1. A liquid crystal optical apparatus comprising:
   a liquid crystal optical device including,
      a pair of substrates having electrodes which at least partially face each other and are formed on opposing inner surfaces,
      a liquid crystal material which is sealed between said pair of substrates, and whose molecules are aligned in initial state in accordance with an aligning treatment subjected to said inner surfaces of said substrates, an alignment state of the molecules being controlled by an electric field applied across said electrodes, said liquid crystal material having a crossover frequency at which its dielectric anisotoropy becomes "0" and exhibiting a dielectric dispersion phenomenon wherein the polarity of the dielectric anisotropy is inverted in an electric field of a frequency lower than the crossover frequency and in an electric field of a frequency higher than the crossover frequency, and
      a pair of polarizing means arranged at both sides of said liquid crystal material, polarizing axis of said polarizing means being substantially perpendicular to each other, and at least one polarizing axis intersecting the direction of the aligning treatment of said inner surfaces of said pair of substrates, an angle falling within the range of 35° to 45°; and
   electric field applying means for selectively applying an ON electric field and an Off electric field to said liquid crystal material, to control an ON state and OFF state of the liquid crystal device, the ON electric field having an electric field for applying a force for obliquely aligning liquid crystal molecules relative to the substrate and a non-electric field for releasing the liquid crystal molecules from the force of said force-applying electric field, the ON electric field obliquely aligning the liquid crystal molecules and maintaining this state to hold the optical device in an ON state, and the OFF electric field aligning the liquid crystal molecules perpendicularly to said substrates, to obtain an OFF state of the device.

2. A liquid crystal optical apparatus according to claim 1, wherein said electric field applying means comprises ON electric field generating means for generating an ON electric field including on ON operation electric field for obliquely aligning the liquid crystal molecules so as to increase an amount of transmitted light, and an ON-holding electric field for holding the liquid crystal molecules in the obliquely aligned state.

3. A liquid crystal optical apparatus according to claim 2, wherein said electric field applying means comprises control means for controlling a period of time for which the ON operation electric field is applied and which is equal to or longer than a time required until a transmitted light intensity of said liquid crystal optical device exhibits a maximum value.

4. A liquid crystal optical apparatus according to claim 3, wherein said control means causes the ON operation electric field to be applied to said liquid crystal material for a period of time which is equal to substantially ½ of a given application time of the ON electric field.

5. A liquid crystal optical apparatus according to claim 1, wherein said liquid crystal material is a liquid crystal composition which exhibits a dielectric dispersion phenomenon wherein a dielectric anisotropy is positive in an electric field of a frequency lower than the crossover frequency and is negative in an electric filed of a frequency higher than the crossover frequency; and said electric field applying means comprises ON electric field generating means for generating an ON electric field having an ON operation electric field including at least a high-frequency electric field whose frequency is higher than the crossover frequency, for increasing the transmitted light intensity of said liquid crystal element to turn it on and an ON-holding electric field for holding the ON state, and OFF electric field generating means for generating an OFF electric field including at least a low-frequency electric field whose frequency is lower than the crossover frequency.

6. A liquid crystal optical apparatus according to claim 5, wherein said ON electric field generating means generated an ON operation electric field having at least one repetitive combination of the high-frequency electric field and the non-electric field.

7. A liquid crystal optical apparatus according to claim 5, wherein said ON electric field generating means generates the ON-holding electric field essentially consisting of a non-electric field.

8. A liquid crystal optical apparatus according to claim 5, wherein said ON electric field generating means generates the ON-holding electric field essentially consisting of a non-electric field and the high-frequency electric field which is applied for a time shorter than a given application time of the ON operation electric field.

9. A liquid crystal optical apparatus according to claim 5, wherein said ON electric field generating means generates the ON-holding electric field essentially consisting of a non-electric field and a superimposed electric field composed of the high-frequency electric field and the low-frequency electric field.

10. A liquid crystal optical apparatus according to claim 5, wherein said OFF electric field generating means generates the OFF electric field essentially consisting of at least two of and at least one repetitive combination of the low-frequency electric field, a superimposed electric field composed of the low-frequency electric field and the high-frequency electric field, and a non-electric field.

11. A liquid crystal optical apparatus according to claim 5, wherein said electric field applying means alternatively and repetitively applied the ON and OFF electric fields to said liquid crystal material.

12. A liquid crystal optical apparatus comprising:
a liquid crystal optical device including;
a pair of opposing substrates,
a plurality of electrodes formed on each of the inner surfaces of said pair of substrates, each of said plurality of electrodes formed on one substrate being arranged to oppose said electrodes formed on the other substrate, and each opposing portion of said electrodes forming a single optical shutter,
a liquid crystal material which is sealed between said pair of substrates, whose molecules are initially aligned in accordance with an aligning treatment of said inner surfaces of said substrates, and an alignment state of which is controlled by an electric field applied across said electrodes, said liquid crystal material having a crossover frequency at which its dielectric anisotropy becomes "0", and exhibiting a positive dielectric anisotropy in a low-frequency electric field of a frequency lower than the crossover frequency and a negative dielectric anisotropy in a high-frequency electric field of a frequency higher than the crossover frequency, and
a pair of polarizing means arranged at both sides of said liquid crystal material, the polarizing axes of said polarizing means being substantially perpendicular to each other, and at least one polarizing axis intersecting the directions of the aligning treatments of said inner surfaces of said pair of substrates, at an angle falling within the range of 35° to 45°; and
time-divisional driving means for controlling ON/OFF of a plurality of optical shutters formed in a portion where one of said electrodes formed on one of said substrates opposed some of said electrodes formed on the other substrate, said time-divisional driving means having selectively applying means for selectively applying, to said liquid crystal material, an ON electric field for obliquely aligning the liquid crystal molecules, to obtain an ON state, and an OFF electric field for perpendicularly aligning the liquid crystal molecules, to obtain an OFF state in a selection period assigned to control ON/OFF of the single optical shutter during a unit write period in which said plurality of optical shutters are sequentially controlled, said ON electric field comprising an ON-operation electric field which contains at least the high-frequency electric field and a holding electric field which contains at least a non-electric field; and OFF electric field applying means for applying, to said liquid crystal material, an OFF electric field for perpendicularly aligned the liquid crystal molecules, to obtain an OFF state in a period other than a period in which the ON electric field is applied during the unit write period.

13. A liquid crystal optical apparatus according to claim 12, wherein said selectively applying means includes generating means for generating the holding electric field composed of at least one of the non-electric field, the low-frequency electric field, and a superimposed electric field of the high-frequency and low-frequency electric fields.

14. A liquid crystal optical apparatus according to claim 12, wherein said time-division driving means includes generating means for generating an OFF electric field composed of at least one of a low-frequency electric field, a superimposed electric field of the high-frequency and low-frequency electric fields, a non-electric field, and a high-frequency electric field.

15. A liquid crystal optical apparatus according to claim 12, wherein said selectively applying means applies the ON electric field to said liquid crystal material during the selection period, applies the OFF electric field to said liquid crystal material during the period in the unit write period other than the selection period, and applies a low-frequency electric field to said liquid crystal material immediately before the end of the selection period.

16. A liquid crystal optical apparatus according to claim 12, wherein said selectively applying means comprises generating means for generating the ON electric field which essentially consists of the ON operation electric field including at least the high-frequency electric field of the high-frequency electric field and the non-electric field and the holding electric field for holding the ON state during a period longer than the selection period.

17. A liquid crystal optical apparatus according to claim 16, wherein said ON electric field generating means comprises generating means for generating the ON operation electric field applied to said liquid crystal material for at least a fixed period of time during the selection period, and generating means for generating the holding electric field applied to said liquid crystal material during the residual selection period and in the unit write period excluding the selection period.

18. A liquid crystal optical apparatus according to claim 16, wherein said holding electric field generating means generates a holding electric field including a non-electric field, a superimposed electric field of the low-frequency electric field, repetitive combinations of the non-electric field and the superimposed electric field, or a combination of these electric fields and the low-frequency electric field.

19. A liquid crystal optical apparatus according to claim 16, wherein said ON electric field generating means comprises generating means for generating the ON operation electric field having at least two repetitions of the high-frequency electric field and the low-frequency electric field in a period between the adjacent high-frequency electric fields, and generating means for generating the holding electric field for holding the ON state obtained by the ON operation electric field over a period longer than the selection period.

20. A liquid crystal optical apparatus according to claim 19, wherein said ON operation electric field generating means generates the ON operation electric field in which each application period of the high-frequency electric field is equal to or longer than an optical response time of said liquid crystal optical device.

21. A liquid crystal optical apparatus according to claim 19, wherein said ON operation electric field generating means generates the ON operation electric field having repetitions of the high-frequency electric field, and the non-electric field and/or the low-frequency electric field inserted at least in a period between the adjacent repeated high-frequency electric fields.

* * * * *

UNITED STATES PATENT AND TRADEMARK OFFICE
CERTIFICATE OF CORRECTION

PATENT NO. : 4,946,260

DATED : August 7, 1990

INVENTOR(S) : FUJIMURA et al.

It is certified that error appears in the above-identified patent and that said Letters Patent is hereby corrected as shown below:

Title page, under item [19], "Fujumura" should be --Fujimura--; and in item [75], the names of the first two inventors shouls correctly be:

--Koh Fujimura--

--Masakatsu Higa--.

Signed and Sealed this

Twenty-eighth Day of July, 1992

Attest:

DOUGLAS B. COMER

*Attesting Officer*     *Acting Commissioner of Patents and Trademarks*